United States Patent [19]
Brooks et al.

[11] Patent Number: 5,869,968
[45] Date of Patent: Feb. 9, 1999

[54] METHOD AND APPARATUS FOR AVOIDING MUTUAL COUPLING BETWEEN RECEIVERS IN MEASUREMENT WHILE DRILLING

[75] Inventors: Andrew G. Brooks, Tomball; Macmillian M. Wisler, Kingwood; Larry W. Thompson, Willis; Jian-Qun Wu, Houston; Wallace H. Meyer, Jr.; John W. Harrell, both of Spring, all of Tex.

[73] Assignee: Baker Hughes Incorporated, Houston, Tex.

[21] Appl. No.: 717,201

[22] Filed: Sep. 18, 1996

Related U.S. Application Data

[63] Continuation of Ser. No. 478,314, Jun. 9, 1995, abandoned, which is a continuation-in-part of Ser. No. 214,343, Mar. 14, 1994, Pat. No. 5,574,374, Ser. No. 214,946, Mar. 14, 1994, Pat. No. 5,811,972, Ser. No. 212,194, Mar. 11, 1994, Pat. No. 5,469,062, Ser. No. 212,102, Mar. 11, 1994, abandoned, Ser. No. 212,257, Mar. 14, 1994, abandoned, and Ser. No. 212,269, Mar. 14, 1994, abandoned.

[51] Int. Cl.⁶ .............................. G01V 3/08; G01V 3/18; G01V 3/26
[52] U.S. Cl. ............................. 324/338; 324/339
[58] Field of Search ...................... 324/338, 339, 324/340, 341, 342, 343, 355, 356, 369

[56] References Cited

U.S. PATENT DOCUMENTS

| | | |
|---|---|---|
| 3,891,916 | 6/1975 | Meador et al. ............................ 324/6 |
| 4,739,325 | 4/1988 | MacLeod ............................... 324/342 |
| 4,916,400 | 4/1990 | Best et al. .............................. 324/338 |
| 4,940,943 | 7/1990 | Bartel et al. ........................... 324/338 |
| 4,964,085 | 10/1990 | Coope et al. ........................... 324/338 |
| 5,081,419 | 1/1992 | Meador et al. ........................ 324/388 |
| 5,083,124 | 1/1992 | Nordstrom ............................. 324/344 |
| 5,187,661 | 2/1993 | Sinclair ................................. 324/339 |
| 5,233,522 | 8/1993 | Sinclair ................................. 324/339 |
| 5,278,507 | 1/1994 | Bartel et al. ........................... 324/338 |
| 5,345,179 | 9/1994 | Habashy ................................ 324/338 |

FOREIGN PATENT DOCUMENTS

84/01439  4/1984  European Pat. Off. .

Primary Examiner—Walter E. Snow
Attorney, Agent, or Firm—Madan & Morris PLLC

[57] ABSTRACT

An arrangement of two closely spaced transmitters and two spaced apart receivers symmetrically disposed about the transmitters in a measurement while drilling tool avoids the effects of mutual coupling between the receivers. In one method of operation of the transmitters, each transmitter is sequentially activated while the other transmitter is decoupled to eliminate mutual coupling, and the recorded signals processed to take advantage of reciprocity relations. In another method of operation, both transmitters are operated simultaneously with one relative polarity and then with another relative polarity, to eliminate the effects of mutual coupling and to take advantage of reciprocity relations.

9 Claims, 59 Drawing Sheets

Ohm-Meters Phase Resistivity

Ohm-Meters Attentuation Resistivity

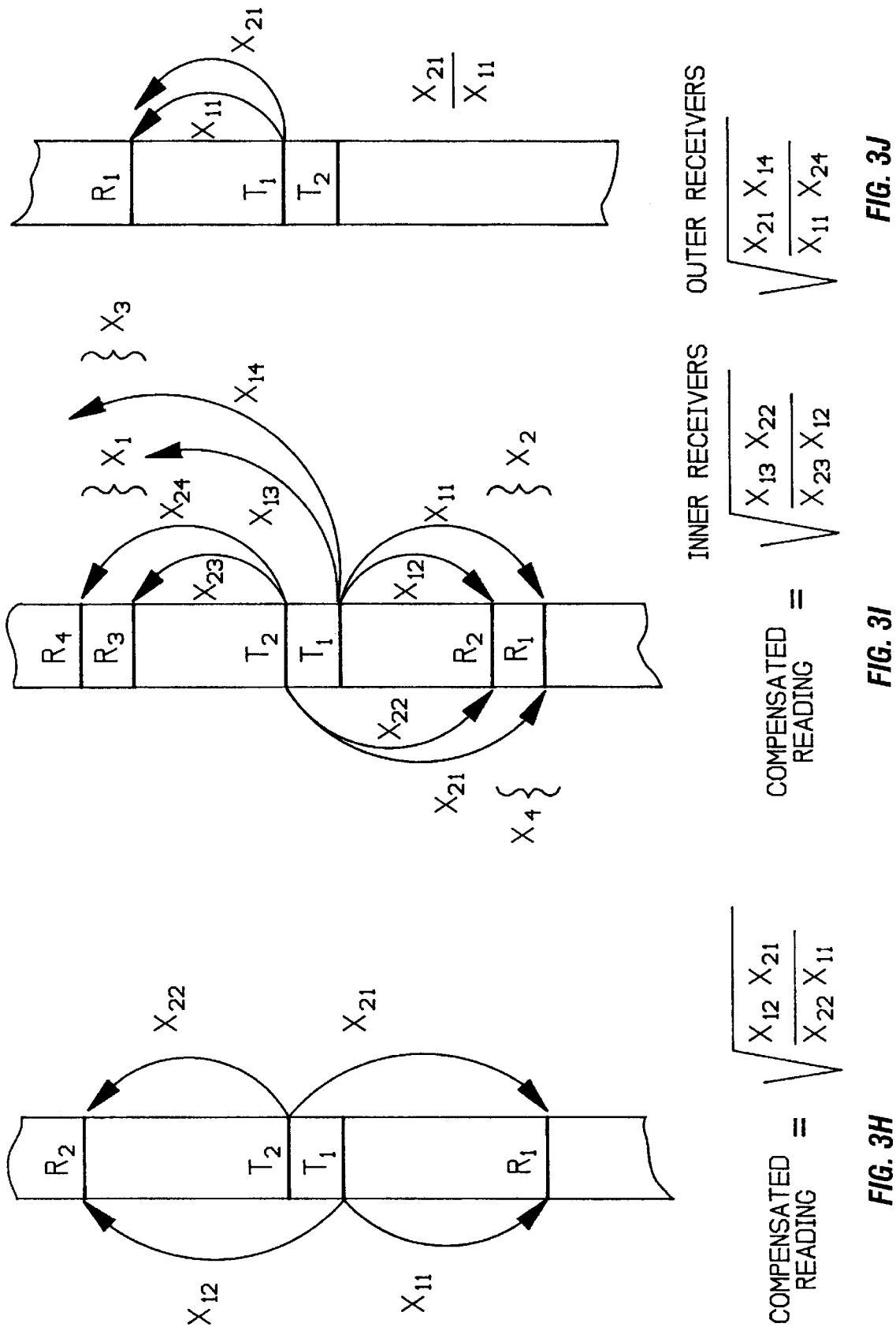

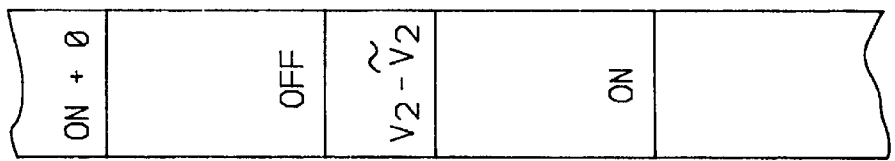
STEP 4  FIG. 3K7
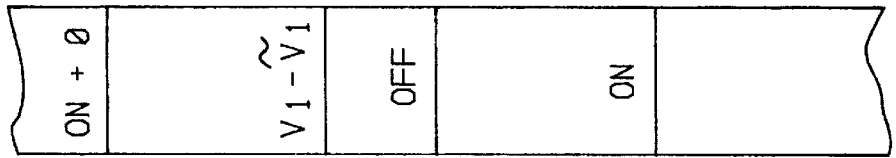
STEP 3  FIG. 3K6
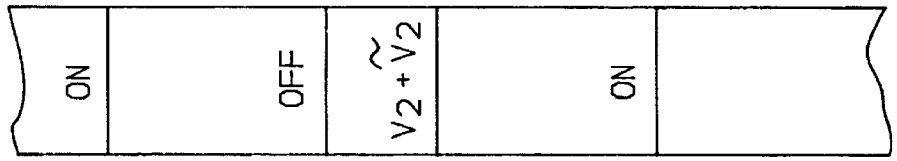
STEP 2  FIG. 3K5
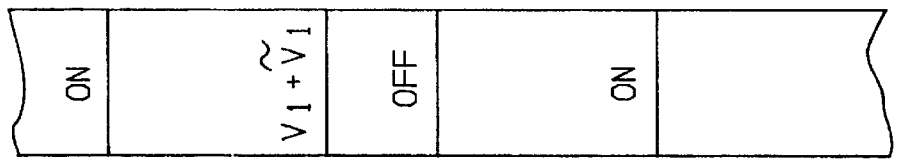
STEP 1  FIG. 3K4
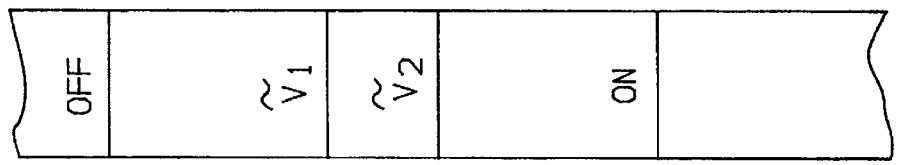
DEFINITION 2  FIG. 3K3
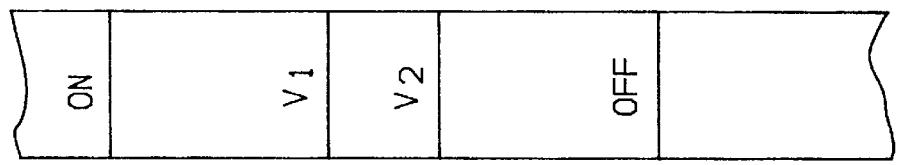
DEFINITION 1  FIG. 3K2
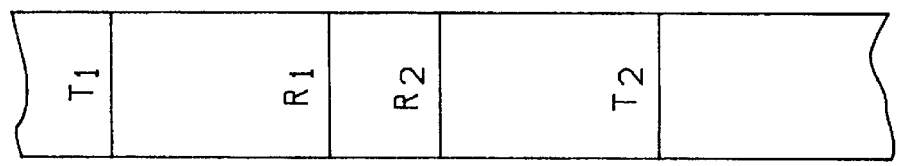
TOOL  FIG. 3K1

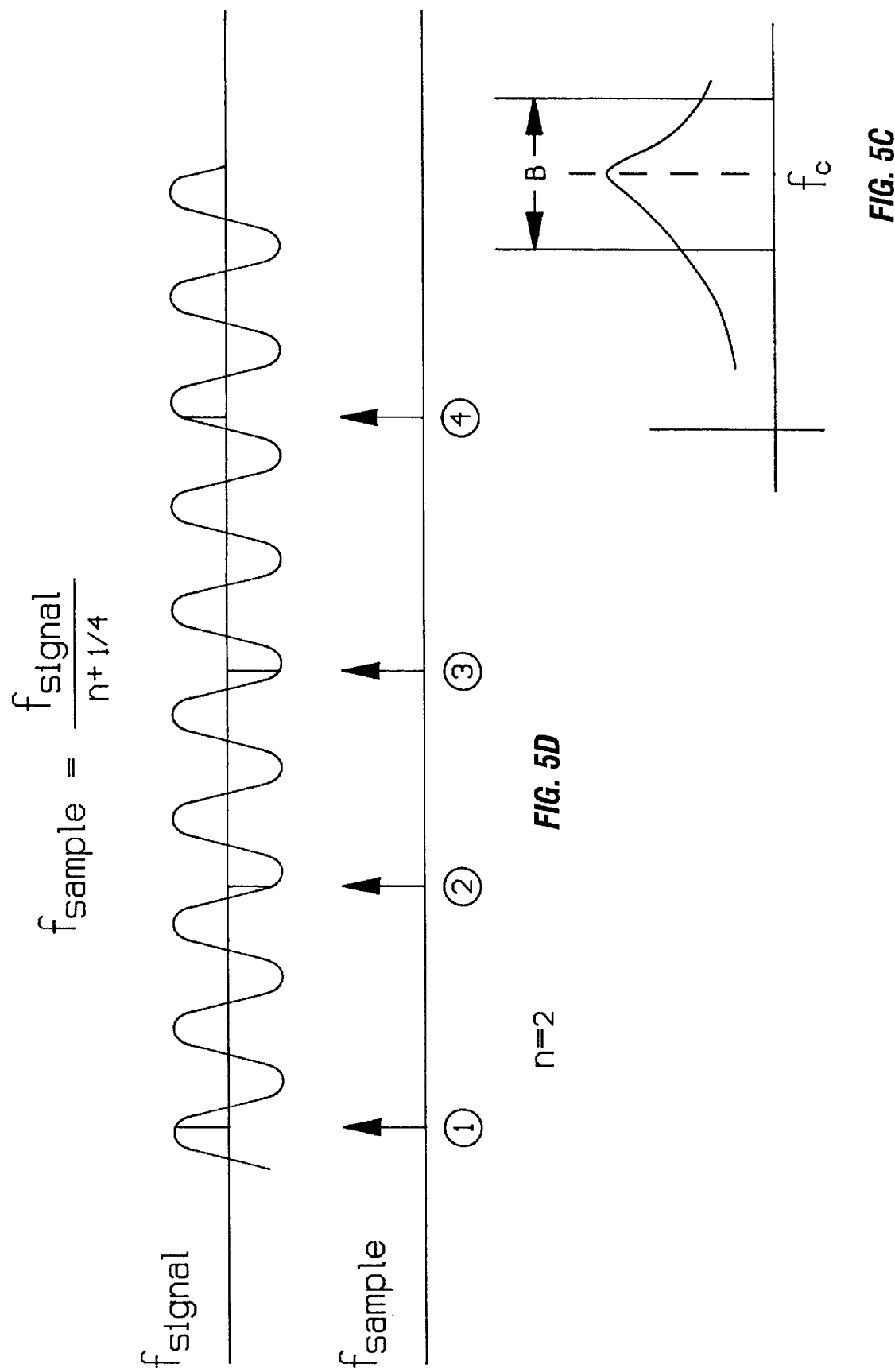

(INCIDENT SIGNAL)

(REFLECTED SIGNAL)

(INCIDENT SIGNAL)

(REFLECTED SIGNAL)

Borehold Diameter and Formation Resistivity vs Attenuation and Phase between receivers 8 inches apart for a mud resistivity of .05 $\Omega \cdot m$.

Dual Propagation Resistivity
Invasion Corrections

METHOD AND APPARATUS FOR AVOIDING MUTUAL COUPLING BETWEEN RECEIVERS IN MEASUREMENT WHILE DRILLING

CROSS-REFERENCE TO RELATED APPLICATION

This application is a continuation of application Ser. No. 08/478,314, filed on Jun. 7, 1995, which was a continuation in part of:

1. U.S. Pat. No. 5,574,374 (application Ser. No. 08/214,343, filed Mar. 14, 1994);
2. Application Ser. No. 08/214,946 filed Mar. 14, 1994, issue fee paid Dec. 15, 1997, now U.S. Pat. No. 5,811,972;
3. U.S. Pat. No. 5,469,062 (application Ser. No. 08/212,194, filed Mar. 11, 1994);
4. Application Ser. No. 08/212,102, filed Mar. 11, 1994, now abandoned and for which a continuation application Ser. No. 08/671,913 was filed Jun. 28, 1996, issue feed paid on May 14, 1998;
5. Application Ser. No. 08/212,257, filed Mar. 14, 1994, now abandoned, for which a continuation application Ser. No. 08/675,178 was filed Jul. 3, 1996, now abandoned, and a continuation in part application Ser. No. 09/031,493 was filed on Feb. 26, 1998;
6. Application Ser. No. 08/212,269, filed Mar. 14, 1994, now abandoned, continuation application Ser. No. 08/674,621, filed Jul. 3, 1996, now allowed.

BACKGROUND OF THE INVENTION

1. Field of the Invention

The present invention relates generally to measurement-while-drilling tools and specifically to logging-while-drilling tools.

2. Description of the Prior Art

In the oil and gas industry, measurement-while-drilling operations have slowly supplanted the more conventional wireline-logging operations, as a way to develop better and more accurate resistivity and other logs of the borehole and surrounding formation. Additionally, measurement-while-drilling tools have been utilized to provide information in real-time which facilitates and improves drilling operations. For example, information relating to the borehole and surrounding formation may be utilized during drilling operations to make more intelligent decisions about the equipment, drilling muds, and additives which are utilized during drilling. Additionally, the measurement-while-drilling systems can be utilized to pin point with greater accuracy the precise location of oil and gas deposits, and are especially useful in obtaining accurate determinations of the absence of presence of oil and gas deposits prior to the invasion of the formation by the drilling mud and drilling additives.

One significant disadvantage with measurement-while-drilling systems is that the electronics necessary for the transmission and reception of electromagnetic energy must be contained entirely within a single subassembly. This stands in sharp contrast with wireline logging systems which contain some of the necessary electronics at a surface location in a logging truck, and which can utilize the wireline to pass digital commands and data between the surface location and the wireline tool. The fact that the electronics necessary for both transmission and reception are contained within a single, usually steel, collar results in a variety of signal processing problems which must be minimized or eliminated in order to ensure the accuracy of logging measurements. In prior art logging devices, it is not uncommon to have significant problems of mutual coupling between the receivers in the logging tool. Mutual coupling occurs when the responsiveness of one receiving antenna is altered due to the presence of another receiving antenna. Mutual coupling distorts the signal generated by a particular receiving antenna, and corrupts the measurement. The closer the spacing between the receiver antennas, the greater the effect of mutual coupling. Closely-spaced receiver antennas also result in undesirable cross-talk between the receiving antennas. Cross-talk can also occur between transmitters and receivers within the logging tool. These types of signal corruption must be guarded against. Additionally, a certain amount of signal conditioning must be performed to minimize mutual coupling.

SUMMARY OF THE INVENTION

It is a general objective of the present invention to provide an improved measurement-while-drilling tool, and method of logging, which reduces the effects of undesired mutual coupling and cross-talk within the logging tool, and which thus generally increase the accuracy of the logging measurements.

This objective is obtained in a closely-spaced transmitter embodiment of the present invention by closely spacing the transmitter antennas, preferably at a medial portion of the logging tool, and remotely locating the receiving antenna or antennas at a distal location or locations on the logging tool.

This objective can also be obtained utilizing a simultaneous transmission embodiment of the present invention, wherein, irrespective of the antenna configuration, the transmitter antennas are simultaneously energized, and readings are made with the one or more receiving antennas, followed by another interval of simultaneous energization of the transmitter antennas, this time with a predetermined phase component introduced between the energizing electromagnetic fields of the transmitter antennas, culminating in a calculation of either or both of the amplitude attenuation and phase shift of the interrogating signals from these various measurements.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3H, 3I, and 3J graphically depict logging operations conducted in accordance with the closely-spaced transmitters embodiment of the present invention;

FIGS. 3K1 through 3K7 graphically depict logging operations conducted in accordance with the simultaneous transmission embodiment of the present invention;

FIGS. 5C and 5D are graphical depictions of the bandpass sampling technique of the present invention;

FIG. 7 is a block diagram view of the digital signal processor of the block diagram of FIG. 5A;

DETAILED DESCRIPTION OF THE INVENTION

The present invention is directed to an improved logging-while-drilling apparatus which is capable of making logging measurements at multiple depths of investigation. Multiple embodiments exist for this invention, and several will be discussed herein. These embodiments which are discussed herein can be separated into two broad categories: a first category, which utilizes multiple, closely-spaced transmitter antennas to transmit an electromagnetic filed into the surrounding formation and which utilizes at least one receiver antenna to measure the electromagnetic fields, which is hereinafter referred to as the "closely-spaced transmitters" embodiment; and a second category, which utilizes multiple transmitter antennas to simultaneously generate interrogating electromagnetic fields and which utilizes at lease one receiver antenna to make a first measurement of the electromagnetic fields and which then utilizes multiple transmitters to simultaneously generate interrogating electromagnetic fields with a predetermined phase component between the electromagnetic fields and which then utilizes the at least one receiver to make a second measurement of the electromagnetic files, with the first and second measurements being used to determine a formation parameter (such as resistivity) at differing depths of investigation, which is hereinafter referred to as the "simultaneous transmission" embodiment. It is important to note that the "closely-spaced transmitters" and "simultaneous transmission" embodiments are not mutually-exclusive, since they may be present in the same tool and used together.

The "closely-spaced transmitters" and "simultaneous transmission" embodiments will be discussed below, under the following topic headings:

(1) OVERVIEW OF MEASUREMENT-WHILE-LOGGING;
(2) POSSIBLE ANTENNA CONFIGURATIONS;
(3) EXEMPLARY ANTENNA CONSTRUCTION;
(4) OVERVIEW OF PRIOR ART LOGGING OPERATIONS;
(5) LOGGING OPERATIONS IN ACCORDANCE WITH THE PRESENT INVENTION;
(6) OPERATION OF THE LOGGING TOOL;
(7) ANTENNA CALIBRATION OPERATIONS;
(8) CORRECTION FOR MUTUAL COUPLING ERRORS;
(9) BOREHOLE CALIPER OPERATIONS;
(10) THE DETERMINATION OF DIELECTRIC PROPERTIES;
(11) THE USE OF MULTIPLE DEPTHS AND FREQUENCIES FOR SIMULTANEOUS INVERSION OF ELECTROMAGNETIC BOREHOLE MEASUREMENTS;
(12) THE USE OF RAW AMPLITUDE AND PHASE IN PROPAGATION RESISTIVITY MEASUREMENT TO MEASURE BOREHOLE ENVIRONMENTAL PARAMETERS;
(13) THE USE OF REDUNDANT DATA FOR LOG QUALITY MEASUREMENTS; and
(14) MULTI-DEPTH MWD LOGGING OPERATIONS.

1. Overview of Measurement-While-Drilling

Figure 1A:
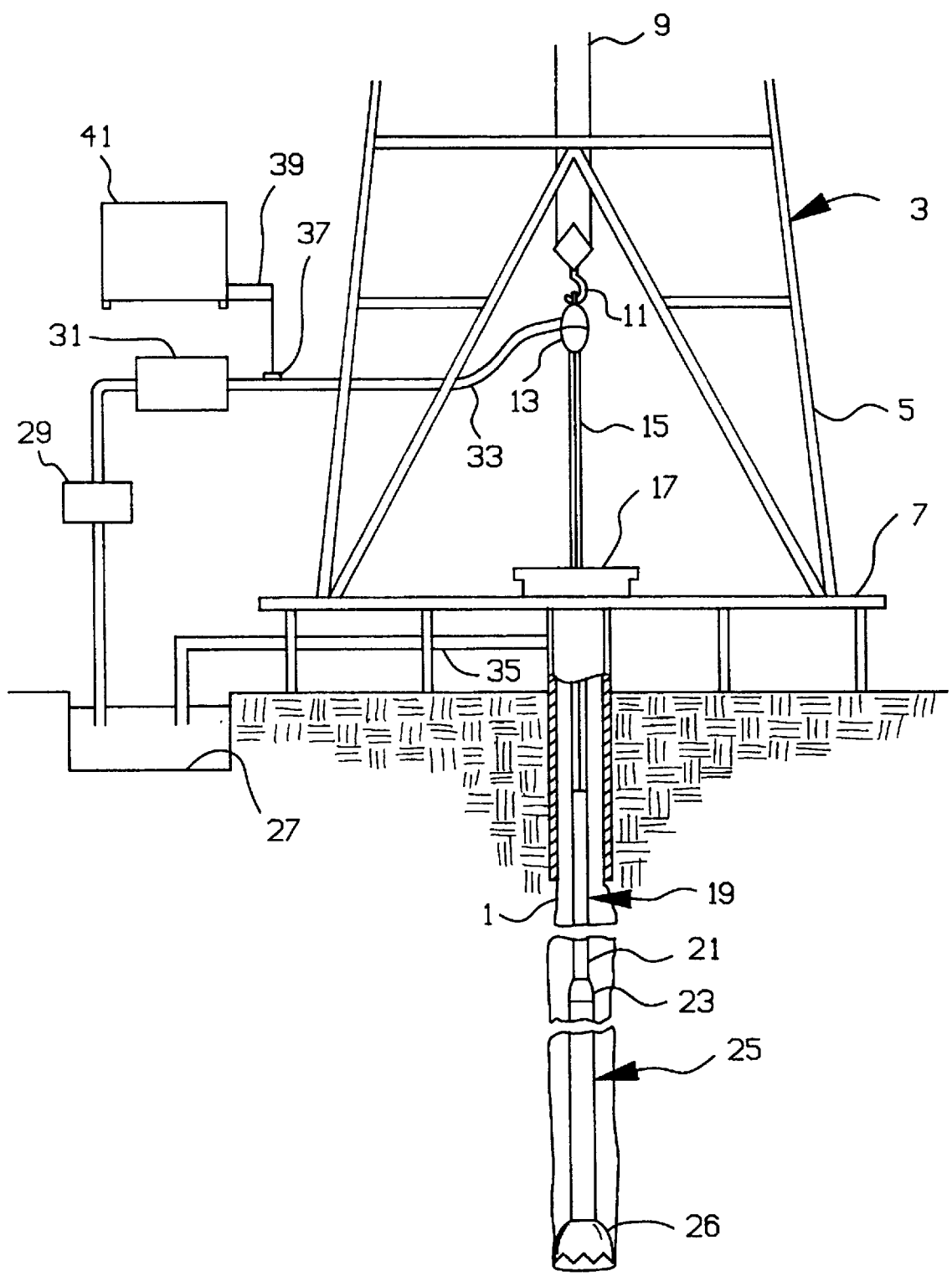
FIG. 1A provides a simplified perspective view and partial longitudinal section view of a measurement-while-drilling system utilized during drilling operations.

With reference to FIG. 1A, there will now be described an overall simultaneous drilling and logging system that incorporates an electromagnetic wave propagation resistivity measurement system according to this invention.

A well 1 is being drilled into the earth under control of surface equipment including a rotary drilling rig 3. In accord with a conventional arrangement, rig 3 includes a derrick 5, derrick floor 7, draw works 9, hook 11, swivel 13, kelly joint 15, rotary table 17, and drill string 19 that includes drill pipe 21 secured to the lower end of kelly joint 15 and to the upper end of a section of drill collars including an upper drill collar 23, an intermediate drill collar or sub (not separately shown), and a lower drill collar measurement tubular 25 immediately below the intermediate sub. A drill bit 26 is carried by the lower end of measurement tubular 25.

Drilling fluid (or "mud" as it is commonly called) is circulated from a mud pit 27 through a mud pump 29, past a desurger 31, through a mud supply line 33, and into swivel 13. The drilling mud flows down through the kelly joint and an axial central bore in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before it returns to the mud pit.

The overall system of FIG. 1A uses mud pulse telemetry techniques to communicate data from downhole to the surface while drilling operations take place. To receive data at the surface, there is a transducer 37 in mud supply line 33. This transducer generates electrical signals in response to drilling mud pressure variations, and these electrical signals are transmitted by a surface conductor 39 to a surface electronic processing system 41.

As explained in U.S. Pat. No. 4,216,536 to More, which is incorporated herein by reference as if fully set forth, mud pulse telemetry techniques provide for communicating data to the surface about numerous downhole conditions sensed by well logging transducers or measurement systems that ordinarily are located on and within the drill collar nearest the drill bit. The mud pulses that define the data propagated to the surface are produced by equipment within the intermediate sub. Such equipment typically comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including circuits forming part of the preferred embodiment of this invention. As an alternative or supplemental source of electrical power, batteries may be provided, particularly as a back-up for the turbine-driven generator.

A measurement system embodying this invention includes electronics contained in electronics housings contained within measurement tubular 25, and contains elements arranged in recesses or "necked-down" portions of the tubular steel housing of measurement tubular 25. Some of these elements of measurement tubular 25 include at least one transmitting antenna, at least one and at least one intermediate receiving antenna, all of which are carried about an exterior surface of measurement tubular 25, and which are utilized to interrogate the borehole and surrounding formation, as will be discussed in greater detail below.

2. Possible Antenna Configurations

Figure 1B:
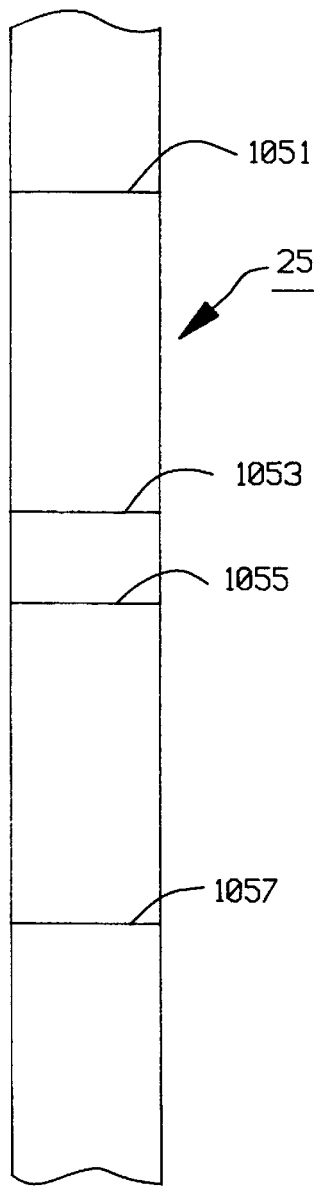
FIGS. 1B, 1C, 1D, 1E, 1F, and 1G provide schematic views of possible antenna configurations.
Figure 1C:
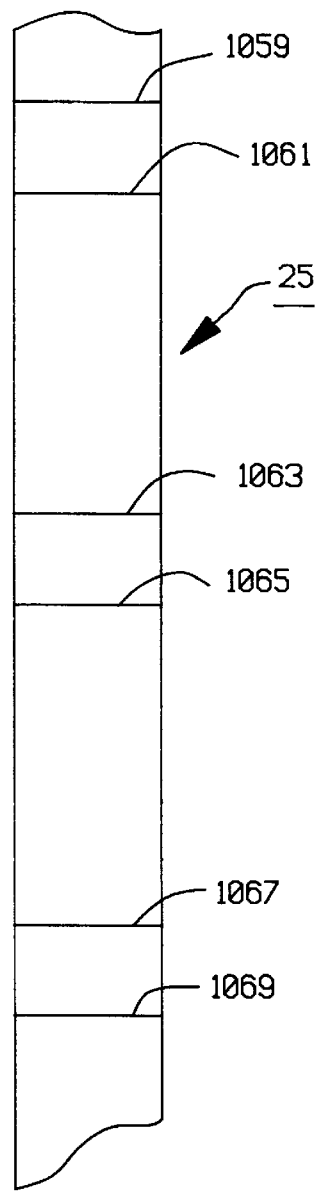
Figure 1D:
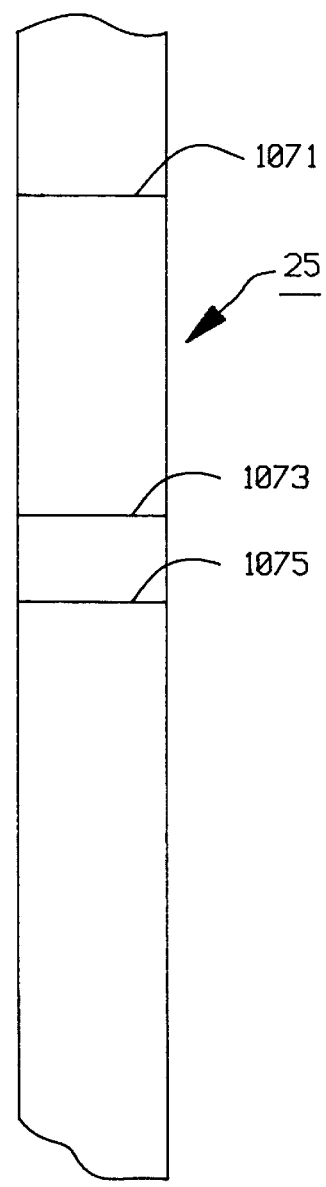

FIGS. 1B, 1C, and 1D are simplified schematic depictions of several alternative possible antenna configurations which may be utilized in accordance with the teachings of the present invention to provide a closely-spaced transmitters embodiment of a logging-while-drilling apparatus. The embodiment of FIG. 1B is a dual transmitter, dual receiver antenna configuration which includes upper receiving antenna 1051, lower receiving antenna 1057, and closely-spaced transmitting antennas 1053, 1055 which are positioned intermediate receiving antennas 1051, 1057. Preferably transmitting antennas 1053, 1055 are located at a medial portion of measurement tubular 25. Additionally, preferably receiving antennas 1051, 1057 are remotely located from transmitting antennas 1053, 1055, and are located at medial portions of measurement tubular 25 in accordance with the present invention. The transmitting and receiving antennas are substantially symmetrically positioned about a center line which is located intermediate transmitting antennas 1053, 1055.

FIG. 1C is a simplified schematic depiction of another embodiment of the closely-spaced transmitters embodiment of the present invention. As is shown, transmitting antennas 1063, 1065 are positioned at a medial location of measurement tubular 25. Receiving antennas 1059, 1061 are located at an upper distal portion of measurement tubular 25. Receiving antennas 1067, 1069 are located at a lower distal portion of measurement tubular 25. Once again, in the preferred embodiment, the transmitting and receiving antennas are substantially symmetrical about a midpoint which is intermediate transmitting antennas 1063, 1065, although in alternative embodiments an asymmetrical geometry is a viable potion. In still other embodiments, a greater number of receiving antennas may be provided. In these embodiments, the transmitting antennas are positioned intermediate the receiving antennas, and the transmitting antennas and receiving antennas are positioned substantially symmetrical about a midpoint although an asymmetrical configuration is also possible.

FIG. 1D is a simplified schematic representation of yet another embodiment of the closely-spaced transmitters embodiment of the present invention. In this particular embodiment, a single receiving antenna 1071 is located at an upper distal portion of measurement tubular 25. Transmitting antennas 1073, 1075 are located at a medial portion of measurement tubular 25, and are closely-spaced to one another, as compared to the spacing between either transmitting antenna and the single receiving antenna. Alternatively, receiving antenna 1071 could be located at a lower distal portion of measurement tubular 25.

The antenna configurations depicted in FIGS. 1B, 1C, and 1D can optionally utilize the simultaneous transmission embodiment of the present invention.

Figure 1E:
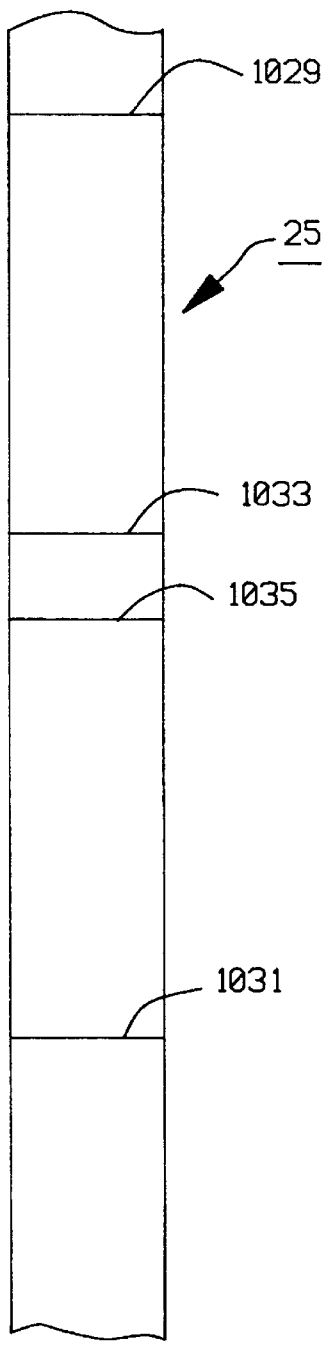
Figure 1F:
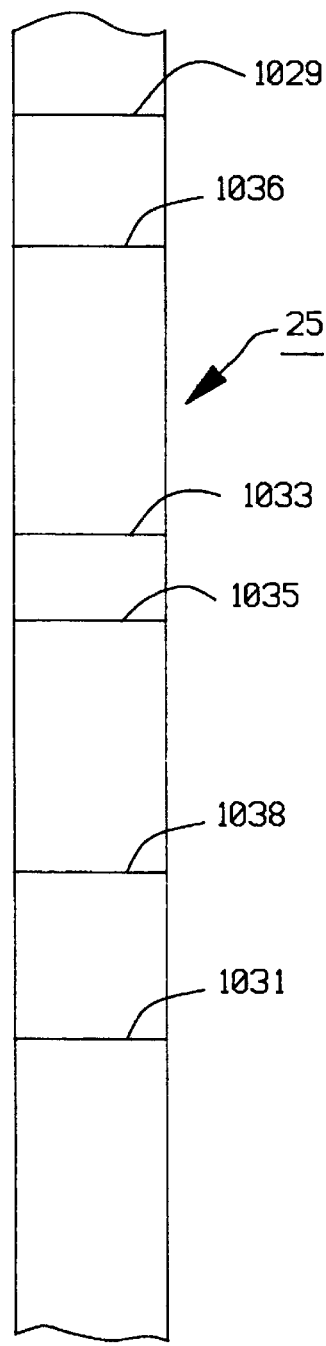
Figure 1G:
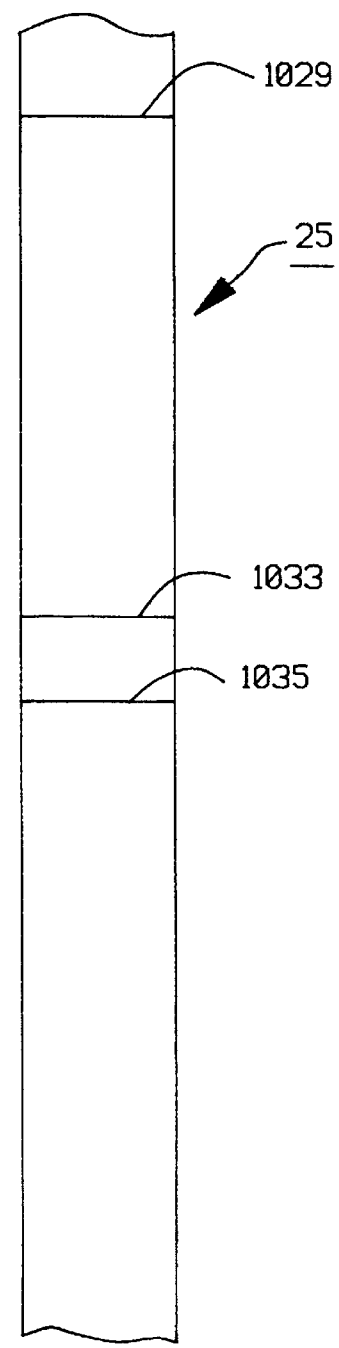

FIGS. 1E, 1F, and 1G depict in simplified schematic form several possible antenna configurations which can be utilized in accordance with the teachings of the simultaneous transmission embodiment of the present invention. The antenna configuration of FIG. 1E is a dual transmitter, dual receiver antenna configuration which includes upper transmitting antenna 1029 located at an upper portion of measurement tubular 25, lower transmitting antenna 1031, which is located at a lower portion of measurement tubular 25, and intermediate receiving antennas 1033, 1035. FIG. 1F depicts another antenna configuration in accordance with the present invention and includes upper transmitting antennas 1029, 1036 which are located at an upper portion of measurement tubular 25, lower transmitting antennas 1031, 1038, which are located at a lower portion of measurement tubular 25, and intermediate receiving antennas 1033, 1035. Yet another configuration which is possible in accordance with the present invention is depicted in FIG. 1G. This configuration includes only a single transmitting antenna, such as upper transmitting antenna 1029, and two or more receiving antennas 1033, 1035. This configuration is commercially practical as a direct result of the teachings of the present invention, as will be discussed in greater detail herebelow.

3. Exemplary Antenna Construction

Figure 2A:
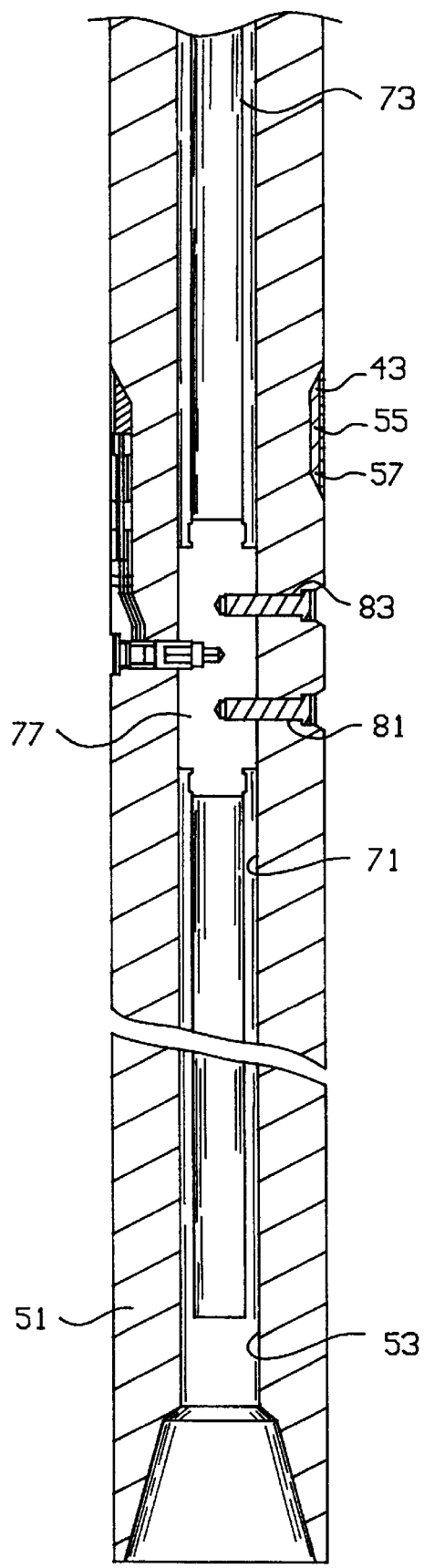
FIGS. 2A and 2B provide a longitudinal section view of a dual transmitter, dual intermediate receiver logging-while-drilling tool, and in particular depicts antenna construction and connection to receiver and/or transmitter subassemblies.
Figure 2B:
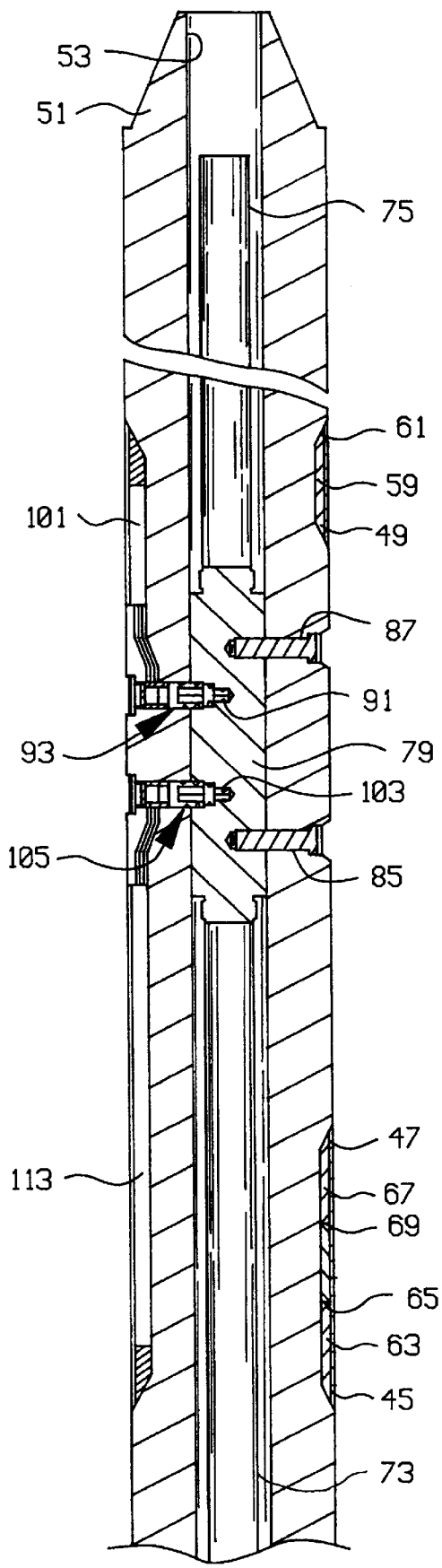

FIGS. 2A and 2B provide a longitudinal section view of measurement tubular 25 for a dual transmitter, dual receiver logging apparatus having an antenna configuration like that shown in FIG. 1E. The antenna construction shown herein can be altered with ease to obtain the other antenna configurations of FIGS. 1B, 1C, 1D, 1F, and 1G. The following discussion is thus illustrative of the principles of antenna construction which are applicable to all varieties of alternative antenna configurations.

With reference now to FIG. 2A, a tubular steel housing 51 is provided. A conductor 55 is part of a first transmitting antenna assembly which is encapsulated in antenna-insulating sleeve 43 that surrounds a circumferential recess 57 in tubular steel housing 51. A conductor 59 is part of a second transmitting antenna assembly which is encapsulated in antenna-insulating sleeve 49 that surrounds a circumferential recess 61 in tubular steel housing 51. A conductor 63 is part of a first receiving antenna assembly which is encapsulated in antenna-insulating sleeve 45 that surrounds a circumferential recess 65 in tubular steel housing 51. A conductor 67 is part of a second receiving antenna assembly which is encapsulated in antenna-insulating sleeve 47 that surrounds a circumferential recess 69 in tubular steel housing 51.

The ring-shaped portion of the collar that separates recess 65 from recess 69 provides for de-coupling between the first and the second receiving antenna assemblies. An alternative arrangement involves a single recess for both the first and second receiving antenna assemblies. In the alternative arrangement, the receiving antenna assemblies can be spaced closer together or farther apart.

Each antenna-insulating sleeve is made of multiple layers including an outer layer of nitrile rubber, a material which is sufficiently durable to protect the encapsulated antenna coil from wear despite the adverse conditions involved in a drilling operation, and provides adequate electrical insulation despite the hydrostatic pressures involved in the drilling operation. A suitable way to make each sleeve involves several steps including wrapping around the recess a durable fiberglass of the type that is used in replaceable insulating sleeves for MWD subs. Then, portions of the fiberglass wrappings are cut away to provide circumferential and longitudinal grooves for conductors of the antenna assembly and to provide a recess for a junction box. After insertion of the components of the antenna assembly, the nitrile rubber is applied.

Preferably, in a dual-transmitter, dual receiver tool, the axial spacing from conductor 55 of the first transmitting antenna assembly to conductor 63 of the first receiving antenna assembly is 28 inches, from conductor 63 of the first receiving antenna to conductor 67 of the second receiving antenna assembly is 6 to 10 inches, and from conductor 67 to conductor 59 of the second transmitting antenna assembly is 28 inches. In the above-mentioned alternative arrangement in which both receiving antenna assemblies are in a single recess, the spacings suitably are 30 inches, 6 inches, and 30 inches. Close spacing of receiving antennas provides good vertical resolution which allows thin beds in the formation to be identified; however, the closer the spacing on receiving antennas the greater the impact of magnetic mutual coupling.

Within steel housing 51, there are arranged three pressure-sealed electronics housings 71, 73, and 75, together with supporting blocks 77 and 79. Each supporting block engages the interior cylindrical surface of tubular steel housing 51. Supporting blocks 77 and 79 are fixed in place by sealed anchor bolts 81, 83, 85, and 87.

Figure 2C:
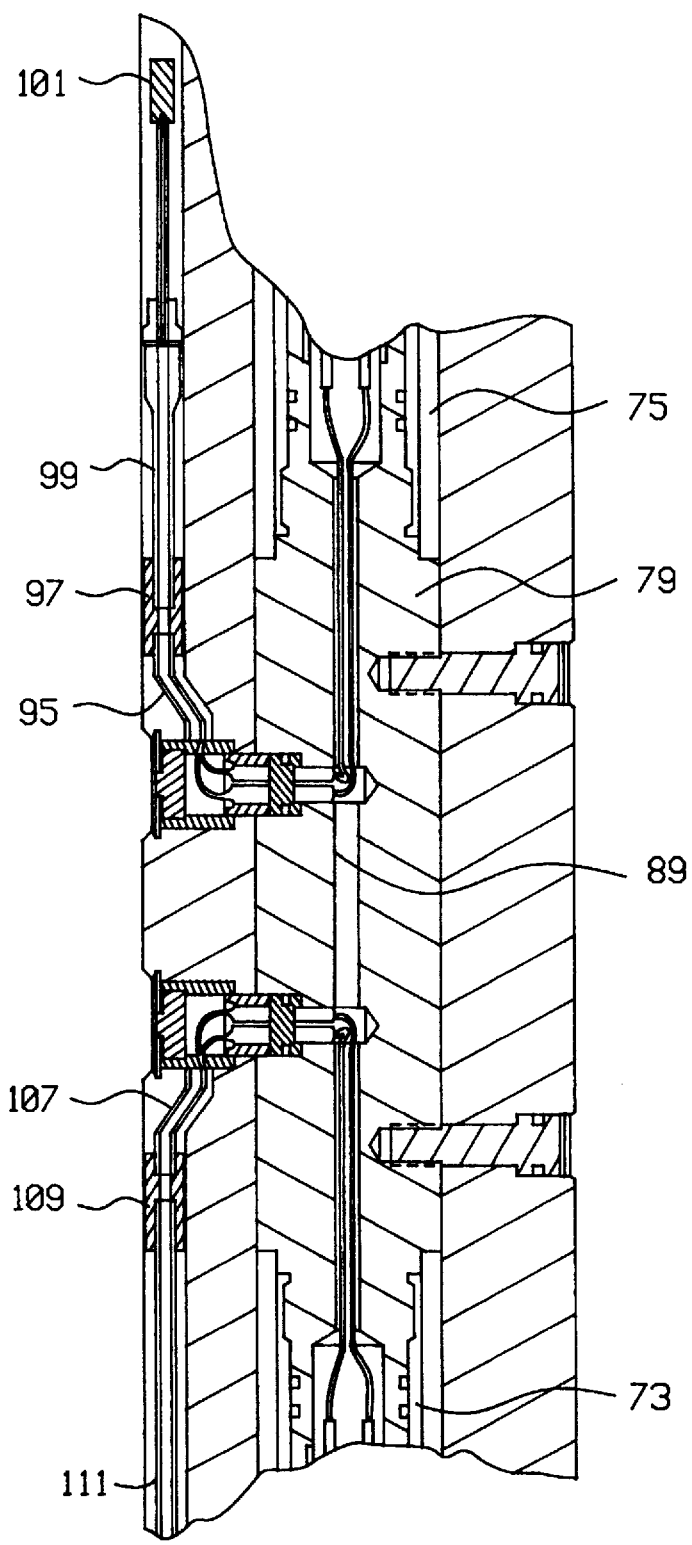
FIG. 2C provides a detail view of a portion of the antenna construction of FIGS. 2A and 2B and connection to receiver and or transmitter subassemblies.

As shown in the enlarged view of FIG. 2C, supporting block 79 has an axial bore 89 that serves as section of a conduit assembly for conductors that extend from circuitry in electronic housings 73 and 75. Axial bore 89 communicates with openings 91 (FIG. 2B) in a pressure-sealed, generally radially-extending port connector assembly 93 that serves as a section of the conduit assembly for conductors that interconnect circuitry within electronics housings 75 and the second transmitting antenna assembly. Other sections of this conduit assembly are a port tube 95, a tubing length adjuster 97, and tubing 99 that terminates in a junction box 101.

Axial bore 89 (in FIG. 2C) also communicates with openings 103 (FIG. 2B) in another pressure-sealed, generally radially-extending port connector assembly 105 that serves as a section of the conduit assembly for conductors that interconnect circuitry in electronics housings 73 and the first and second receiving antenna assemblies. Other sections of this conduit assembly are a port tube 107, a tubing length adjuster 109, and tubing 111 that terminates in a junction box.

Figure 2D:
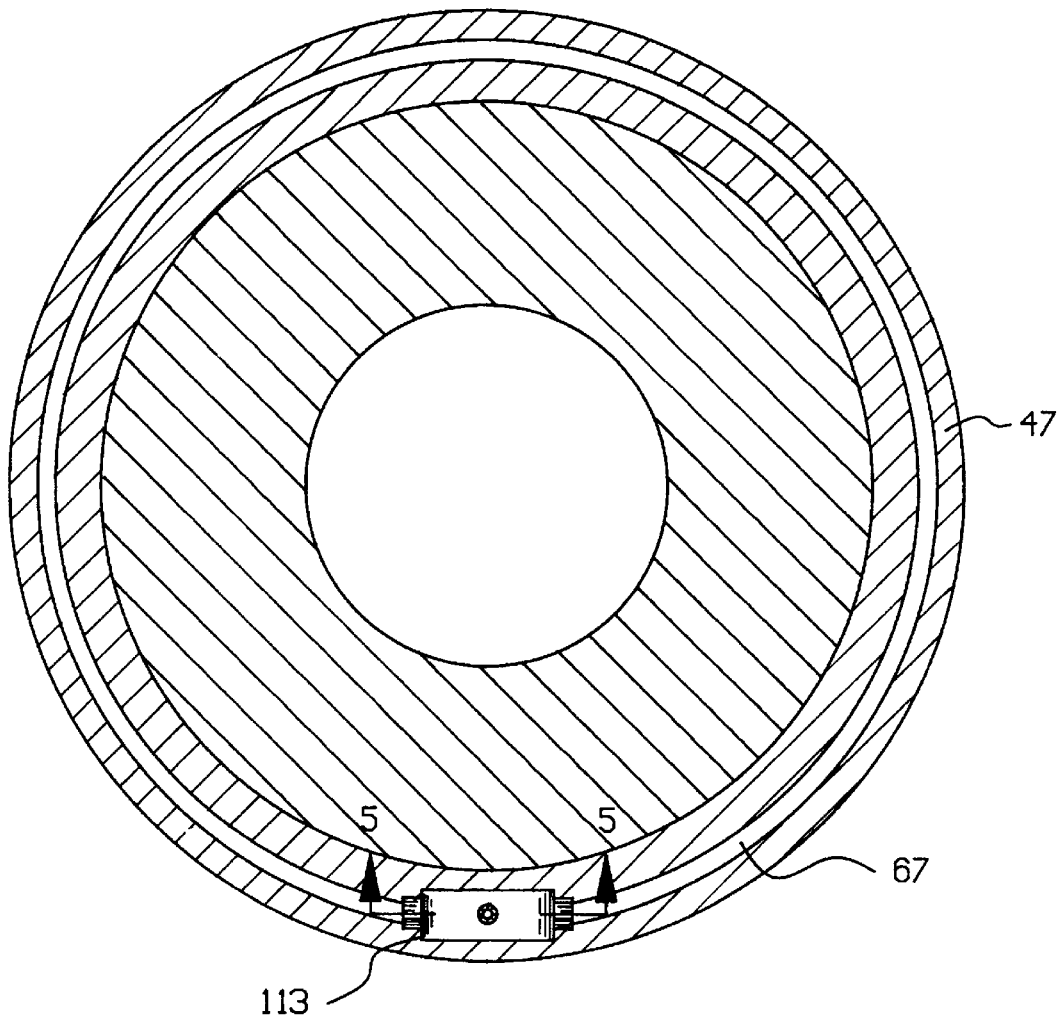
FIG. 2D is a cross-section view of the antenna construction of FIGS. 2A, 2B, and 2C.
Figure 2E:
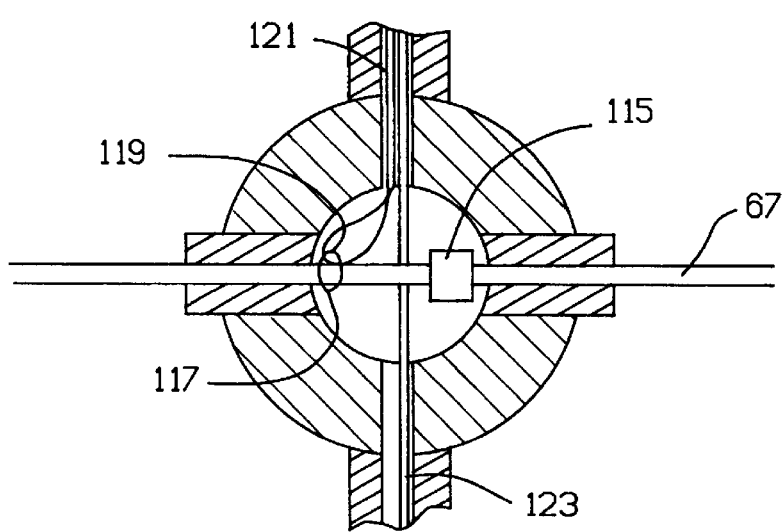
FIG. 2E is a detail view of section 5—5 of FIG. 2D.

With reference to FIGS. 2D and 2E, there will now be described the construction of the second receiving antenna assembly. Conductor 67 and a tuning capacitor 115 are interconnected to define preferably a single-turn, tuned receiving antenna; however, more than one turn can be used for lower frequency operation. The capacitance value of capacitor 115 is 0.012 microfarads. In combination with a conductor forming a one-turn loop of 6½ inch diameter, tuning capacitor 115 makes the receiving antenna highly sensitive in the frequency region embracing 2 Mhz. This is so because the capacitive reactance is equal (but opposite in phase from) the inductive reactance and therefore the loop impedance is minimum (and essentially resistive). In operation, an alternating current is induced in the loop circuit defined by conductor 67 and capacitor 115 while an electromagnetic wave propagates through the formation. The magnitude of this alternating current depends on, among other things, the impedance of the loop circuit. At 2 Mhz, the impedance of the loop circuit is about 0.5 ohms. Within junction box 113, conductor 67 extends through the aperture of a ferrite ring 117 that defines the core of a high efficiency transformer. Conductor 67 defines the primary of the transformer. A toroidal winding 119 defines the secondary of the transformer and provides a receiver pick-up signal that is coupled to receiver circuitry via a coaxial cable 121. The first receiving antenna assembly has the same construction as the second receiving antenna assembly, and a coaxial cable 123 extends from it through junction box 113 as shown in FIG. 2E to couple the pick-up signal from the first receiving antenna assembly to the receiver circuitry.

4. Overview of Prior Art Logging Operations

Figure 3A:
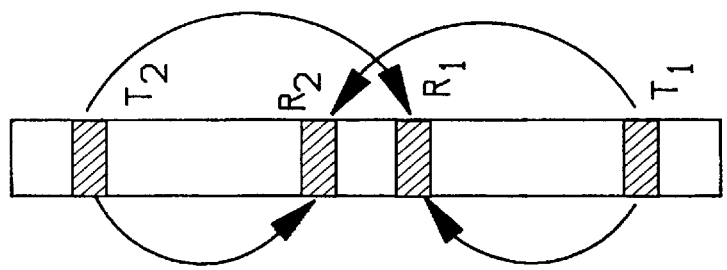
FIG. 3A is a schematic depiction of the operation of prior art transmitting and receiving antennas.
Figure 3A:
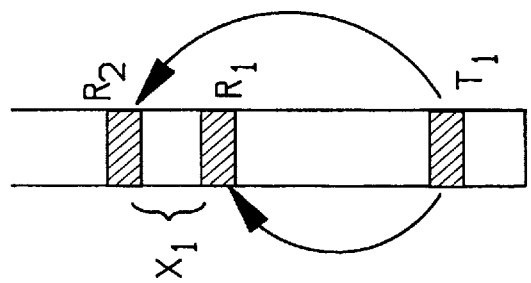
Figure 3A:
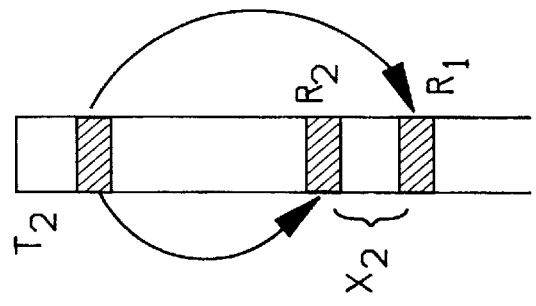

The operation of the logging tool which utilizes the present invention is depicted in schematic and graphical form in FIGS. 3A, 3B, 3C, 3D, and 3E for a particular antenna configuration. As is depicted in FIG. 3A transmitting antennas $T_1$, $T_2$ are spaced on both sides of a pair of receiving antennas $R_1$, $R_2$, allowing the measurement of both phase and amplitude. As discussed in detail above, the transmitters and receivers are simple antennas consisting of a loop of wire imbedded in an insulating material, with tuning capacitors to trim the antenna response. The tool can be through of as a pair of sensors, whose output is the average of two readings, reducing tool error from the temperature and pressure affects, tool misalignment, borehole washout and bed shoulder effects. In a vacuum, the velocity of electromagnetic radiation leads to a small phase shift between the two receivers $R_1$, $R_2$, while the increased distance to the far receiver causes the signal strength to be weaker at that point. In a more conductive formation, the radiation moves more slowly and attenuates more rapidly. As a result, either the difference in phase and/or the attenuation between the two receivers, or the ratio of amplitudes may be used to measure formation resistivity. The amplitude of a receiver signal is proportional to the field strength at the antennas and is measured in the units of volts. The attenuation between two receivers is defined as $20 \log {V_1}/{V_2}$ where $V_1$ is the amplitude of the output of receiver and $V_2$ is the output of Receiver 2. Attenuation is measured in dB (decibels). Attenuation is 20 log of the amplitude ratio. As is shown in FIG. 3A, two attenuation and phase readings are made, and then averaged. In these figures, the "X"s represent phase difference or attenuation. An upper transmitter reading $X_2$ is made utilizing upper transmitting antenna $T_2$ to propagate an electromagnetic wave outward and into the formation, and then back to be measured by the intermediate receiving antennas $R_1$, $R_2$. Then, the lower transmitter reading $X_1$ is made utilizing lower transmitting antenna $T_1$ to send an electromagnetic wave outward into the formation, and then back to be measured by intermediate receiving antennas $R_1$, $R_2$. The compensated reading is the arithmetic average of lower transmitter reading $X_1$ and upper transmitter reading $X_2$.

Figure 3B:
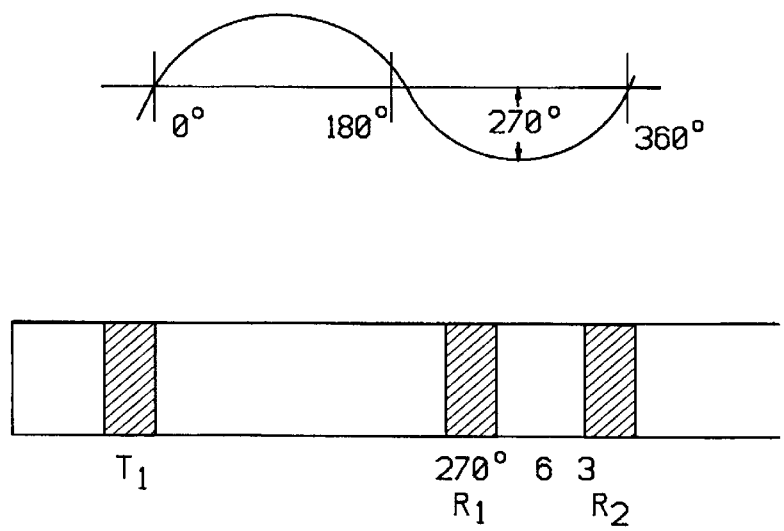
FIG. 3B depicts the phase shit which is detected by the prior art receiving antennas.
Figure 3C:
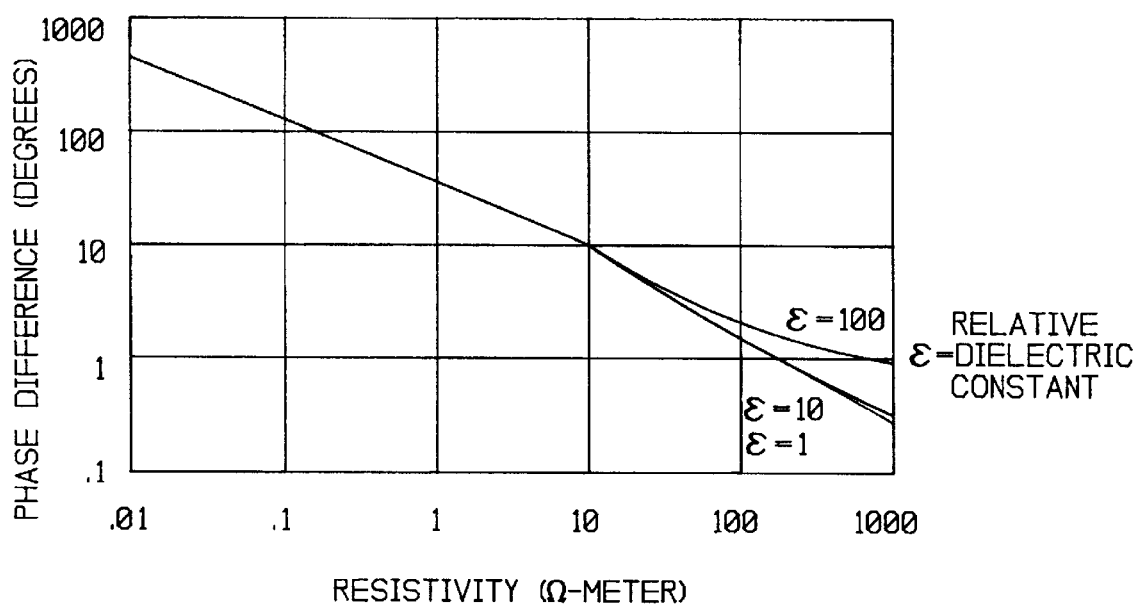
FIG. 3C is a graph which depicts the relationship between resistivity and the detected phase shift.

In the preferred embodiment, the primary measurement is phase resistivity which can be described with reference to FIG. 3B. It is easy to see from this illustration that the greater the spacing between the two receiving antennas $R_1$, $R_2$, the larger the observed phase difference between the receiving antennas. The phase measurement is converted to resistivity, with only small effects from the dielectric constant, after averaging the values from both transmitters. FIG. 3C is a graph which plots resistivity in Ohm-meters to phase difference in units of degrees. A family of curves is shown for different relative dielectric constants (for the specific dielectric constant values of 1, 10, and 100).

Figure 3D:
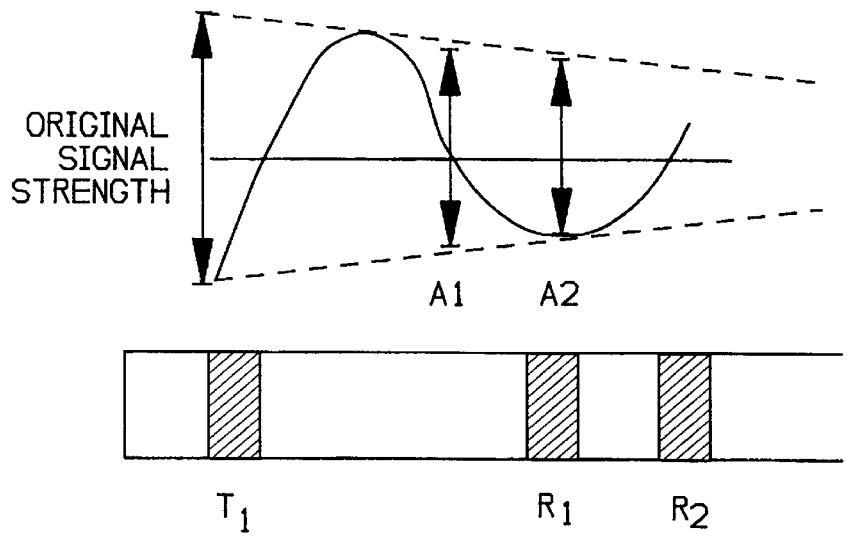
FIG. 3D graphically depicts the amplitude attenuation of the interrogating signal.
Figure 3E:
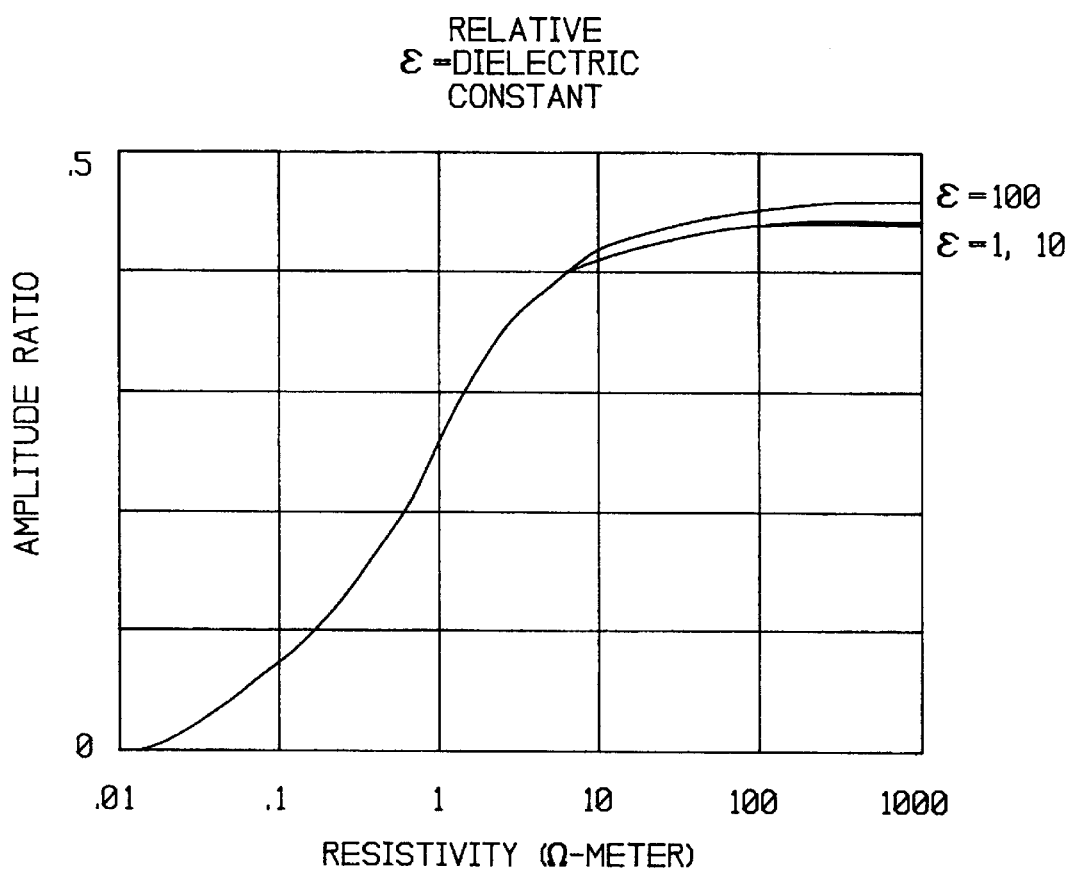
FIG. 3E depicts he graph of the relationship between resistivity and the amplitude ratio.

FIG. 3D depicts the amplitude attenuation which occurs as the electromagnetic wave propagates through the formation. A two megahertz wave, under downhole conditions, propagates only a few feet before the signal strength fades away, so the rate of attenuation of amplitude ratio of the signal is also measured. FIG. 3D graphically depicts the attenuation of the signal from its original signal strength as it passes through the surrounding formation. Measurements made at receiving antennas $R_1$, $R_2$ can be used to develop an amplitude ratio which is representative of the amount of attenuation that the interrogating signal experiences as it travels between receiving antenna $R_1$ and receiving antenna $R_2$. In the preferred embodiment of the present invention, the tool utilizes a microprocessor with memory to store values of the amplitude for each transmitter into memory, and then computes the attenuation for each transmitter, averaging the values for each transmitter to produce a compensated attenuation. The attenuation of amplitude ratio is then transformed to resistivity. FIG. 3E is a graph which plots the relationship of resistivity in units of Ohm-meters to the amplitude ratio, for a plurality of differing relative dielectric constants (and specifically for the relative dielectric constant values of 1, 10, and 100).

The following discussion illustrates how the dual transmitter, dual receiver measurement-while-drilling apparatus of the present invention is utilized to derive an accurate measure of the amplitude attenuation and phase shift of the interrogating electromagnetic signal which travels through the borehole and surrounding formation.

First, consider four transmitter-to-receiver signals:
(Transmitter 1 [X1] to Receiver 1 [R1]): $A_{11} \, e^{i\phi 11}$
(Transmitter 2 [X1] to Receiver 2 [R2]): $A_{12} \, e^{i\phi 12}$
(Transmitter 2 [X2] to Receiver 1 [R1]): $A_{21} \, e^{i\phi 21}$
(Transmitter 2 [X2] to Receiver 2 [R2]): $A_{22} \, e^{i\phi 22}$
The measured amplitudes are made up of:

$$A_{mn} = X_m \, R_n \, a_{tmn} \qquad \text{EQUATION NO. 4.1}$$

where
$X_m$=transmitter output variation
$R_n$=receiver sensitivity variation
$a_{tmn}$=true amplitude (transmitter M to receiver N);
and the measured phases are made up of:

$$\phi_{mn} = \phi_{Xm} + \phi_{Rn} + \phi_{tmn} \qquad \text{EQUATION NO. 4.2}$$

where
$\phi_{Xm}$=transmitter phase (output) variation
$\phi_{Rn}$=receiver phase variation
$\phi_{tmn}$=true phase (transmitter M to receiver N)
The foregoing general equations correspond to the following more specific equations:

$$A_{11} = X_1 \, R_1 \, a_{t11} \qquad \text{EQUATION NO. 4.3}$$

$$A_{12} = X_1 \, R_2 \, a_{t12} \qquad \text{EQUATION NO. 4.4}$$

$$A_{21} = X_2 \, R_1 \, a_{t21} \qquad \text{EQUATION NO. 4.5}$$

$$A_{22} = X_2 \, R_2 \, a_{t22} \qquad \text{EQUATION NO. 4.6}$$

$$\phi_{11} = \phi_{X1} + \phi_{R1} + \phi_{t11} \qquad \text{EQUATION NO. 4.7}$$

$$\phi_{12} = \phi_{X1} + \phi_{R2} + \phi_{t12} \qquad \text{EQUATION NO. 4.8}$$

$$\phi_{21} = \phi_{X2} + \phi_{R1} + \phi_{t21} \qquad \text{EQUATION NO. 4.9}$$

$$\phi_{22} = \phi_{X2} + \phi_{R2} + \phi_{t22} \qquad \text{EQUATION NO. 4.10}$$

Taking ratios of the various transmitter-to-receiver signals produces the following:
For Transmitter 1:

$$\frac{A_{12} e^{i\phi 12}}{A_{11} e^{i\phi 11}} = \frac{A_{12}}{A_{11}} \, e^{i(\phi 12 - \phi 11)} \qquad \text{EQUATION NO. 4.11}$$

and for Transmitter 2:

$$\frac{A_{21} e^{i\phi 21}}{A_{22} e^{i\phi 22}} = \frac{A_{21}}{A_{22}} * e^{i(\phi 21 - \phi 22)} \qquad \text{EQUATION NO. 4.12}$$

Multiplying these and taking the square root gives:

$$\sqrt{\frac{A_{12}}{A_{11}} * e^{i(\phi 12 - \phi 11)} * \frac{A_{21}}{A_{22}} * e^{i(\phi 21 - \phi 22)}} \qquad \text{EQUATION NO. 4.13}$$

which can be simplified as:

$$\sqrt{\frac{A_{12} * A_{21}}{A_{11} * A_{22}}} \, e^{i 1/2 (\phi 12 + \phi 21 - \phi 11 - \phi 12)} \qquad \text{EQUATION NO. 4.14:}$$

Straightforward algebraic manipulation of the foregoing equations yields:

$$\sqrt{\frac{a_{t12} * a_{t21}}{a_{t11} * a_{t22}}} \, e^{i 1/2 (\phi t12 + \phi t21 - \phi t11 - \phi t12)} \qquad \text{EQUATION NO. 4.15:}$$

because all the system variables drop out of the measurement.

Therefore, by using two transmitters and two receivers, systematic variables can be removed from both the attenuation (amplitude) and from the phase velocity (phase difference) terms.

Within the contest of the preferred embodiment of this invention, in which a sampled-data processing means produces a signal as a function of formation resistivity based on phase-representing signals, the following analysis demonstrates certain matter relevant to the stability feature.

Consider two consecutive samples. Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes a second receiving coil (R2), and later passes the first receiving coil (R1), and induces each receiver coil to produce a signal.

Let φMR2A represent the measured phase of the signal produced by receiver coil R2 during Sample A; let φMR1A represent the measured phase of the signal produced by receiver coil R1 during Sample A; let φMR1B represent the measured phase of the signal produced by receiver coil R1 during Sample B; and let φMR2B represent the measured phase of the signal produced by receiver coil R2 during Sample B.

The φMR2A signal depends on the phase of the wave at the location of R2, and in general, has an error component attributable to various phase shifts including those introduced by the tuned receiver coil, cabling from the receiver coil to the receiver, and the receiver itself. Let φTR2A represent the true phase of the wave at the location or R2 during Sample A, and let φR2E represent the error component so introduced.

$$\phi MR2A = \phi TR2A + \phi R2E \qquad \text{EQUATION NO. 4.16}$$

Similarly, the φMR1A signal depends on the phase of the wave at the location or R1, and in general, has its own error component. Let φTR1A represent the true phase of the wave at the location of R1 during Sample A, and let φR1E represent the error component so introduced.

$$\phi MR1A = \phi TR1A + \phi R1E \qquad \text{EQUATION NO. 4.17}$$

During Sample A, the φMR1A signal and the φMR2A are simultaneously processed to produce a DeltaA signal that represents the difference in phase between these two signals (i.e., φMr1A−φMR2A).

$$\text{Delta } A = (\phi TR2A - \phi TR1A) + (\phi R2E - \phi R1E) \qquad \text{EQUATION NO. 4.18}$$

The component of the DeltaA signal representing the true phase difference ($\phi TR2A - \phi TR1A$) is a function of the resistivity of the formation in the region between the two receiver coils. Let F(rho) represent this component.

$$Delta A = F(\text{rho}) + (\phi R2E - \phi R1E) \qquad \text{EQUATION NO. 4.19}$$

Similarly, during Sample B, the $\phi MR2B$ signal and the $\phi MR1B$ are simultaneously processed to produce a DeltaB signal that represents the difference in phase between these two signals (i.e., $\phi MR2B - \phi MR1B$).

$$\phi MR1B = \phi TR1B + \phi R1E \qquad \text{EQUATION NO. 4.20}$$

$$\phi MR2B = \phi TR2B + \phi R2E \qquad \text{EQUATION NO. 4.21}$$

$$Delta B = (\phi TR1B - \phi TR2B) + (\phi R1E - \phi R2E) \qquad \text{EQUATION NO. 4.22}$$

The component of the DeltaB signal representing the true phase difference ($\phi TR1B - \phi TR2B$) is a function of the resistivity of the formation in the region between the two receiver coils; I.e., it equals f(rho).

$$Delta B = f(\text{rho}) + (\phi R1E - \phi R2E) \qquad \text{EQUATION NO. 4.23}$$

The Delta A signal is recorded so that is can be retrieved and processed with the Delta B signal.

$$Delta A + Delta B = 2 * f(\text{rho}) + \phi R2E - \phi R2E - \phi R1E - \phi R2E + \phi R1E \qquad \text{EQUATION NO. 4.24}$$

and $$f(\text{rho}) = \tfrac{1}{2} * (Delta A + Delta B)$$

In other words, a computed signal representing the sum of the consecutive samples is a function of formation resistivity, and error components such as $\phi R1E$ and $\phi R2E$ do not introduce errors into this computed signal.

Figure 3F:
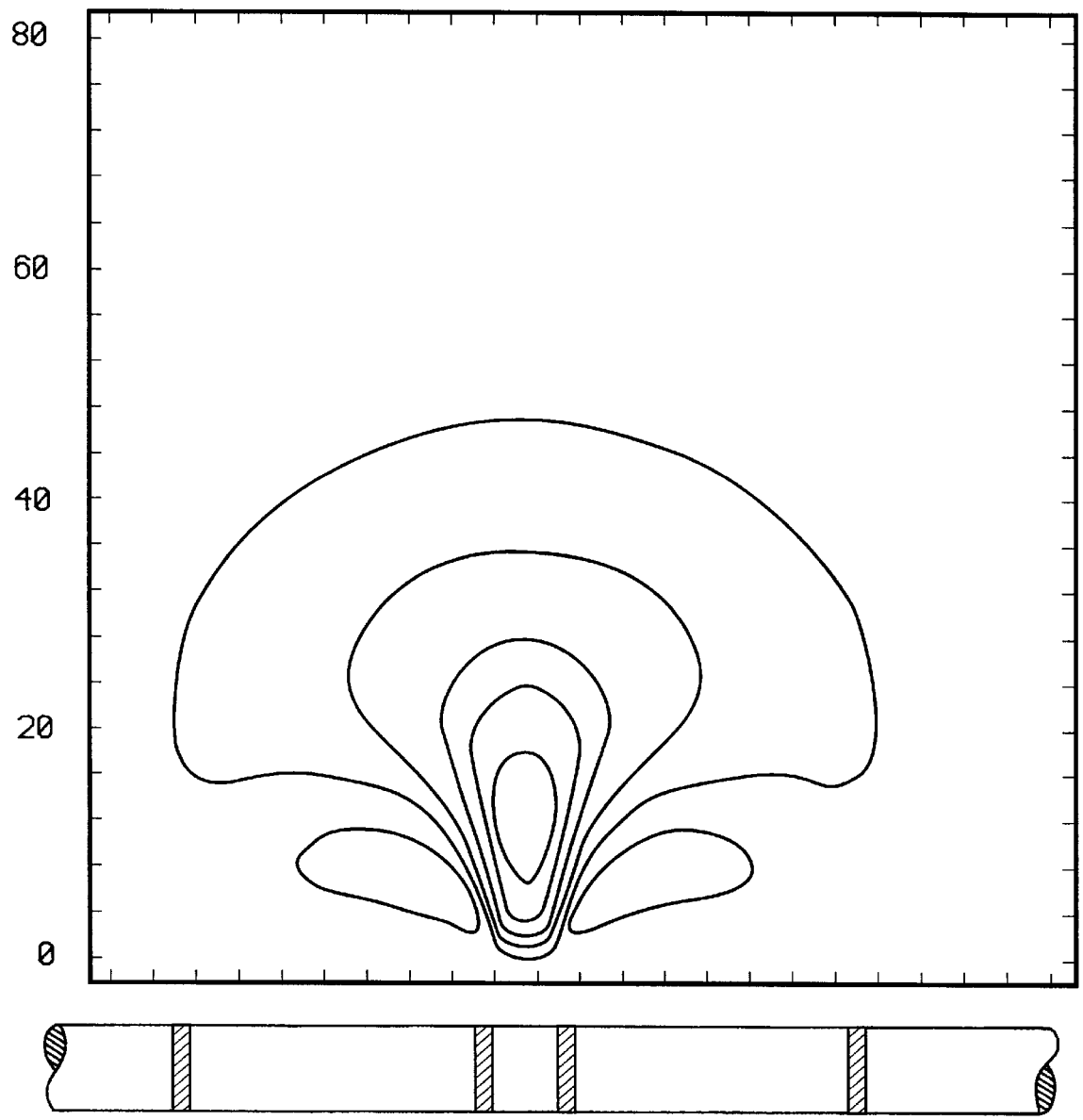
FIGS. 3F and 3G graphically depict the multiple depths of investigation that can be obtained using amplitude and phase measurements.
Figure 3G:
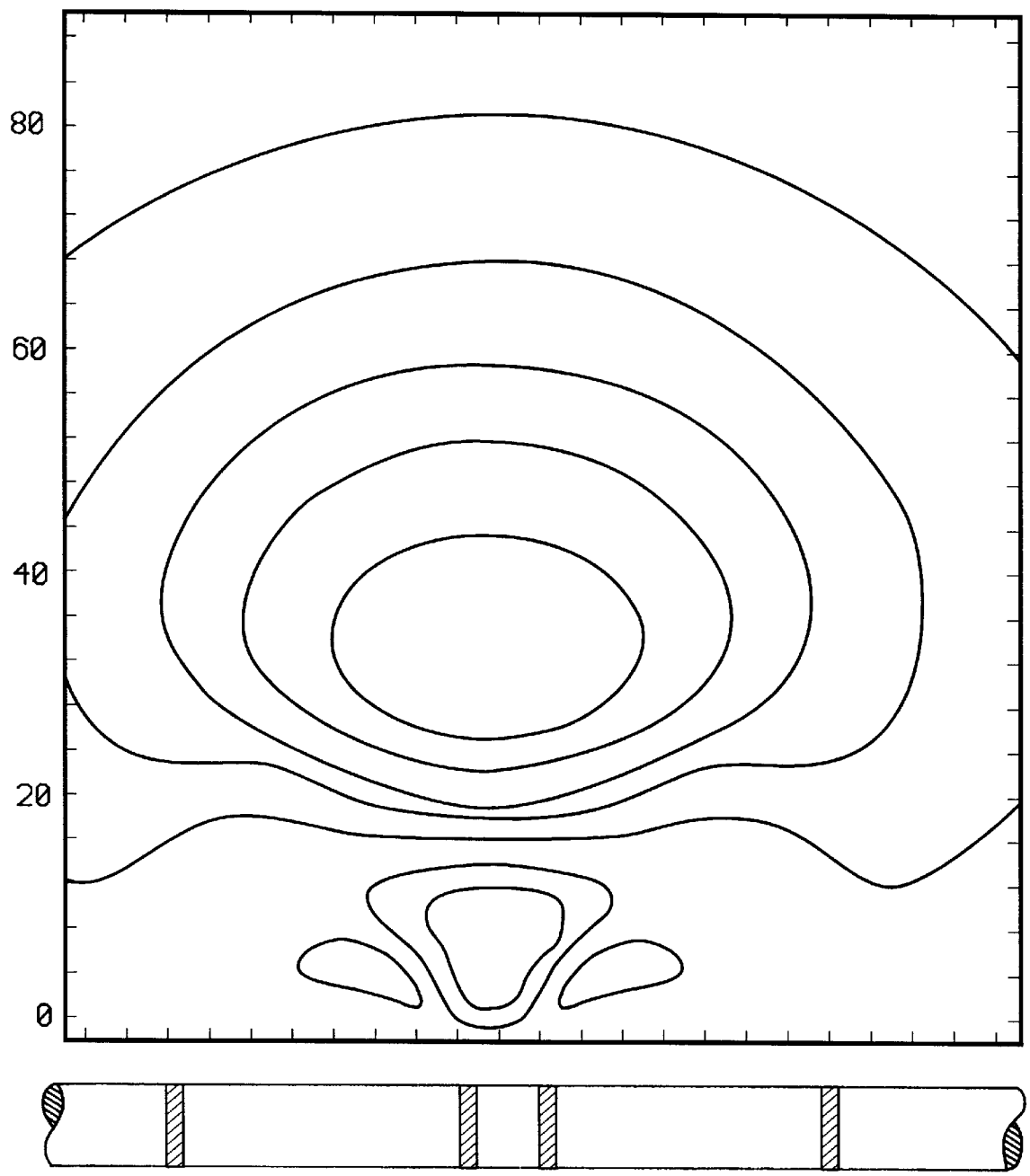

FIGS. 3F and 3G illustrate, in simplified form, the general nature of the amplitude and phase measurements, at the frequency range of interest herein, and are useful in understanding relative depths of investigation attributable to amplitude and phase measurements of signals transmitted from the same location in the same formations. The figures shown the regions around the tool which affect the measurement of resistivity from phase difference. FIGS. 3F and 3G show contour plots of the effect of a small change in formation resistivity respectively. The lightest shading shows the regions with the most effect. As can be seen the light regions go out farther for the attenuation plot than the phase plot.

It is seen from the diagrams of FIGS. 3F and 3G that the lines of constant phase are nearly circular and are concentric with the transmitter. The lines of constant amplitude are not circular, but project farther in the radial direction than in the vertical direction. The attenuation measured between the two receivers is seen to be characteristic of a significantly deeper radial zone than is the phase shift measured between the two receivers. This illustration uses magnetic dipole theory for a homogenous medium, but models which take into account the effect of the drill collar, borehole, etc. produce the same result; namely, attenuation provides a deeper radial depth of investigation than does phase shift. Logging Operations in Accordance with the Present Invention FIGS. 3H, 3I, and 3J are schematic depictions of logging operations conducted utilizing the closely-spaced transmitter embodiment of the present invention. As is shown in FIG. 3H, the amplitude attenuation or phase shift may be determined by utilizing transmitters $T_1$ and $T_2$ generate an interrogating electromagnetic field which is measured by receivers $R_1$ and $R_2$. In the preferred embodiment, the transmitting antennas $T_1$, $T_2$ are successively energized, and successive measurements are made with receiving antennas $R_1$, $R_2$. The transmission paths for the electromagnetic interrogating field are defined in the view of FIG. 3H. Transmission path $X_{11}$ defines the transmission path between the near transmitter $T_1$ and the receiving antenna $R_1$. Transmission path $X_{21}$ defines the transmission path between the far transmitter $T_2$ and receiving antenna $R_1$. Transmission path $X_{22}$ defines the transmission path between near transmitter $T_2$ and receiving antenna $R_2$. Transmission path $X_{12}$ defines the transmission path between the far transmitter $T_1$, and receiving $R_2$.

The amplitude attenuation and phase shift can be determined from measurements with receiving antenna $R_1$ as follows. First, transmitting antenna $T_1$ is energized. The interrogating electromagnetic field passes through the borehole and surrounding formation, and is measured by receiving antenna $R_1$. Then, transmitting antenna $T_1$ is turned off, and transmitting antenna $T_2$ is turned on. The interrogating electromagnetic field passes through the borehole surrounding formation and is measured by receiving antenna $R_1$ The measurements are compared to determine the amplitude attenuation and phase shift of the interrogating electromagnetic field. The difference in amplitude between the interrogating magnetic field which passes through transmission path $X_{22}$ and the electromagnetic field which passes through transmission path $X_{12}$ provides a measure of the amplitude attenuation. The difference in phase between the electromagnetic field (as measured) which passes through transmission path $X_{22}$ as compared to the electromagnetic field which passes through transmission path $X_{1F}$ provides a measure of the phase shift.

Measurements can also be taken in the other direction. Transmitting antenna $T_2$ may be turned off, and transmitting antenna $T_1$ utilized to generate an interrogating electromagnetic field which passes through transmission path $X_{12}$. Then, transmitting antenna $T_1$ is turned off, and transmitter antenna $T_2$ is utilized to generate an interrogating electromagnetic field which passes through the borehole and surrounding formation along transmission path $X_{22}$. Measurements are taken utilizing receiving antenna $R_2$. The amplitude attenuation and phase shift between the measurements made by receiving antenna $R_2$ provides a measure of the formation resistivity.

Alternatively we may turn $T_1$ on and measure $X_{12}$ and $X_{11}$. Then turn $T_1$ off and turn $T_2$ on and measure $X_{21}$ and $X_{22}$.

The compensated reading for the antenna configuration of FIG. 3H is as follows:

$$\text{compensated reading} = \sqrt{\frac{X_{12} + X_{21}}{X_{22} + X_{11}}} \qquad \text{EQUATION NO. 5.1:}$$

The compensated reading for the antenna configuration of FIG. 3I is as follows:

$$\frac{\text{compensated reading}}{\text{(inner receivers)}} = \sqrt{\frac{X_{13} * X_{22}}{X_{23} * X_{12}}} \qquad \text{EQUATION NO. 5.2:}$$

-continued $$\frac{\text{compensated reading}}{\text{(outer receivers)}} = \sqrt{\frac{X_{21} * X_{14}}{X_{11} * X_{24}}} \qquad \text{EQUATION NO. 5.3:}$$

The well know reciprocity theorem for electromagnetic systems states that "a current in one antenna which causes a voltage in a second antenna is equivalent to the same current in the second antenna causing a voltage in the first antenna". According to this lay of physics one may interchange transmitters and receivers in a system and if the same signal is transmitted the same signal will be received. With reference to FIG. 3H this means that the signal received at receiver R1 from transmitter T2 will be the same if transmitter T2 and receiver R1 are interchanged.

Let SiJ be the signal receiver at receiver Rj from transmitter Ti over propagation path Xij. For the tool depicted in 3H we measure phase and amplitude of S11, S12, S21, S22. From these readings we can construct a compensated measurement just as previously described in the prior art.

EQUATION 5.4:
$$M = \sqrt{\frac{S_{21}}{S_{11}} \frac{S_{12}}{S_{22}}} = \ldots \sqrt{\frac{A_{21} A_{12}}{A_{11} A_{22}}} \; e^{i(\phi_{12} + \phi_{21} - \phi_{11} - \phi_{22})}$$

As can be seen the same type of measurement can be achieved by replacing transmitters with receivers in FIG. 3A to get FIG. 3H. Note that the receivers are separated in the present invention much more than in the prior art. Because interference or cross talk between then is an inversed function of separation the receivers have much less cross talk in the present invention.

Figure 3L:
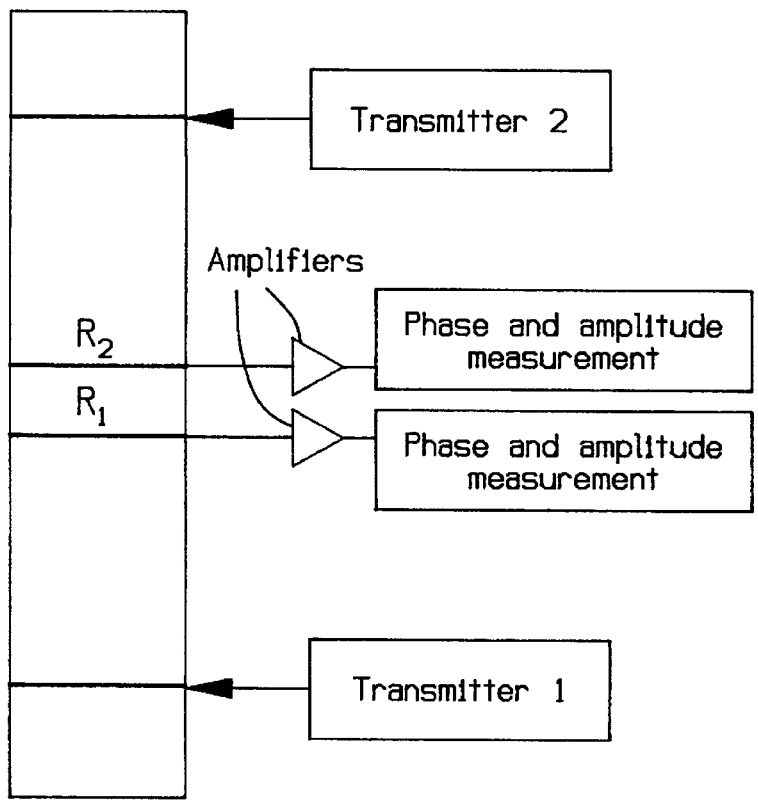
FIG. 3L (Prior Art) shows the configuration of receivers commonly used.
Figure 3M:
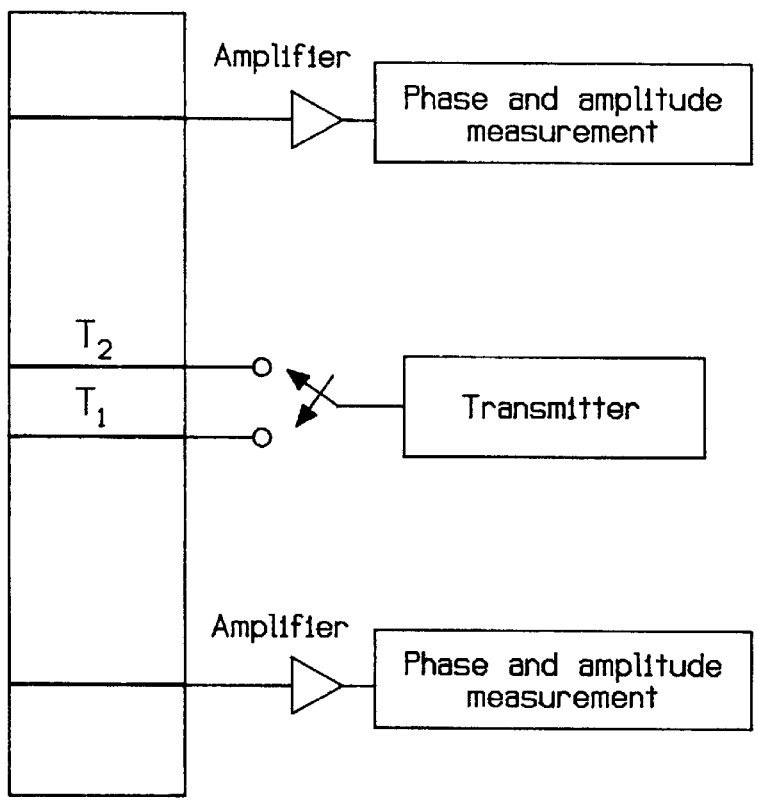
FIG. 3M shows the arrangement of transmitters and receivers in the present invention for avoiding mutual coupling.

An advantage of the present invention over the prior art can be seen by referring to FIGS. 3L and 3M. In the prior art (FIG. 3L) amplifiers are connected at all times to the receivers. These amplifiers amplify the current induced in R1 and R2 to measure phase and amplitude. These currents also cause cross talk between the receivers. This occurs for example when T1 is on and currents are being generated in R1 and R2. The current that was induced in R1 causes an added current in R2 which was not caused by the current in T1 and is therefore an error current.

In the present invention, depicted in FIG. 3M, the transmitters are close together rather than the receivers. When T1 is turned on the switch shown leaves T2 in an open circuit state and no current an flow. The currents in receivers R1 and R2 are therefore influenced by only transmitter T1 and not by any secondary induced currents in transmitter T2. No unwanted cross talk between antennas can therefore occur.

FIG. 3I is a simplified schematic representation of the antenna configuration depicted in FIG. 1C. As is shown, transmitting antennas $T_1$, $T_2$ are disposed intermediate receiving antennas $R_1$, $R_2$, $R_3$, and $R_4$. This tool can be utilized to develop a multiple number of measurements of amplitude attenuation and phase shift of an interrogating electromagnetic field. For example, transmitting antenna $T_1$ may be utilized to generate an interrogating electromagnetic field which passes through the borehole and surrounding formation, and which is measured at receiving antennas $R_1$, $R_2$, $R_3$, and $R_4$. These measurements can be utilized to determine the amplitude attenuation and phase shift of the interrogating electromagnetic signal along transmission paths $X_1$ and $X_4$. Likewise, transmitting antenna $T_2$ may be utilized to generate an interrogating electromagnetic field which travels through the borehole and surrounding formation. Measurements can be made of the interrogating electromagnetic field utilizing receiving antennas $R_1$, $R_2$, $R_3$, $R_4$. These measurements can be utilized to generate a measure of the amplitude attenuation and phase shift of the interrogating electromagnetic field along transmission paths $X_2$ and $X_3$. This redundancy in measurement has some signal processing advantages, and can be utilized to derive a more reliable and stable measure of the formation resistivity, as will be demonstrated below in the following overview of the calculations performed utilizing these measurements.

The tool in FIG. 3I can be used to make two compensated measurements at different spacings for any particular integrating frequency. Using only the inner pair of receivers and the two transmitters we see that this is equivalent to FIG. 3H and the compensated phase and amplitudes are calculated from EQUATION 5.5:
$$M \text{ inner} = \sqrt{\frac{S_{13} S_{22}}{S_{23} S_{12}}} = \ldots \sqrt{\frac{A_{13} A_{22}}{A_{23} A_{12}}} \; e^{i(\phi_{13}+\phi_{22}-\phi_{23}-\phi_{12})}$$

and using only the outer receivers

EQUATION 5.6:
$$M \text{ outer} = \sqrt{\frac{S_{21} S_{14}}{S_{11} S_{24}}} = \ldots = \sqrt{\frac{A_{21} A_{14}}{A_{11} A_{24}}} \; e^{i(\phi_{21}+\phi_{14}-\phi_{11}-\phi_{24})}$$

The advantages of eliminating receiver cross talk is the same as described in FIG. 3H above. In addition, only one transmitter is needed instead of four.

In operation, one of the transmitter antennas is energized and four receiver antennas are measured. Then the other transmitter antenna is energized and measurements are again made at the four receiver antennas. The transmitter is therefore in the on state the same amount of time as in FIG. 3H. This configuration has therefore added an additional compensated measurement with no increase in transmitted power.

FIG. 3J is a simplified and schematic depiction of the antenna configuration depicted in FIG. 1D. In this configuration, it is necessary that a very precise knowledge of the interrogating electromagnetic field be utilized to define the interrogating electromagnetic field. First, transmitting antenna $T_1$ is energized, and measurements of the interrogating electromagnetic field are made utilizing receiving antenna $R_1$. Then, transmitting antenna $T_1$ is turned off, and transmitting antenna $T_2$ is turned on, and an electromagnetic field is propagated to the borehole surrounding formation. Receiving antenna $R_1$ is utilized to measure the interrogating electromagnetic field. The measurements are utilized as follows to determine the amplitude attenuation and phase shift of the interrogating electromagnetic field. We simply divide $S_{21}$ by $S_{11}$ and evaluate phase and amplitude as was done in prior art.

FIG. 3K will now be utilized to describe the basic operation of the simultaneous transmission embodiment of the present invention. In this embodiment, multiple transmitter antennas are simultaneously energized to generate electromagnetic interrogating fields which propagate through the borehole surrounding formation. FIG. 3K1 depicts the basic tool geometry. As is shown, receiving antennas $R_1$, $R_2$ are disposed intermediate transmitting antennas $T_1$, $T_2$. The definitions which are utilized are set forth in FIGS. 3K2 and 3K3. As is shown, if transmitting antenna $T_1$ is on, while transmitting antenna $T_2$ is off, a signal $V_1$ is detected at receiving antenna $R_1$ and a signal $V_2$ is detected at receiving antenna $R_2$. If, however, transmitting antenna $T_1$ is off, and transmitting antenna $T_2$ is on, the signal $\overline{V}_1$ is detected at receiving antenna $R_1$, and signal $\overline{V}_2$ is detected at receiving antenna $R_2$.

Figure 6A:
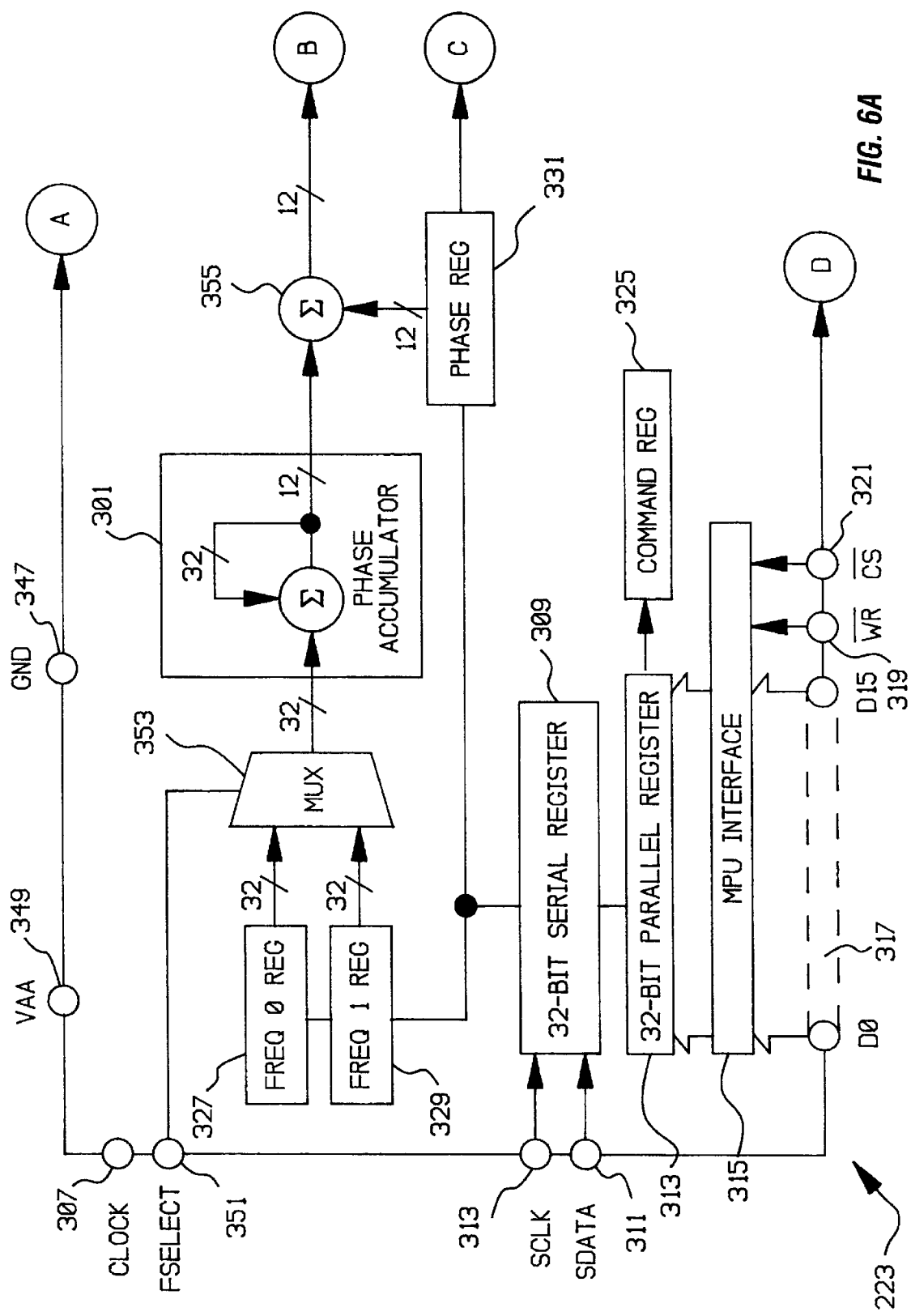
FIGS. 6A and 6B together provide a block diagram view of one of the numerically-controlled oscillators of the block diagram of FIG. 5A.
Figure 6B:
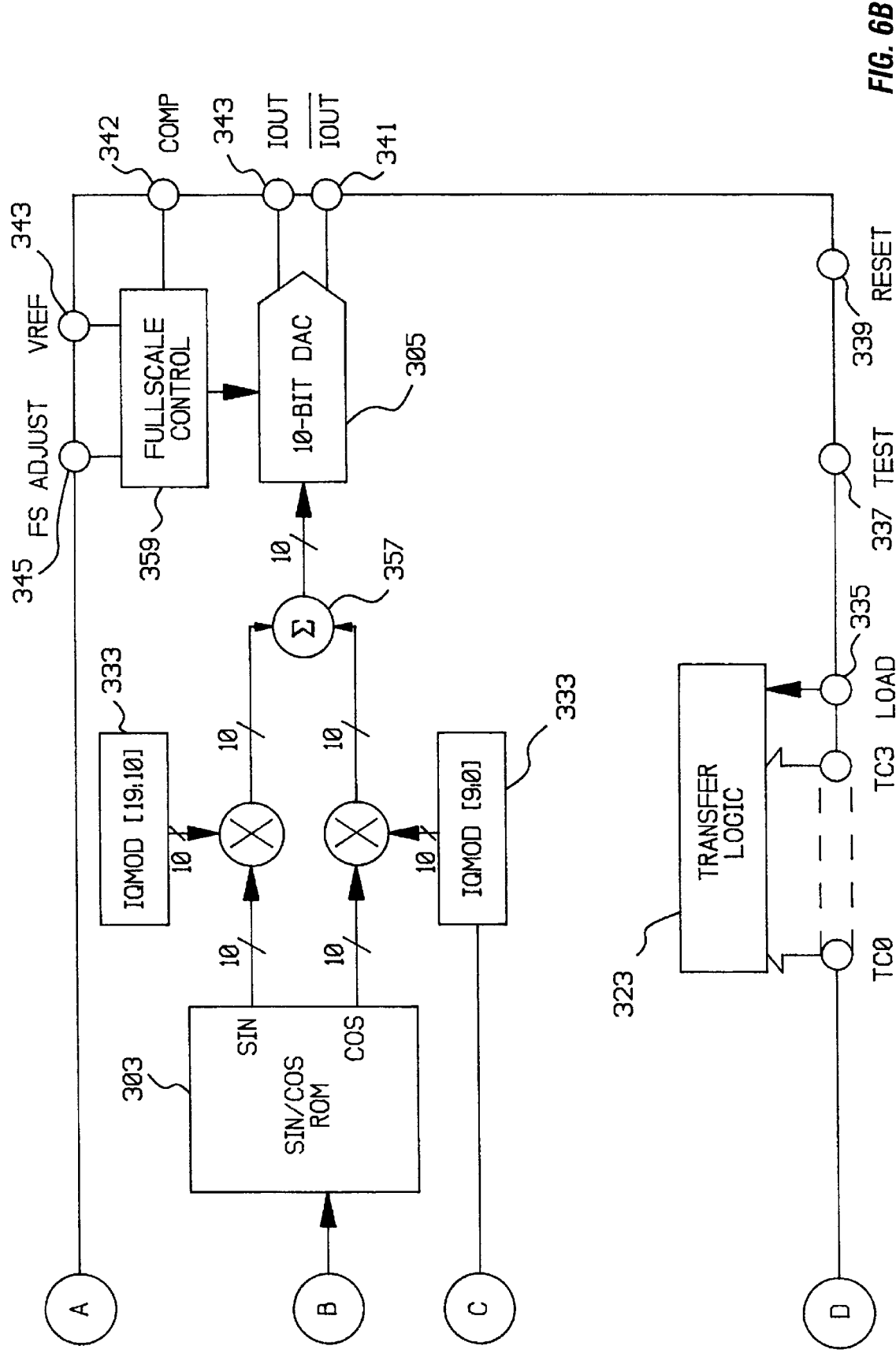
Figure 7:
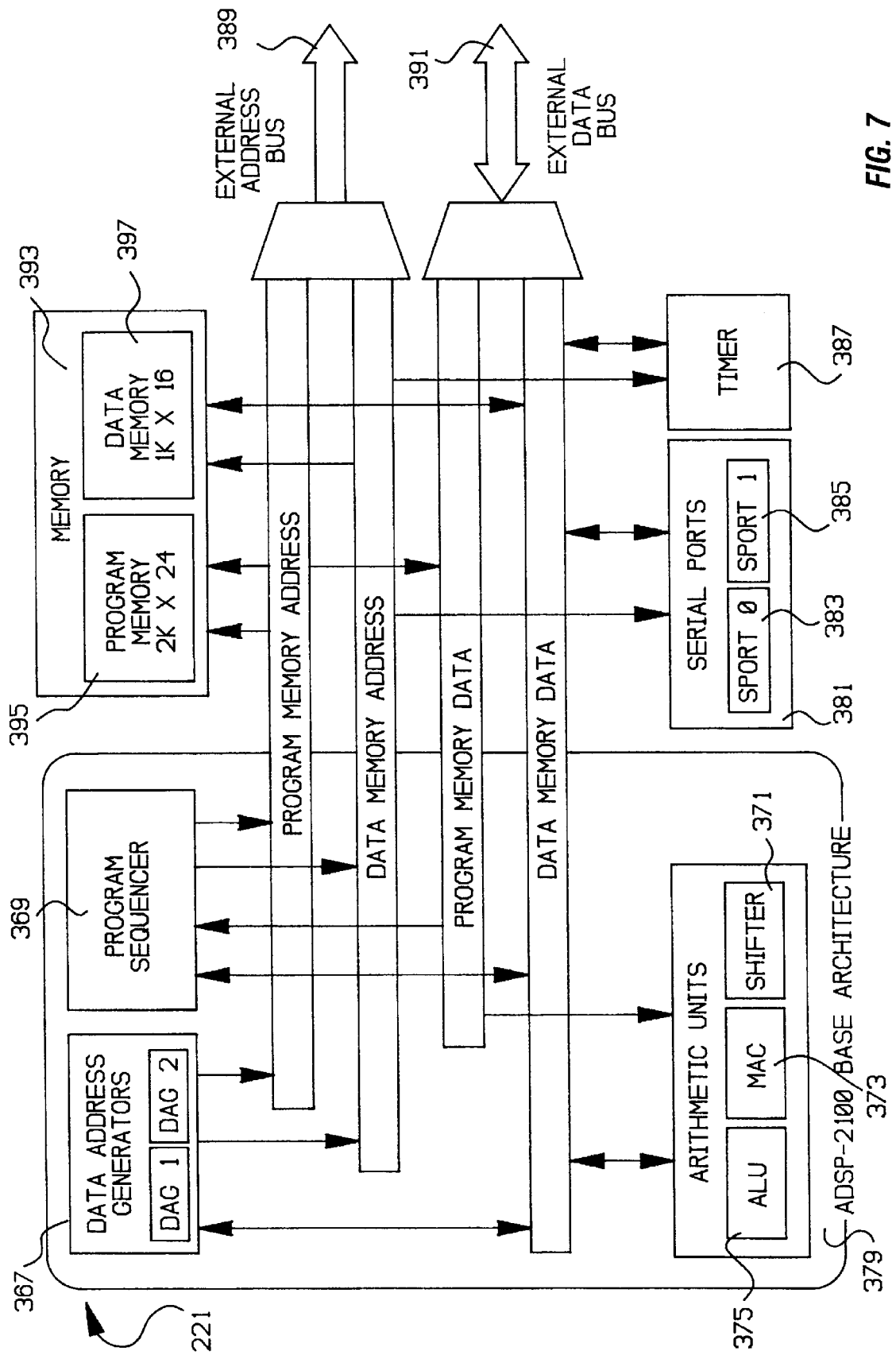

With these definitions in mind, the four basic steps of the measurement operation are depicted in FIGS. 3K4 through 3K7. First, with reference to FIG. 3K4, if transmitting antennas $T_1$, $T_2$ are both on and receiving antenna $R_2$ is turned off, the signal detected at receiving antenna $R_1$ is the signal $V_1+\tilde{V}_1$. Next, in accordance with step 2, which is depicted in FIG. 3K5, with transmitting antennas $T_1$ and $T_2$ turned on, and receiving antenna $R_1$ turned off, the measurement made by receiving antenna $R_2$ is the signal $V_2+\tilde{V}_2$. During steps 1 and 2, the signal utilized to energize the transmitting antennas $T_1$, $T_2$ is identical in amplitude, phase and frequency. In steps 3 and 4, which are depicted in FIGS. 3K6 and 3K7, a predetermined phase component is introduced into a selected one of the transmitting antennas. For illustration we will use 180° as the phase component. As is shown in FIG. 3K6, this predetermined phase component is introduced into the signal originating from transmitting antenna $T_1$. Both transmitting antennas $T_1$ and transmitting antenna $T_2$ are turned on, and receiving antenna $R_2$ is turned off. In this configuration, the receiving antenna $R_1$ makes a measurement of the signal $V_1-\tilde{V}_1$. Next, in accordance with step 4, which is depicted in FIG. 3K7, transmitting antennas $T_1$ and $T_2$ are turned on, and receiving antenna $R_1$ is turned off. In this configuration, receiving antenna $R_2$ makes a measurement of signal $V_2-\tilde{V}_2$. we can now solve for $$V_1 = \frac{(V_1 + \tilde{V}_1) + (V_1 - \tilde{V}_1)}{2} \quad \text{EQUATION 5.7:}$$

$$V_2 = \frac{(V_2 + \tilde{V}_2) + (V_2 - \tilde{V}_2)}{2} \quad \text{EQUATION 5.8:}$$

which we treat as is done in prior art.

It is especially important that, during measurement operations, only a single receiving antenna be turned on. This eliminates the influence of undesired mutual coupling between the receiving antennas. However, it is not necessary that the receiving antennas be consecutively engaged, and in alternative embodiments they may be simultaneously on, provided that the undesirable effects of magnetic mutual coupling may be removed by other means.

Additionally, switching of transmitters off and on can introduce small errors because as with any state change there can be transients. Leaving the transmitters in the "on" state continuously eliminates the state change induced errors.

6. The Operation of the Logging Tool

Two different types of logging tools will now be described. The first one is depicted in FIGS. 4A, 4B, 4C, 4D, 4E, 4F, and 4G. The second embodiment is depicted in FIGS. 5A, 5B, 5C, 5D, 6A, 6B, 7, 7A, 8B, and 8C. This second embodiment is a more advanced embodiment, and utilizes numerically controlled oscillators and digital signal processors to obtain performance which cannot be obtained with the embodiment depicted in FIGS. 4A through 4G.

Figure 4A:
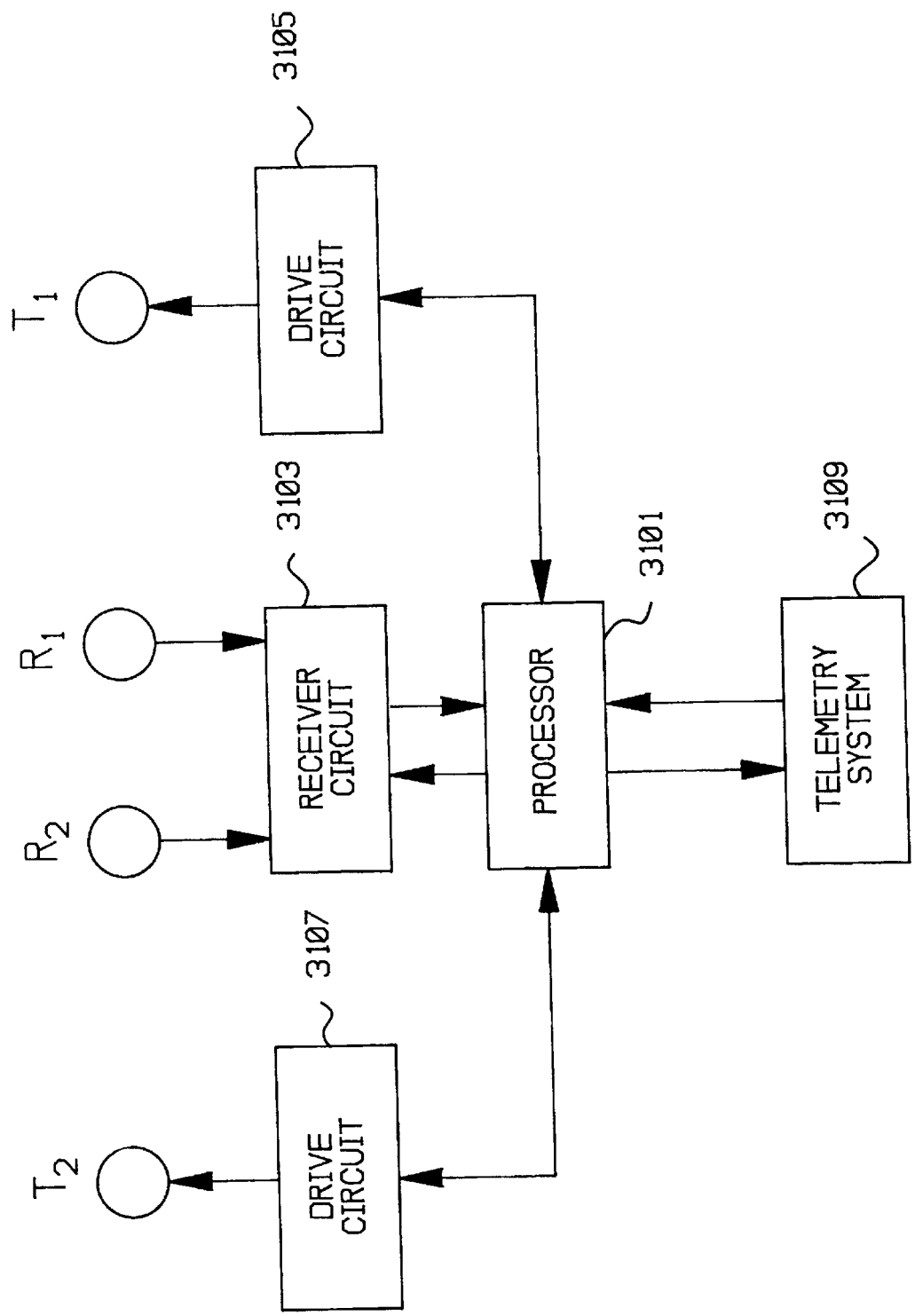
FIG. 4A is a block diagram view of the transmission and reception systems of the logging-while-drilling apparatus of the present invention.

FIGS. 4A, 4B, 4C, 4D, 4E, 4F, and 4G depict the prior art electronics carried by one type of logging tool in block diagram and electric schematic form. The particular antenna configuration depicted is that of FIG. 1E, although other configurations can be readily accommodated. As is shown in FIG. 4A, processor 3101 directs the operation of drive circuits 3105, 3107 and receiver circuit 3103. Drive circuit 3107 operates to energize selectively transmitting antenna $T_2$, while drive circuit 3105 operates to energize selectively transmitting antenna $T_1$. Receiver circuit 3103 receives the measurements of the electromagnetic field made by receiving antennas $R_1$, $R_2$. Processor 3101 supplies data to telemetry system 3109, and receives instructions from telemetry system 3109. Telemetry system provides the electrical commands to a mud pulse telemetry actuator which is in communication with a fluid column in the wellbore, and which is utilized to impress a coded message in the fluid column.

The principle components of the electronics carried by the logging tool, which are depicted in block diagram form in FIG. 4A, are depicted in detail in FIGS. 4B, 4C, 4D, 4E, 4F, and 4G.

Figure 4B:
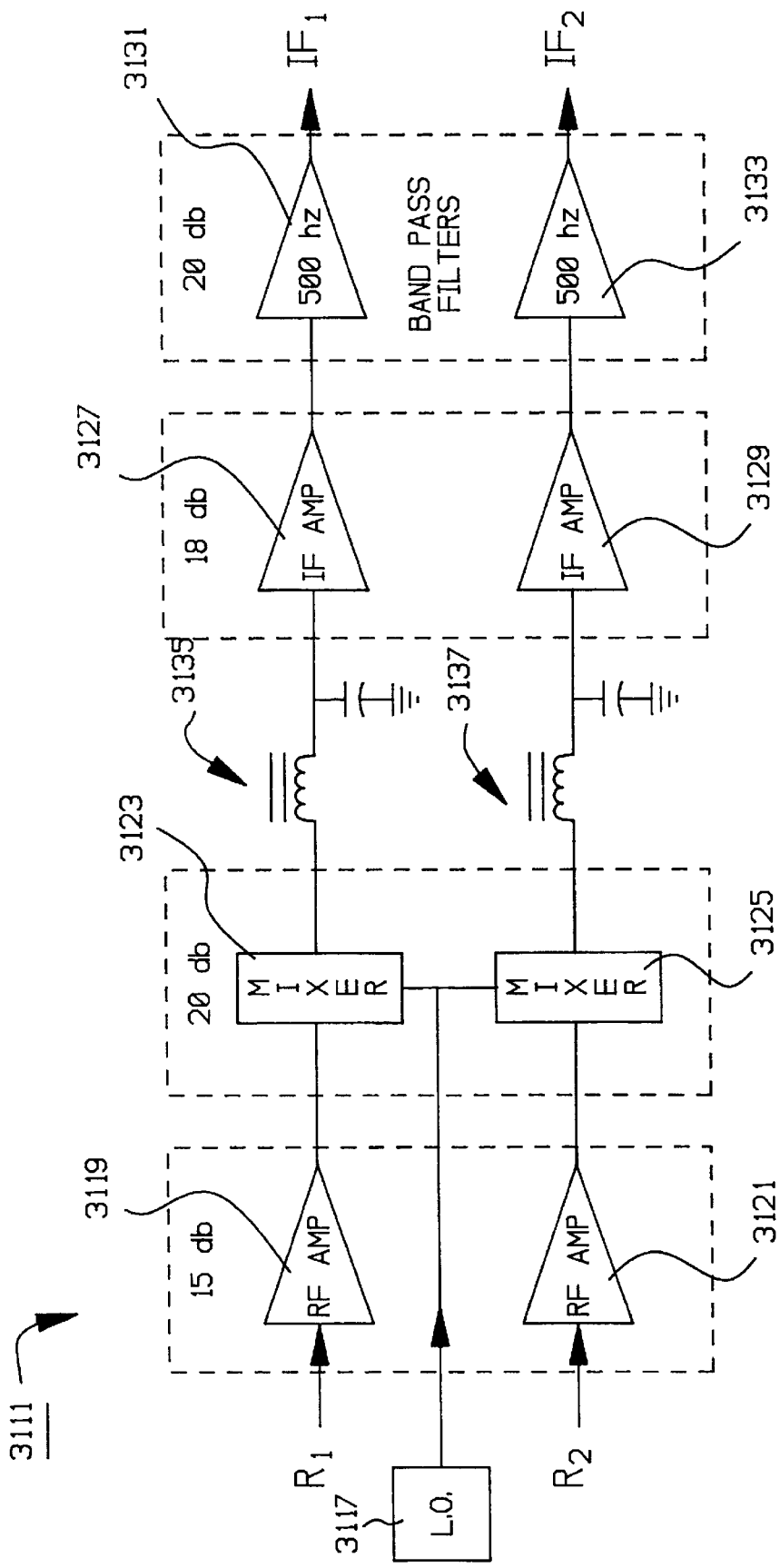
FIGS. 4B, 4C, 4D, 4E, and 4F are electrical schematics of a prior art receiver circuit.

First in broad overview with reference to FIG. 4B, there is depicted dual receiver 3111 in simplified electrical schematic form. In broad overview, the signals from receiving antennas $R_1$, $R_2$ are fed to dual receiver 3111. The signals are amplified at RF amplifiers 3119, 3121 and heterodyned with the output of the 1.995 megahertz local oscillator 3117, which provides a resultant 5 kilohertz intermediate frequency (IF). The intermediate frequency will retain the phase relationship of the two receiver signals by using a common oscillator for mixers 3123, 3125. The signals are passed to intermediate frequency (IF) amplifiers 3127, 3129 for further amplification. The signals are then passed through 500 hertz band pass filters 3131, 3133 before being fed to the amplitude/phase detector 3113 of FIGS. 4C and 4D.

Now more particularly but still with reference with FIG. 4B, the dual receiver 3111 of FIG. 4B receives the 2 megahertz signal from receiving antennas $R_1$, $R_2$, which are coupled to the input of RF amplifiers 3119, 3121. The coupling components are specifically selected to minimize phase shift with temperature. The RF amplifiers 3119, 3121 boost the signal by 15 db and the outputs are coupled to the balanced mixers 3123, 3125. The output of the local oscillator is injected to the mixer via a power splitter arrangement to provide equal amplitudes with zero degrees of phase shift to each mixer. The splitter, combine with a 6 dB attenuator, will ensure the proper level and also minimize cross talk between the two mixers. A balanced mixer is used to minimize local oscillator feed-through to the output. The mixer stage has a gain of 20 db. The mixer outputs are fed through five kilohertz low pass filters 3135, 3137 and coupled to the non-inverting input of IF amplifiers 3127, 3129, which provides an 18 db boost to the signal. The output of IF amplifier 3127, 3129 is fed through 500 hertz band pass filter op amps 3131, 3133 which provide a 20 db signal boost. This final amplification has a very high Q 500 hertz band pass filter. The passive components of the filter must be matched to ensure minimal phase shift with frequency and temperature. It is important that both filters remain matched.

Figure 4C:
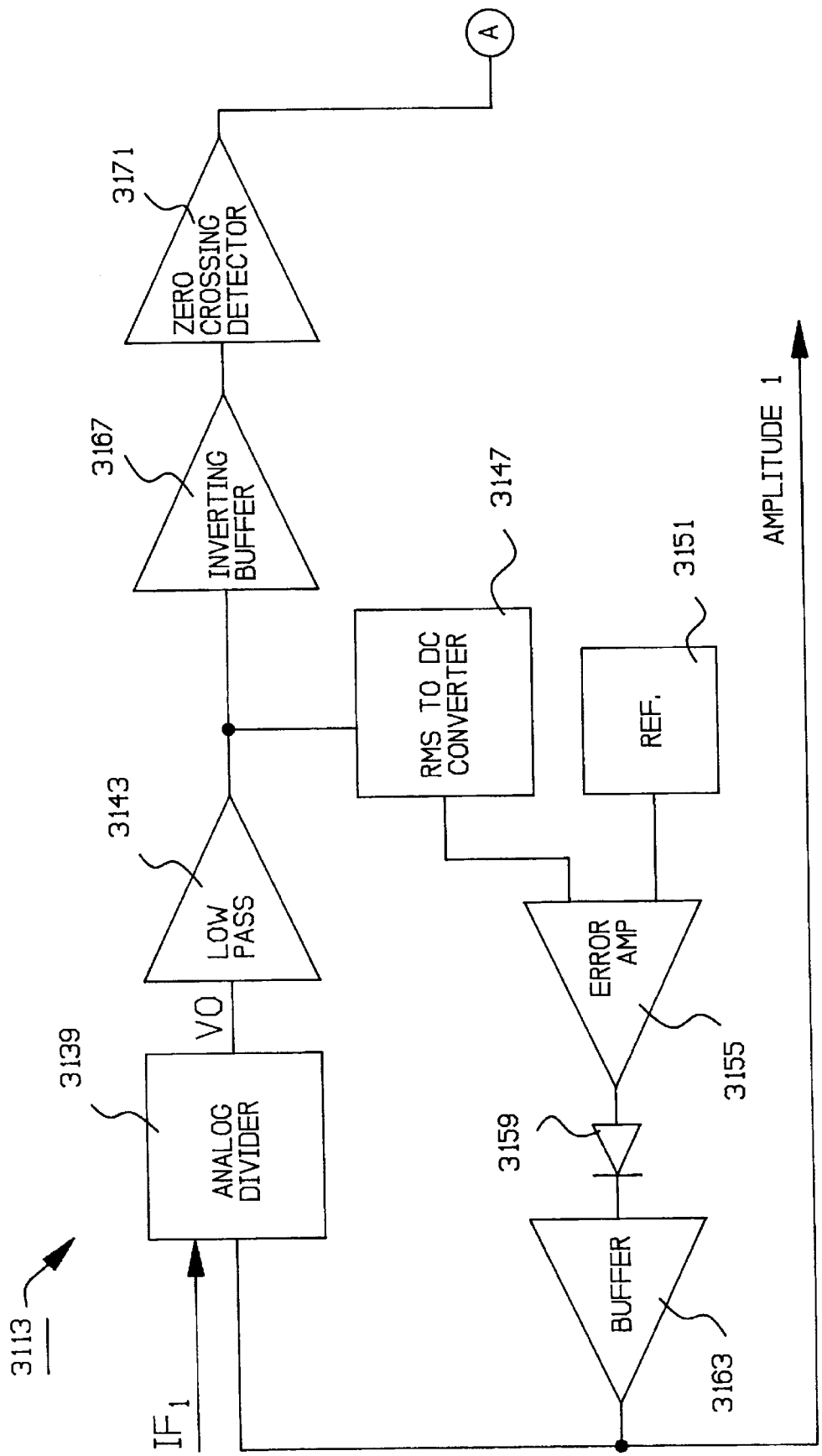
Figure 4D:
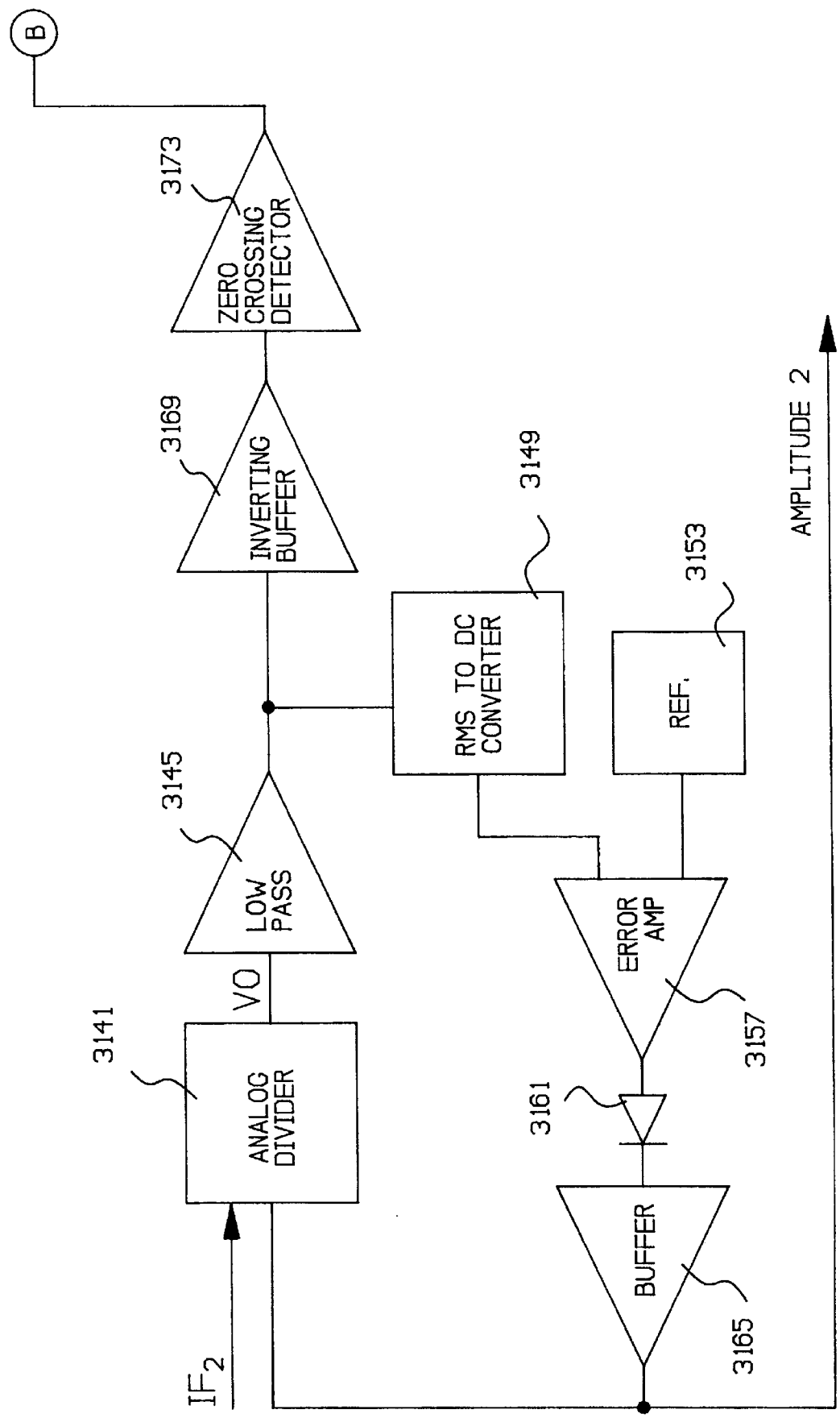
Figure 4E:
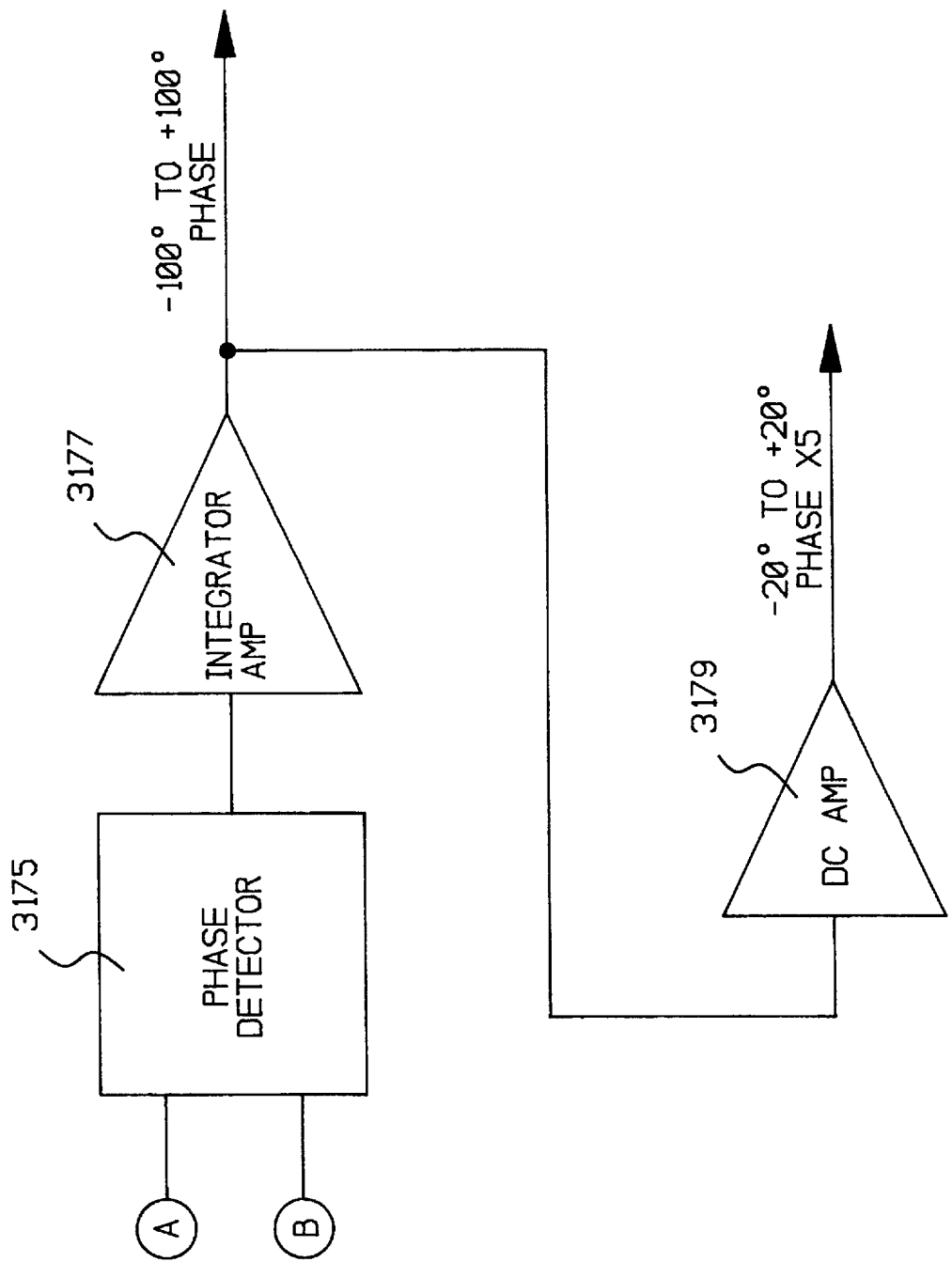

The amplitude/phase detector 3113 is depicted in FIGS. 4C, 4D, and 4E. In broad overview, the amplitude/phase detector 3113 has a separate automatic gain (AGC) circuit for each IF signal received, which provides constant amplitudes for the phase detector. The control voltage of the AGC is proportional to the amplitude of the IF signal providing a DC signal corresponding to the received signal level. The DC level is used by the processor as the amplitude of the received signal level. The output of the phase detector is a pulse which is proportional to the phase shift between the two IF signals. This voltage is integrated and amplified to provide phase outputs of 100° and 20°. The resultant signal is fed to the microprocessor board which initiates a measurement cycle, times the events during that cycle, samples data from the receiver, stores data in memory, and communicates with a tool bus.

The automatic gain control circuit has a dual purpose: to detect the amplitude of the incoming signal from the dual receiver 3111 of FIG. 4B, and to maintain a constant amplitude signal to the phase detector. The automatic gain control contains for each channel an Analog Devices linear divider 3139, 3141. The output of the linear dividers 139, 141 ($V_0$) is equal to the intermediate frequency IF divided by a DC level ($V_z$). The output of each analog divider 3139, 3141 is connected to low pass filter 3143, 3145, with a cut off of 7.5 kilohertz to remove any high frequency noise. The signal is fed to an RMS-to-DC converter 3147, 3149. Error amplifiers 3155, 3157 compare the output of converters 3147, 3149 to reference signals provided by reference signal generators 3151, 3153, and generates a control voltage dependent upon the difference. To prevent a loop lock-up, negative values resulting from the loss of signal are diode-blocked by diodes 3159, 3161 which are coupled between error amplifiers 3155, 3157 and output buffers 3163, 3165. The control voltage is fed to the automatic gain control to maintain a constant output, and to the processor for amplitude information. The IF signals from the automatic gain control circuit are capacitively coupled to inverting buffers 3167, 3169 for phase detection, to eliminate any DC offset. Preferably, the $IF_2$ signal is inverted 180°. This allows the output of the phase detector to be in the range of −180° to +180°, instead of being in the range of 0° to 360°. The signals are then squared-up with zero crossing detectors 3171, 3173, and passed to a 4013 dual flip-flop set which function as phase detector 3175. To accomplish this, the supply voltage to the flip-flop is not grounded. Instead, a positive voltage is powered from a floating supply so that what would normally be considered a low voltage (ground) will be a negative voltage or −180°. Likewise, a high level will be a positive voltage, or +180°. The clock inputs are used so that the phase detector will not be sensitive to cycle variation in the IF square waves. The phase detector output will be as follows:

(1) a square wave input from receiver $R_1$ intermediate frequency $IF_1$ sets pin 1 high;

(2) a square wave input from receiver R2 intermediate frequency IF sets pin 13 high;

(3) a high on pin 13 resets both flip-flops sending pin 1 low.

If the receive signals are in phase, the signals to the flip-flop would have 180° of phase difference due to the inversion of $IF_2$. This would result in the phase detector having a 50% duty cycle on pin 1, switching between negative 4.5 volts and positive 4.5 volts. This would result in zero volts on the low pass filter of integrator amplifier 3177. As the phase differential increases, so does the positive pulse width, causing a positive voltage out. Likewise, a negative phase input causes a negative pulse width resulting in a negative DC level from the filter. The gain in the low pass filter is set so that 100° equals 5 volts. This signal is used by the processor for the plus or minus 100° input and is also amplified five times by DC amplifier 3179, for the 20° of phase difference to equal a 5 volt output.

Figure 4F:
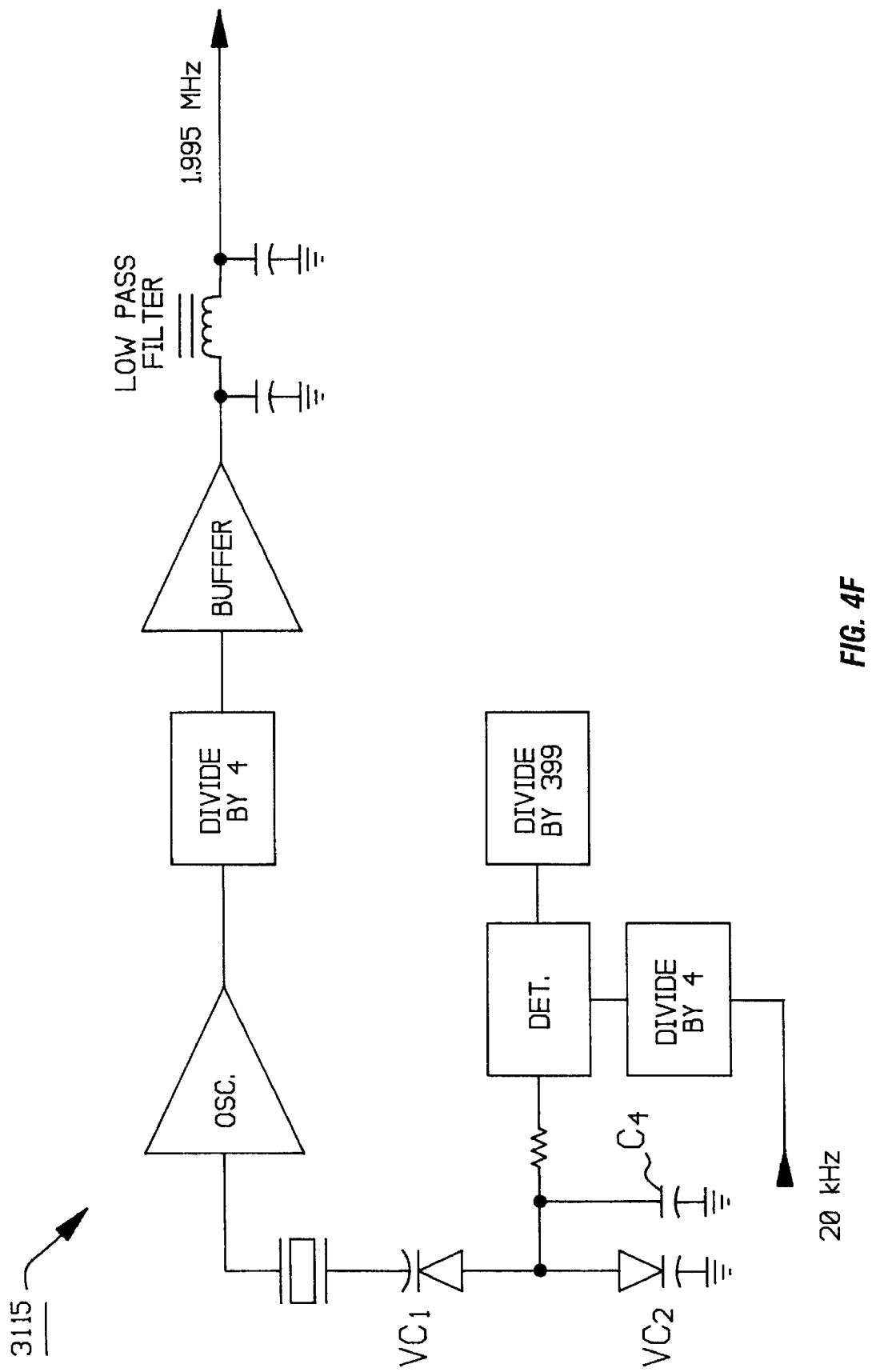

FIG. 4F depicts a local oscillator 3115 which generates the 1.995 megahertz injection for the receiver mixers of FIG. 4B. Local oscillator 3115 consists of a voltage controlled oscillator, a phase lock loop, and a final amplifier. A 20 kilohertz reference is supplied for the phase lock loop. A voltage controlled crystal (Colpitts) oscillator is utilized to reduce frequency error due to vibration downhole. The voltage controlled oscillator is locked to a reference frequency so the IF will be 5 kilohertz. A higher frequency crystal (7.982 megahertz) is used to increase the tuning range of the circuit. The oscillator is tuned to the desired center frequency by variable capacitance diodes VC1 and VC2. Control voltage for the diodes is supplied by the phase lock loop as follows. The output of the oscillator is divided by 4 to obtain the desired 1.995 megahertz frequency which is coupled to pin 9 of an MC14569 programmable binary down counter. To achieve a division ratio of 399, the MC14569 is cascaded with the programmable counter in the MC14568. The remaining counter in the MC14568 is used to divide the 20 kilohertz reference by 4 to provide a 5 kilohertz reference for the phase detector. The 5 kilohertz out of the divider (1.995/399) is compared to the 5 kilohertz reference by the MC14568 phase detector. Pulses out of the phase detector on pin 13 represent the frequency error between the divided 1.995 megahertz and the 5 kilohertz reference. These pulses are integrated by capacitor C4 to provide a correction voltage for diodes VC1 and VC2 to bring the oscillator back on frequency. The 1.995 megahertz is buffered by three 4049 inverts which are tied in parallel. A Pi network is used to match the output of the 4049's to 90 Ohms and also attenuate the harmonics of the 1.995 megahertz square wave. The power output of the local oscillator is approximately 10 milliwatts or +10 dbm.

Figure 4G:
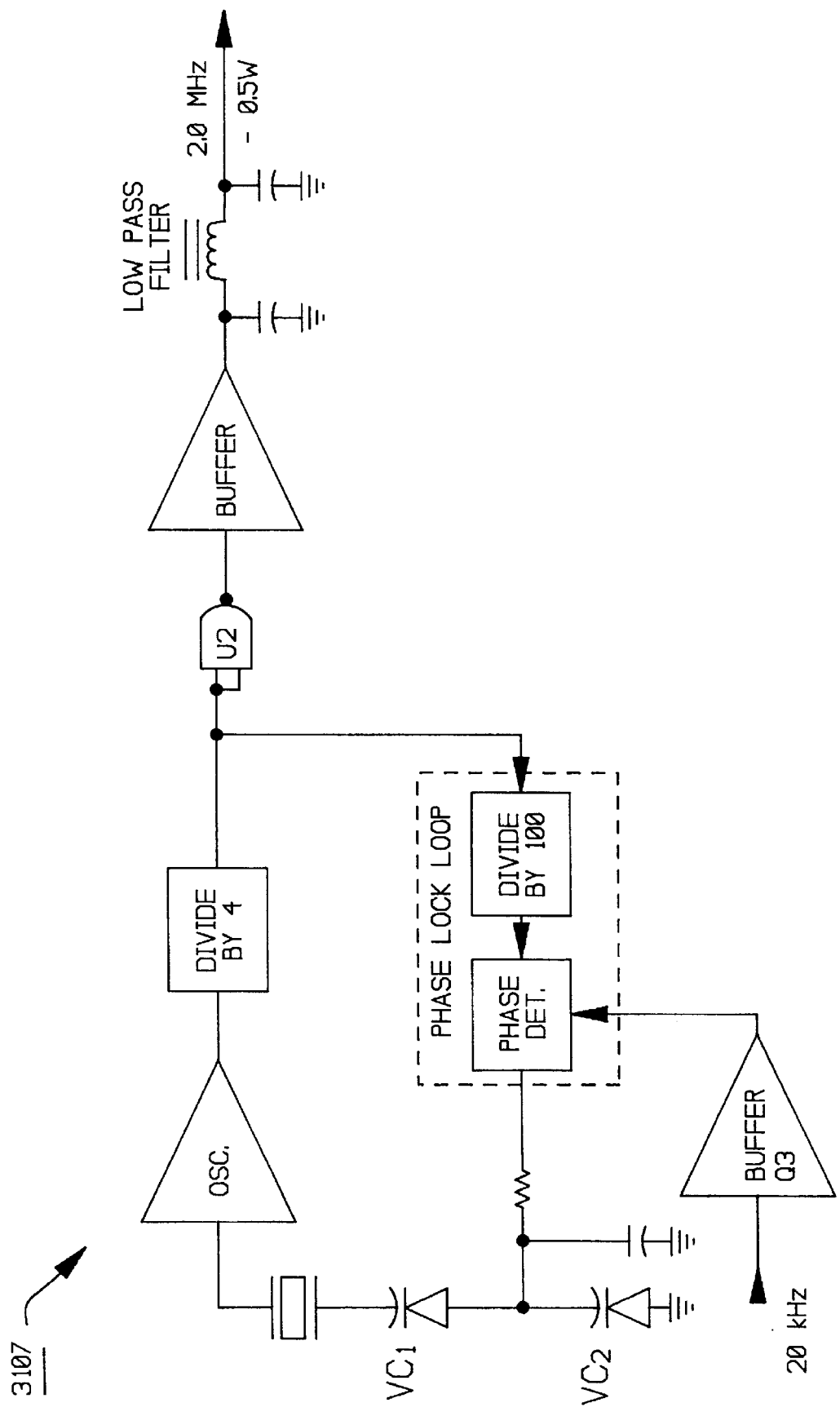
FIG. 4G is an electrical schematic depiction of a prior art drive circuit for use in transmission.

FIG. 4G depicts drive circuit 3107 of FIG. 4A, which is identical to drive circuit 3105 of FIG. 4A. Each drive circuit is identical, except that each has a different transmit control voltage. Each transmitter drive circuit consists of a voltage controlled crystal oscillator, a phase lock loop, a final amplifier, and a transmitter on/off control. The 20 kilohertz reference is provided. To ensure a satisfactory lock range, a 8 megahertz voltage control crystal oscillator is used in the transmitters. The frequency is adjusted by the variable capacitants of VC1 and VC2. The output is divided by 4 to obtain the desired 2 megahertz final frequency. The two megahertz output signal is coupled to the phase lock loop, which in turn divides the 2 megahertz signal by 100 to obtain the 20 kilohertz reference frequency to compare with the 20 kilohertz from the phase detector. Pulses from the phase detector represent the frequency error. A correction voltage is supplied to VC1 and VC2 to bring the oscillator back on frequency. The 2 megahertz signal is also tied to U2 which controls the output of the transmitter. The output stage is driven into class D operation by using a square wave input which results in higher amplifier efficiency. A low pass filter is used to reduce the harmonics. The cut off for this filter is 3 megahertz. The power output of the transmitter is approximately 0.5 watts (27 dbm).

It is apparent from an examination of FIGS. 4A through 4G that a large number of analog and digital circuit components must cooperate with a high degree of precision and reliability in order to correctly measure amplitude attenuation and phase shift of the interrogating electromagnetic fields. The probability of system failure is the production of the probability of failure of the individual analog and digital components. A greater number of analog and digital circuit components necessarily means that there is a higher probability of system failure. The same holds true for calibration errors and temperature sensitivity of the circuit components. Aside from these problems, the electronic housing necessary for such a large number of components results in a relatively wide and long subassembly. Finally, the power requirements for such a large number of analog and digital circuit components is not insignificant. Accordingly, an alternative logging tool which overcomes these problems is provided in the embodiment depicted in FIGS. 5A through 8C.

Figure 5A:
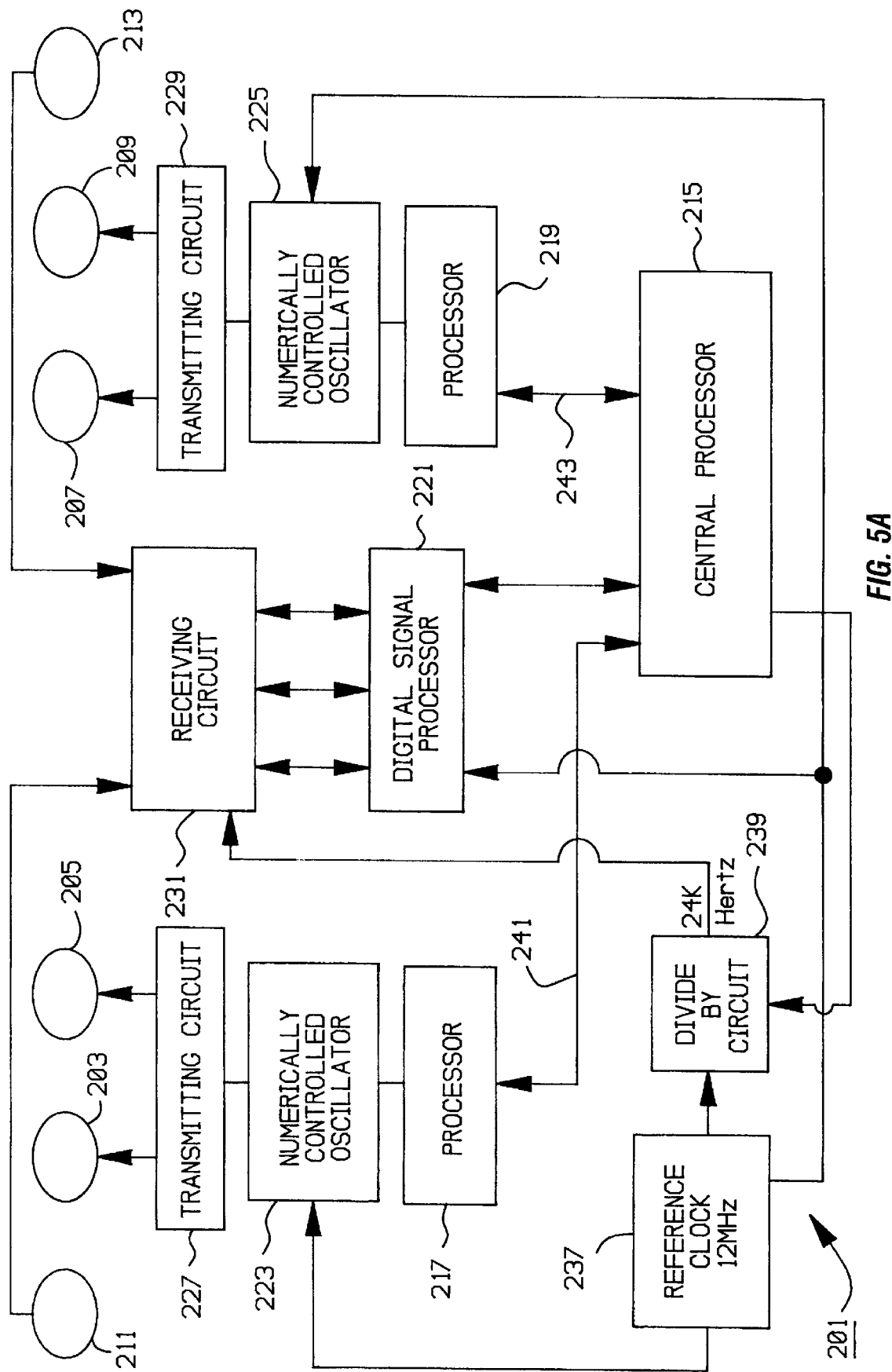
FIG. 5A provides a block diagram of an exemplary logging tool constructed in accordance with the present invention.

FIG. 5A provides a block diagram view of an exemplary logging tool 201 constructed in accordance with the present invention. The particular antenna configuration depicted is that of FIG. 1B, but with an additional set of transmitter antenna disposed between the receiver antennas. One set of transmitter antennas operate to provide a 2 megahertz interrogation frequency. The other set of transmitter antennas operate to provide a 400 kilohertz interrogation frequency.

Logging tool 201 includes transmitters 203, 205, and transmitters 207, 209, which are positioned intermediate a pair of intermediate series resonant receiving antennas 211, 213. Central processor 215 is preferably a microprocessor device which is utilized to coordinate the operation of the components of logging tool 201, to record and process the data obtained from measurements made by the series resonant receiving antennas 211, 213, and to interact with the mud pulse telemetry data transmission system carried in the adjoining drill collar member. Processor 217 is provided and dedicated for the control of numerically controlled oscillator 223. Processor 219 is provided and dedicated for the control of numerically controlled oscillator 225. Central processor 215 communicates with processors 217, 219 via data buses 241, 243 respectively. Numerically controlled oscillators 223, 225 are adapted to receive a binary command signal as an input, and to produce an analog output having particular frequency, phase, and amplitude attributes. The frequency, phase, and amplitude attributes are determined at least in part by the command signals applied from processor 217, 219 to the input of numerically controlled oscillators 223, 225, and the data contained in various registers within numerically controlled oscillators 223, 225. Numerically controlled oscillators 223, 225 provide the analog signal to transmitting circuits 227, 229 respectively. The components which make up transmitting circuits 227, 229 will be described in greater detail below.

Receiving antennas 211, 213, communicate through receiving circuit 231 with the first and second data input channels of a digital signal processor 221. The digital signal processor 221 receives data at the first and second inputs after it is converted from analog form to digital form by analog-to-digital converters contained within the receiving circuits, and records the data elements in a circular memory buffer. Central processor 215 pulls data from the buffers in a prescribed and predetermined manner in order to sample the current which is generated in receiving antennas 211, 213 in response to the propagation of electromagnetic signal through the adjoining formation. As is conventional, the resistivity of the formation surrounding the logging tool 201 may be determined by either (1) determining the amplitude attenuation of an electromagnetic wave propagating through the formation adjoining receiving antenna 211 and receiving antenna 213, or (2) by determining the phase shift between the electromagnetic signal propagating through the formation adjoining receiving antenna 211 and 213, or from both. These measurements comprise a relative measurement of the amplitude attenuation and a relative measure of the phase shift.

The present invention also allows other techniques for quantifying the electromagnetic field which propagates through the formation surrounding logging tool 201. Since precise control can be obtained with the present invention over the frequency, phase, and amplitude of the electromagnetic wave generated by transmitting antennas 203, 205, 207, and 209, the present invention allows the measurement of the absolute amplitude attenuation of the electromagnetic signal between any particular transmitting antenna 203, 205, 207, and 209 and any particular receiving antenna 211, 213. Furthermore, the logging tool 201 of the present invention allows for the absolute measurement of the phase shift of an electromagnetic signal between any particular transmitting antenna 203, 205, 207, 209 and any particular receiving antenna 211, 213. Prior art devices do not allow such optional techniques for determining amplitude attenuation and phase shift, since prior art devices are unable to determine easily and precisely the frequency, phase, and amplitude of a signal generated at any particular transmitting antenna.

The operation of numerically controlled oscillators 223, 225 is clocked by the output of reference clock 237, which is preferably 12 megaHertz. The operation of receiving circuit 231 is controlled by central processor 215 through digital signal processor 221. Receiving circuit 231 is clocked by the output of divide-by circuit 239, and thus samples the output of receiving circuit 231 at a particular frequency which is much less than that utilized to energize transmitter antennas 203, 205, 207 and 209.

Figure 5B:
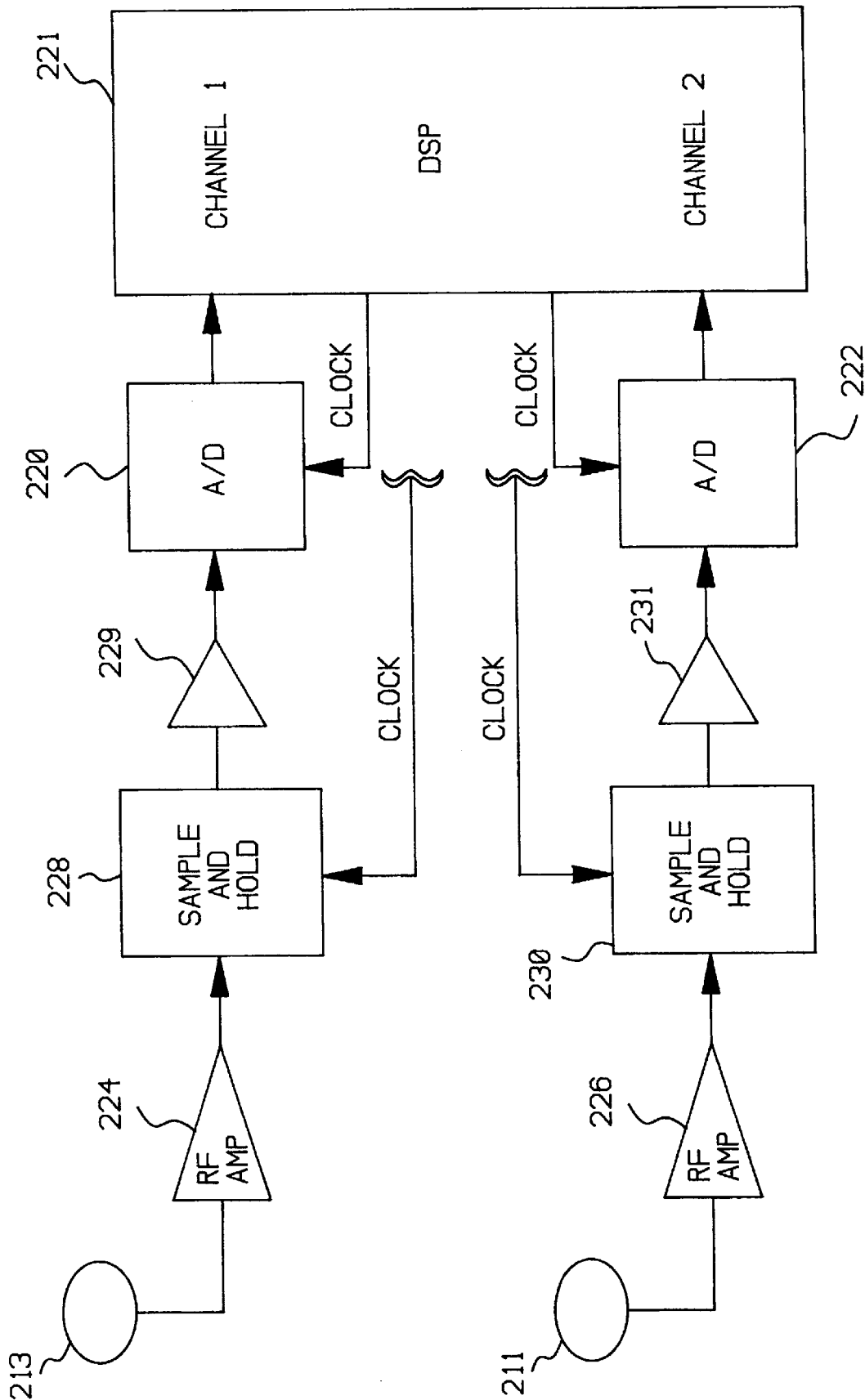
FIG. 5B is a block diagram depiction of the receiving circuit of FIG. 5A.

FIG. 5B is a block diagram depiction of the circuit components of receiving circuit 231 of FIG. 5A. As is show, the current developed in receiving antenna 213 is directed to radio frequency amplifier 224 to boost the signal. The signal is applied to the input of sample-and-hold circuit 228. Preferably, sample-and-hold circuit component 228 receives its lock input directly from divide-by circuit 239 (of FIG. 5A); however, alternatively, sample-and-hold circuit component 228 could receive its clock signal from digital signal processor 221. The output of sample-and-hold circuit component 228 is routed through amplifier 229 to the input of analog-to-digital circuit component 220. Preferably, analog-to-digital circuit component 220 is clocked by digital signal processor 221. The output of analog-to-digital circuit component 220 is provided to channel 1 of digital signal processor 221. In this manner, the signal developed by receiving antenna 231 is sampled at a frequency determined by divide-by circuit 239, or alternatively by a frequency established in a computer program executed by digital signal processors 221, or alternatively, by a program resident in central processor 215, which is passed through digital signal processors 221 to sample-and-hold circuit component 228. The analog signal is digitized at a frequency determined by the clock input to analog-to-digital circuit component 220. It should be noted that divide-by circuit 239 (of FIG. 5A) provides a 24 kilohertz output, which is much lower in frequency than the output of reference clock 237 (of FIG. 5A); accordingly, the signal generated by receiving antenna 213 is sampled at a frequency which is much less than the Nyquist threshold for the interrogating electromagnetic field which is generated by transmitters 203, 205, 207, 209. The manner in which this sampling is conducted will be discussed in greater detail below.

Referring again to FIG. 5B, the generation of signals for channel 2 of digital signal processor 221 will now be discussed. As is evident from FIG. 5B, the circuitry which provides an input to channel 2 of digital signal processor 221 is identical to that for channel 1 of digital processor 221. The signal generated by receiving antenna 211 is applied through radio frequency amplifier 226 to sample-and-hold circuit component 230. Sample-and-hold circuit component 230 is clocked either directly by divide-by circuit 239 (of FIG. 5A) or by digital signal processor 221. The output of sample-and-hold circuit component 230 is applied through amplifier 231 to analog-to-digital circuit component 222. Analog-to-digital circuit component 222 is preferably clocked directly by digital signal processor 221. Sample-and-hold circuit component 230 is clocked at a frequency which is much less than the frequency of the interrogating electromagnetic field which is generated by transmitter antennas 203, 205, 207, and 209. Thus, the signal developed by receiving antenna 211 is sampled at a frequency which is much less than the Nyquist threshold for the interrogating signal.

The logging apparatus of the present invention utilizes bandpass sampling techniques which have not heretofore been utilized in logging devices. Principally, bandpass sampling technologies have been utilized in radio frequency communication systems.

The broad concept behind bandpass sampling can be described with reference to FIG. 5C. When sampling a signal such as that shown in FIG. 5C, one typically samples at a sampling rate above the Nyquist limit for the particular signal in question, utilizing the following equation:

$$f_{sample} = 2\left(f_c + \frac{B}{2}\right)$$ EQUATION NO. 6.1:

However, this is only true in situations where one is interested in recovering information which identifies the carrier frequency $f_c$. Bandpass sampling may be utilized when one does not care or need to know the identity of the carrier frequency $f_c$. In the present invention, the frequency of the interrogating electromagnetic field is known with precision. In fact, it is known with much greater precision than has been available in prior art logging devices. Accordingly, bandpass sampling can be utilized to sample at frequencies much less than the Nyquist limit for the interrogating electromagnetic field, and much less than the carrier frequency, but larger than twice the signal bandwidth B. In logging applications, the drillstring moves through the borehole at rates which are typically less than sixty feet per hour. The information being detected is changes in either or both of amplitude attenuation and phase shift of the interrogating electromagnetic field. Such changes are occurring at a rate far less than one cycle per second, and typically less than one-sixtieth of one hertz. Accordingly, the bandwidth of the signal plus noise is very small compared to the carrier frequency; therefore, sampling at the Nyquist rate for the interrogating signal is not required. For example, for a two megahertz interrogating signal, the Nyquist limit is four megahertz. Sampling at four megahertz is for all practical purposes impossible in logging applications. Therefore, in the prior art devices, heterodyning circuits are utilized to generate a much lower frequency signal which includes the information content, which cam be sampled at a much lower rate (typically in the kilohertz or less range). In the present invention, the signals generated in the receiving antennas are directly digitized, without requiring heterodyning circuits, at a rate which is far less than the Nyquist limit, but also far less than the carrier frequency. For a two megahertz logging tool, utilizing the present invention, one may sample at rates in the range of 1 kilohertz to 80 kilohertz, without losing any information. At this much slower sampling frequency, direct digitization of the analog signal is possible, and the heterodyning circuitry can be eliminated. This greatly simplifies the construction, operation, and maintenance of the logging tool, and allows for the utilization of much smaller electronic housings which facilitate the manufacture of slimhole logging tools which can be utilized in relatively narrow-diameter wellbores as well as in highly articulated wellbores.

Utilizing a bandpass sampling technique, in which the frequency of the carrier signal is known, the Nyquist threshold becomes twice the bandwidth of the signal or signals of interest. With reference ton FIG. 5C, the Nyquist threshold for bandpass sampling is two times the bandwidth B. Of course, sampling at a rate which is much higher than the relatively narrow bandwidth of the signal (in the neighborhood of fractions of hertz) is not difficult; therefore, the question remains: what sampling frequency should be utilized? High sampling rates are favored, since the lower the sampling rate, the greater the impact of phase noise upon the signal, and aliasing then becomes a problem.

In the present invention, these signal processing concerns are addressed by the selection and utilization of a quadrature sampling technique. Quadrature sampling is useful insofar as it eliminates automatically the influence of DC biases. The influence of high frequency noise is eliminated by utilizing averaging routines in digital signal processor 221 to average the samples recorded in memory of the circular buffers for channels one and two of digital signal processor 221.

In quadrature sampling, each succeeding sample is a specifiable number of cycles of the signal frequency plus ninety degrees later than the previous sample. Quadrature sampling can be explained with reference to FIG. 5D. To obtain quadrature sampling, each sample is advanced a specified number of cycles plus ninety degrees from the previous sample. Quadrature sampling allows for any (or no) number of intervening cycles to occur. In the graphical depiction of FIG. 5D, each one of samples number 1, number 2, number 3, and number 4 is advanced 2 cycles plus ninety degrees from the previous sample. Quadrature sampling will allow for any particular number of cycles to occur between samples. For a given carrier or signal frequency, $F_c$, the frequency of sampling is determined in accordance with the following equation:

$$f_{sample} = \frac{f_c}{n + \frac{1}{4}}.$$ EQUATION NO. 6.2:

Where n is the number of full cycles between samples.

The derivation of this equation is set forth in Appendix I. In accordance with the present invention, a sampling rate of 24 kilohertz is utilized. This corresponds to sampling a 1.998 megahertz signal with n=83.

FIGS. 6A and 6B are a block diagram view of the numerically-controlled oscillators 223, 225 of FIG. 5A. Since the numerically-controlled oscillators are identical, only numerically-controlled oscillator 223 will be discussed and described. In the preferred embodiment of the present invention, numerically-controlled oscillator 223 comprises a CMOS, DDS modulator manufactured by Analog Devices of Norwood, Mass., which is identified by Model No. AD7008. The numerically-controlled oscillator 223 includes a thirty-two bit phase accumulator 301, a sine and cosine look-up table 303, and a ten-bit digital to analog converter 305. Clock input 307 is provided to receive a clocking signal from a device which is external to the numerically-controlled oscillator 223.

The particular numerically-controlled oscillator of the present invention is adapted to accept clock rates as high as twenty megaHertz to fifty megaHertz, but can accommodate much lower clock rates. The device purports to have a frequency accuracy which can be controlled to one part in four billion. Numerically-controlled oscillator 223 includes a thirty-two bit serial register 309 which receives serial data at serial data input pin 311, which is clocked into the register in accordance with a clock signal which is supplied to serial clock input 313. A thirty-two bit parallel register 313 is also provided which receives parallel binary data from MPU interface 315. Data bus 317 includes sixteen digital input pins identified as D0 through D15. The chip select pin 321 is utilized when writing to the parallel register 313. The write pin 319 is also utilized when writing to the parallel register 309. The transfer control address bus 323 is utilized to determine the source and destination registers that are used during a transfer. A source register can be either the parallel assembly register 313 or the serial assembly register 309. The destination register can be any one of the following registers: the command register 325, the FREQ0 register 327, the FREQ1 register 329, the phase register 331, the IQMOD register 333. The command register is written to only through the parallel assembly register 313. The contents of the command register determine the operating state of the numerically-controlled oscillator 223. In the preferred device utilized in the present invention, the command register if a four bit register. The content of this register determines the operating state of the numerically-controlled oscillator. Table 1 provides an overview of the possible operating states of the numerically-controlled oscillator 223 which is utilized in the present invention.

During logging operations, the logging apparatus of the present invention is programmed to provide commands from processors 215, 217, 219 (of FIG. 4) with eight-bit commands, so the "CR0" bit is 0. Normal operation is desired, so the "CR1" bit is 0. In the present invention, amplitude modulation is bypassed, so the "CR2" bit is 0. In the present invention, the synchronizer logic is enabled, so the "CR3" bit is 0. The FREQ0 register 327 defines the output frequency of the numerically-controlled oscillator 223, when the FSELECT pin is 1, as a fraction of the frequency of the clock signal applied to clock pin 307. The FREQ1 register 329 defines the output frequency of the numerically-controlled oscillator 223, when FSELECT equals 1, as a frequency of the clock signal applied to clock pin 307. The contents of the phase register 331 are added to the output of the phase accumulator 301. The IQMOD register 333 is not utilized in the present invention.

The operations which can be performed with the registers by supplying command signals to transfer control address bus 323 are set forth in tabular form in Tables 2 and 3. Three basic operations can be performed. The contents of the parallel assembly register 313 can be transferred to command register 325, the contents of the parallel assembly register can be transferred to a selected destination register, in accordance with the destinations identified in Table 3; and the contents of the serial assembly register 309 can be transferred to a selected destination register of those identified in Table 3.

The load register pin 335 is utilized in conjunction with the transfer control address bus 323 to control loading of internal registers from either the parallel or serial assembly registers 309, 313. The test pin 337 is utilized only for factory testing. The reset pin 339 is utilized to reset the registers. The reset pin in particular is utilized to clear the command register 325 and all of the modulation registers to 0. The current output pins 341, 343 are utilized to supply an alternating current to a selected end device. In the particular embodiment of the present invention, only one of these outputs is utilized for a particular transmitting antenna, since one current is the compliment of the other current. The compensation pin 342 is utilized to compensate for the internal reference amplifier. The voltage reference pin 343 can be utilized to override an internal voltage reference, if required. The full-scale adjust pine 345 determines the magnitude of the full scale current at output pins 341, 343. The ground pin 347 provides a ground reference, while the positive power supply pin provides power for the analog components within numerically-controlled oscillator 323. The frequency select pin 351 controls frequency registers FREQ0 register 317 and FREQ1 register 329, by determining which register is used in the phase accumulator 301 by controlling multiplexer 353. The contents of phase register 331 is added to the output of phase accumulator 301 at summer 355. The IQMOD registers 333 are provided to allow for either quadrature amplitude modulation of amplitude modulation, so the sine and cosine outputs of look-up table 303 are added together at summer 357, and are unaffected by the IQMOD registers 333. The output of summer 357 is provided to digital-to-analog converter 305, which creates an analog signal having a frequency which corresponds to either the contents of the FREQ0 register 317 or the FREQ1 register 329, a phase which is determined by the output of summer 355 which is provided as an input to look-up table 303, and an amplitude which is determined by full scale control 359 which is set by full scale adjust pin 345 and reference voltage pin 343.

Therefore, the numerically-controlled oscillator of FIGS. 6A and 6B can provide an analog output having a precise frequency attribute, phase attribute, and amplitude attribute. Since the device is extremely accurate, it is possible to provide a driving current for the transmitting antennas 203, 205, 207, 209 of FIG. 5A which is controlled precisely. In the preferred embodiment of the present invention, one of transmitting antennas 203, 205 is operated at 400 kiloHertz, while the other of transmitting antennas 203, 205 is operated at 2 megaHertz. The same is true for antennas 207, 209, with one being operated at 400 kiloHertz and the other being operated at 2 megaHertz. However, the processors 215, 217, 219 can be programmed to provide any particular frequencies for the transmitting antennas. This will be used to good advantage as will be described below in connection with a calibration routine.

In operation, a command signal is supplied to the FSELECT pin 351 to determine which frequency will be utilized for energizing a particular transmitting antenna. The FREQ0 register 327 and FREQ1 register 329 may be preloaded with two particular frequencies (such as 400 kiloHertz and 2 megaHertz). The binary signal applied to the FSELECT pin 351 determines the operation of multiplexer 353, which supplies the contents of either FREQ0 register 317 or FREQ1 register 329 of the input of phase accumulator 301. Phase accumulator 301 accumulates a phase step on each clock cycle. The value of the phase step determines how many clock cycles are required for the phase accumulator to count two $\pi$ radians, that is, one cycle of the output frequency. The output frequency is determined by the phase step multiplied by the frequency of the signal applied to the clock input pin 307 divided by $2^{32}$. In practice, the phase accumulator 301 is cleared, then loaded with the output of multiplexer 353. Then, a predefined time interval is allowed to pass, during which the signal applied to clock input pin 307 steps the output of phase accumulator 301 through an incrementally increasing phase for the particular frequency. In other words, phase accumulator steps from 0° phase to 180° for a particular frequency. At any time, the output of phase accumulator 301 may be altered by a phase offset which is supplied by phase register 331. Phase register 331 may be loaded in response to commands from processors 215, 217, 219. The phase value is supplied as input to look-up table 303, which converts the output of the phase accumulator 301 (and any desired offset) into a digital bit stream which is representative of an analog signal. This digital bit stream is supplied as an input to the 10-bit digital-to-analog converter 305 which also receives amplitude information from full scale control 359. The digital-to-analog converter 305 supplies an analog output with a particular frequency attribute, phase attribute, and amplitude attribute. For example, an output of 2 megaHertz, with 15° of phase, and a particular peak amplitude current may be provided as an input to a particular transmitting antenna.

FIG. 7 is a block diagram view of the digital signal processor 221 of FIG. 4A. In the preferred embodiment of the present invention, digital signal processor 221 comprises a DSP microcomputer manufactured by Analog Devices of Norwood, Mass., which is identified as Model No. ADSP- 2101. This is a single-chip microcomputer which is utilized for high-speed numeric processing applications. Its base architecture 379 is a fully compatible superset of the ADSP-2100 instruction set. The base architecture includes three independent computational units: shifter 371, multiplier/accumulator 373, and arithmetic and logic unit (ALU) 375. Program sequencer 369 supports a variety of operations including conditional jumps, subroutine calls, and returns in a single cycle. Data address generator 367 includes two address generators. Digital signal processor 221 includes serial port 381 which includes two input channels: input channel 383, and input channel 385. Timer 387 provides timing signals for the data processing operation, and receives as an input a clock signal from divide-by circuit 239 (of FIG. 5A). External address but 289 and external data bus 391 allow digital communication between digital signal processor 221 and central processor 315 of FIG. 5A. Memory 393 includes program memory 395 and data memory 397. As is typical with digital signal processors, data memory 397 defines at least two circular buffers associated with serial ports 383, 385, which are designed to receive asynchronous digital data, and store it indefinitely or for a predetermined time interval.

The digital signal processor 221 receives digital inputs at channel inputs 383, 385 from an analog-to-digital converter, such as is depicted in the circuit of FIG. 5B. The receiving circuit of FIG. 5B receives a current which is representative of the response of a particular receiving antenna 211, 213 to electromagnetic radiation propagating through the borehole. This electrical signal is processed through the circuit components of FIG. 5B, and is provided as an input to digital signal processor 221. In the preferred embodiment of the present invention, receiving antenna 211 is identified with a particular input channel of digital processor 221, while receiving antenna 213 is identified with the output input channel of digital signal processor 221. Central processor 215 (of FIG. 5A) utilizes external address bus 389 and external data bus 391 to address a particular input channel and read digital data into central processor 215 for processing. In the preferred embodiment of the present invention, digital signal processor 221 can sample data from receiving antennas 211, 213 at a very high sampling rate, which can be read periodically by central processor 215 which processes the data to determine the amplitude attenuation and phase shift of the electromagnetic signal which is propagated through the borehole. Several particular routines for calculating amplitude attenuation and phase shift are set forth in greater detail above, in connection with a discussion of the error cancellation feature of the present invention.

In broad overview, central processor 215 can pull a selected amount of data from each channel of digital signal processor 221, and from that data calculate the amplitude attenuation and phase shift of the electromagnetic wave as it propagates through the wellbore and past receiving antenna 211 and receiving antenna 213. In the preferred embodiment of the present invention, a particular one of transmitters 203, 205 transmits an interrogating electromagnetic signal of a particular frequency which propagates past receiving antennas 211, 213. Then, a particular one of transmitting antennas 207, 209 propagate an interrogating electromagnetic signal. Measurements from receiving circuit 231 are stored in the input channels of digital signal processor 221, and read by central processor 215 in a manner which allows for the calculation of amplitude attenuation and phase shift.

Another important feature of the present invention arises from the fact that a precise energizing current can be utilized to energize a particular one of transmitting antennas 203, 207, 207, 209. This will establish the frequency attribute, phase attribute, and amplitude attribute of the electromagnetic interrogating signal. Therefore, a single receiving antenna can be utilized to make the measurement of the electromagnetic interrogating signal as it passes through the wellbore The amplitude and phase of that interrogating signal can be recorded in memory, and compared with values in memory for the energizing current. This allows a single receiving antenna to be used to provide an accurate measure of amplitude attenuation between that particular receiving antenna and the particular transmitting antenna, and the phase shift of the interrogating signal between the transmitting antenna and the receiving antenna. Of course, the amplitude attenuation and phase shift of the electromagnetic interrogating signal as it passes through the formation is indicate of the resistivity of the wellbore and surrounding formation.

Figure 8A:
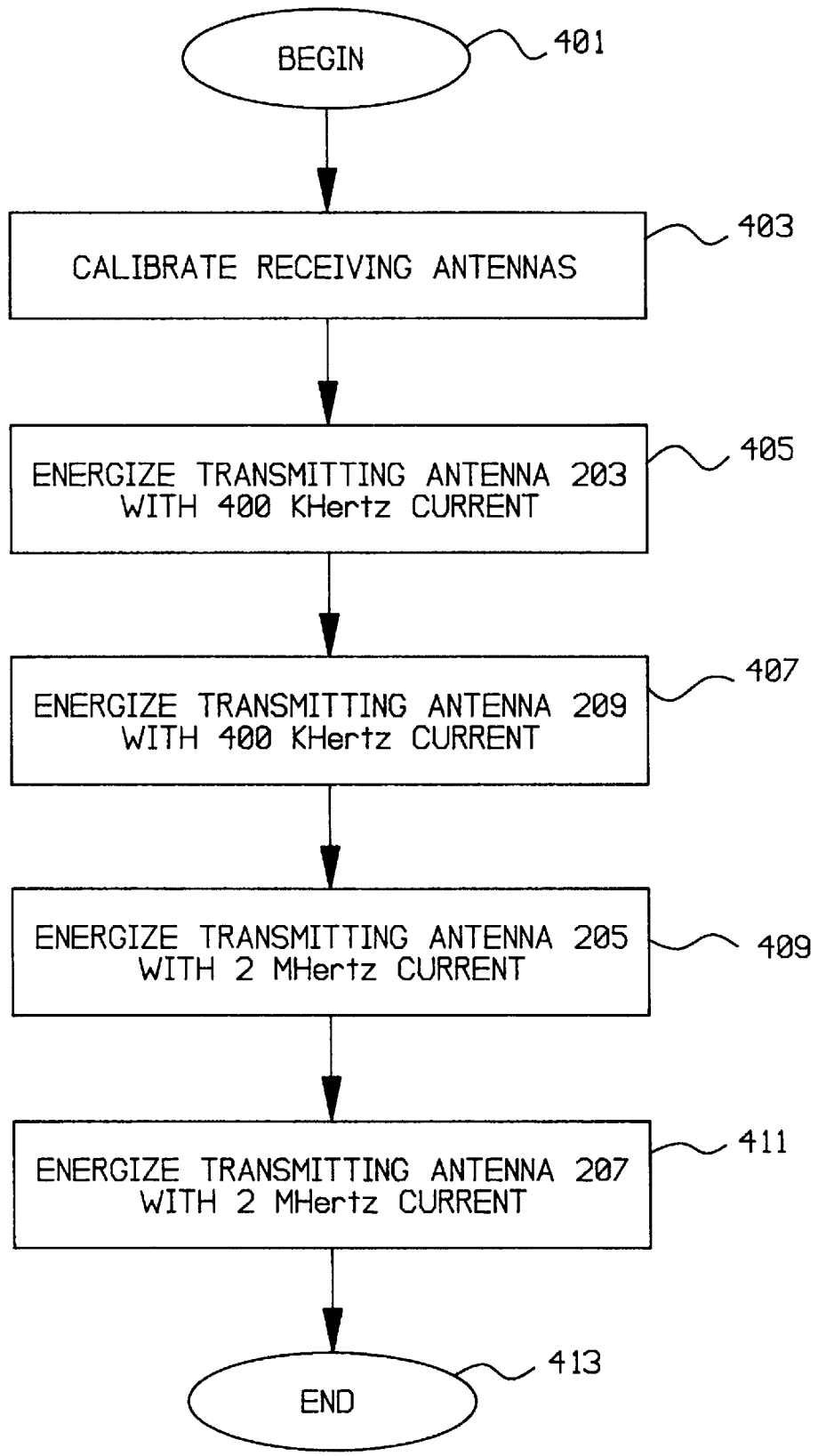
FIGS. 8A, 8B, and 8C, are high level flowchart representations of tool operation in accordance with the preferred embodiment of the present invention.
Figure 8B:
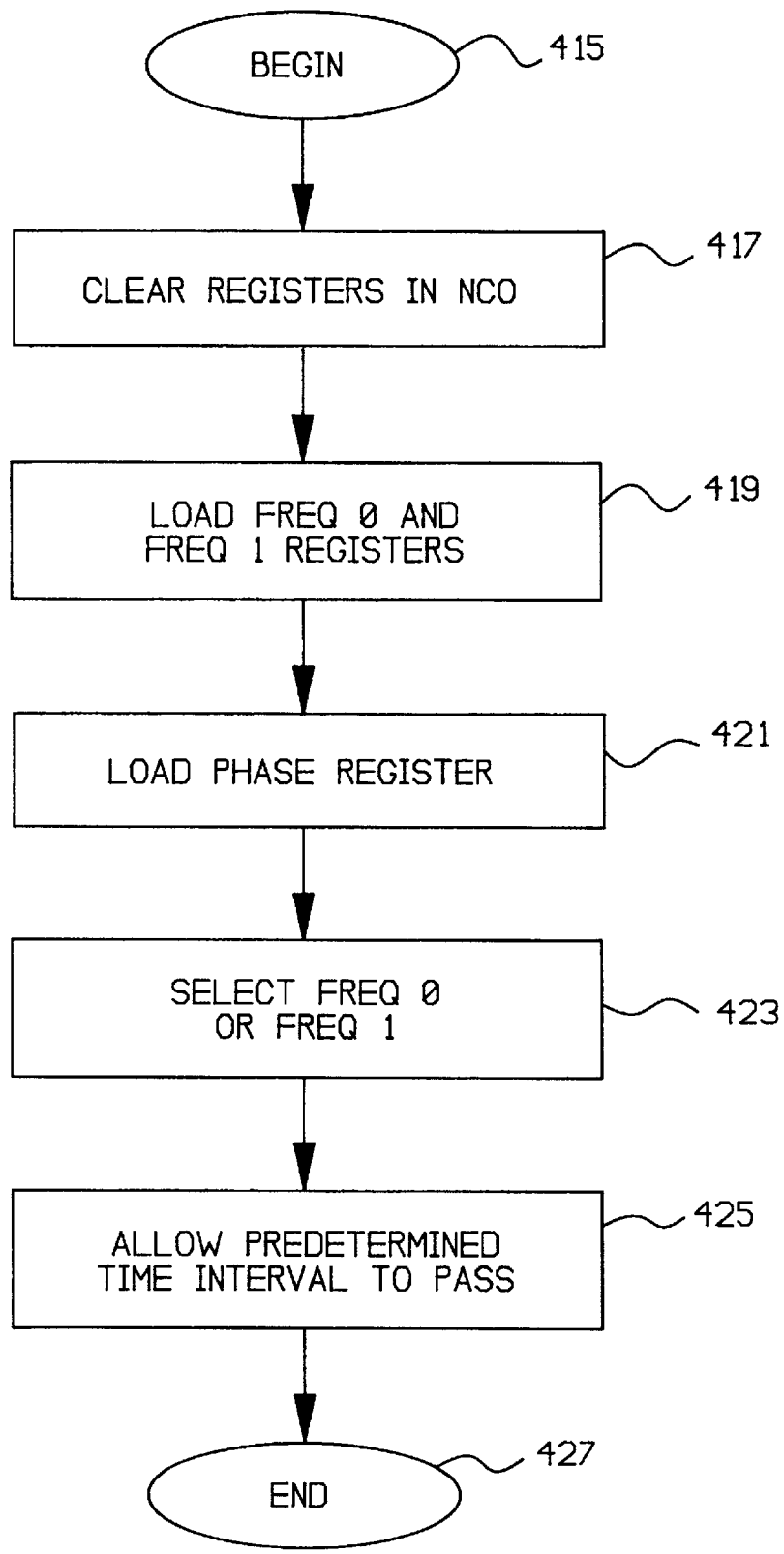
Figure 8C:
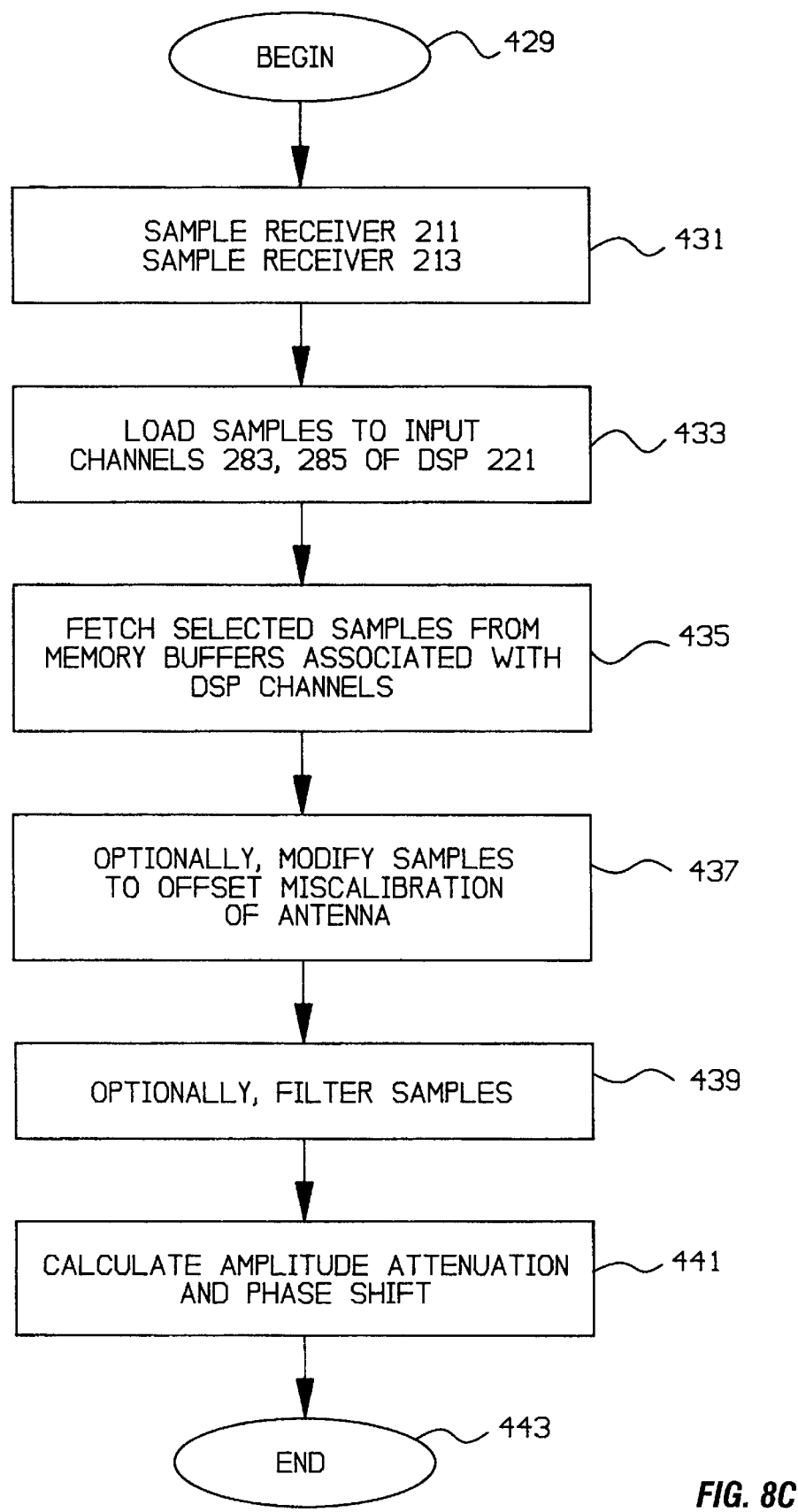

FIGS. 8A, 8B, and 8C provide high level flowchart representations of logging operations performed in accordance with the preferred embodiments of the present invention. FIG. 8A depicts logic steps which are performed by central processor 215. FIG. 8B represents operations controlled by processors 217, 219. FIG. 8C depicts operations controlled by digital signal processor 221 and central processor 215. The transmission operations begin at block 401. Processor 215 performs a calibration operation upon receiving antennas 211, 213, as will be discussed in greater detail elsewhere in this application. After the calibration operations are performed central processor 215 instructs processor 217 to energize transmitting antenna 203 with a 400 kiloHertz current. Then, in accordance with block 407, central processor 215 instructs processor 219 to energize transmitting antenna 209 with a 400 kiloHertz current. Next, central processor 215 instructs processor 217 to energize transmitting antenna 205 with a 2 megaHertz current, in accordance with block 409. Then, in occurrence with block 411, central processor 215 instructs processor 219 to energize transmitting antenna 207 with a 2 megaHertz current. The process stops at block 413. In actual practice, transmission operations will be performed continuously over predefined intervals.

FIG. 8B depicts the control operations performed by processors 217, 219 to cause numerically controlled oscillators 223, 225 to energize particular transmitters. The process begins at block 415. It continues at block 417, wherein the processor 217 or 219 clears the registers in numerically controlled oscillators 223 or 225 by providing the appropriate instruction. Then, in accordance with block 419, processor 217 or 219 loads a predetermined value to the FREQ0 register and the FREQ1 register. These values determine the frequency of the energizing current which is supplied to a particular transmitting antenna. Then, in accordance with block 421, processor 217 or 219 loads a predetermined phase value to the phase register of numerically controlled oscillator 223 or 225. Processor 217 or 219 then provides a binary command to the FSELECT input pin of numerically controlled oscillator 223 or 225 to select a particular frequency of operation. Then, in accordance with block 425, a particular time interval is allowed to pass. This time interval determines how many cycles of energizing current are applied to a particular transmitting antenna. The process ends at software block 427. Typically, each time processor 217 or 219 is instructed by central processor 215 to energize a particular transmitting antenna, the steps of FIG. 8B are performed.

FIG. 8C depicts in flowchart for the reception operations. The process begins at block 429. The process continues at block 431, wherein the current within receiving antennas 211, 213 are sampled by receiving circuit 231. Then, in accordance with block 433, these samples are loaded to the appropriate input channels 283, 285 of digital signal processor 221. In accordance with block 435, central processor 215 fetches selected samples form the memory buffers associated with the digital signal processor input channels. In accordance with block 437, optionally, samples may be modified to offset for error components due to "miscalibration" of the antenna, which will be described in greater detail elsewhere in this application. Next, in accordance with software block 439, the digital samples may be digitally filter with either a low-pass digital filter, high-pass digital filter, or a bandpass digital filter. Alteratively, the samples can be averaged over predefined intervals to provide stability to the samples and eliminate the influence of spurious or erroneous samples. Next, in accordance with block 441, the amplitude attenuation and phase shift are calculated, as is described elsewhere in this application. Finally, the process ends at block 443.

7. Antenna Calibration Operations

The utilization of microprocessor and numerically controlled oscillators in the present invention allows for very precise calibration measurements to be made of the transmission and reception of the interrogating signal either outside the borehole, or preferably in the borehole during logging operations. This is accomplished by having a calibration program resident in memory of processors 217, 219, or in central processor 215, which causes a numerically-controlled oscillator to step or sweep through a particular frequency range. This is accomplished by sequentially providing a command signal from processors 217, 219 to numerically controlled oscillators 223, 225 which establishes a frequency for the energizing current which is supplied to a particular transmitting antenna. Additionally, a command is supplied from processors 217, 219 to numerically controlled oscillators 223, 225 to establish the phase characteristic of the signal. In practice, the frequency sweep should include a fairly wide range of frequencies. Normal reception operations are conducted while a particular transmitter is swept through a range of frequencies. The data is recorded, and provides a combined measure of the response of the transmitting antenna and receiving antenna.

In the preferred embodiment of the present invention, each transmitting antenna is swept through a predetermined frequency range, while the receiving antennas are sampled. The result is eight sets of data, one for each possible transmitter/receiver combination, which quantifies the operating condition of the particular transmitting antenna and the particular receiving antenna. Malfunctions in a particular receiving antenna or transmitting antenna can be determined by comparisons between the eight data sets. For example, with reference to FIG. 5A, supposing that transmitting antenna 203 is damaged or out of calibration. The data set which establishes the operating condition of transmitting antenna 203 and receiving antenna 211 can be compared with the data set which establishes the operating conditions of transmitting antenna 203 and receiving antenna 213 to determine that transmitting antenna 203, and not a particular receiving antenna, is damaged or out of calibration. The identification of a damaged or uncalibrated antenna is an important diagnostic tool It can be utilized during logging operations to drop one or more of the transmitting or receiving antennas out of the normal operating cycle, once it has been detected that it is damaged, in order to maintain high quality logging information. Alternatively, the calibration data can be used in post-logging operations to modify, interpret, or manipulate the logging data to correct for intervals of measurement during which a particular transmitting antenna was damaged or fell out of calibration.

Figure 9:
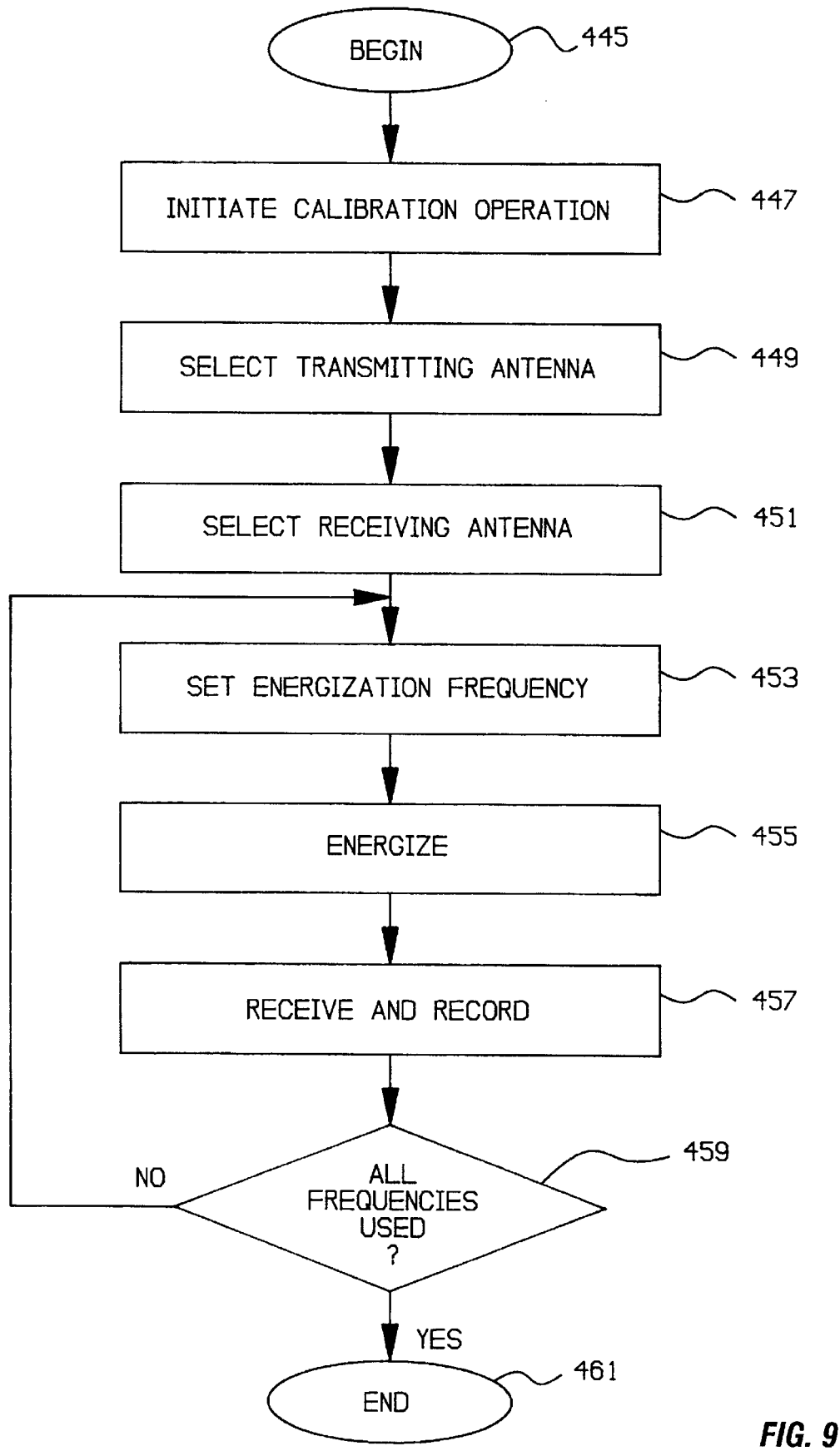
FIG. 9 is a high level flowchart representation of a digital calibration operation in accordance with the present invention.

FIG. 9 provides a high level flowchart representation of calibration operations, which of course is set forth in the context of the flowcharts of FIGS. 8A, 8B, and 8C. The process begins at block 445. The process continues at block 447, wherein the calibration operation is initiated by central processor 215. Then, in accordance with block 449, a particular transmitting antenna is selected; in accordance with block 451, a particular receiving antenna is selected. The calibration operations will be performed utilizing this particular transmitting antenna and this particular receiving antenna. The resulting data will provide information about the operating condition of both of these antennas. In accordance with block 453, an energization frequency is set. This is accomplished by providing appropriate commands to numerically controlled oscillator 223. Then, in accordance with block 455, the transmitting antenna is energized. In accordance with block 457, the receiving antenna is sampled, and the data is stored in memory. At block 459, one or more of the processors determine whether all the frequencies have been swept through. If not, the process continues at block 453, wherein the energization frequency is set, once again, at a higher frequency than the previous frequency utilized. However, if it is determined block 459 that all frequencies have been used, the process ends at block 461. In the preferred embodiment, a particular frequency range is stepped through in increments of fractional portions of 1 Hertz. For practical purposes, the calibration operation can be considered to be a sweep through all frequencies within a predetermined frequency range. The data that is recorded in memory can be analyzed in a manner discussed below to assess the operating condition of the transmitting antenna and the receiving antenna.

Figure 10:
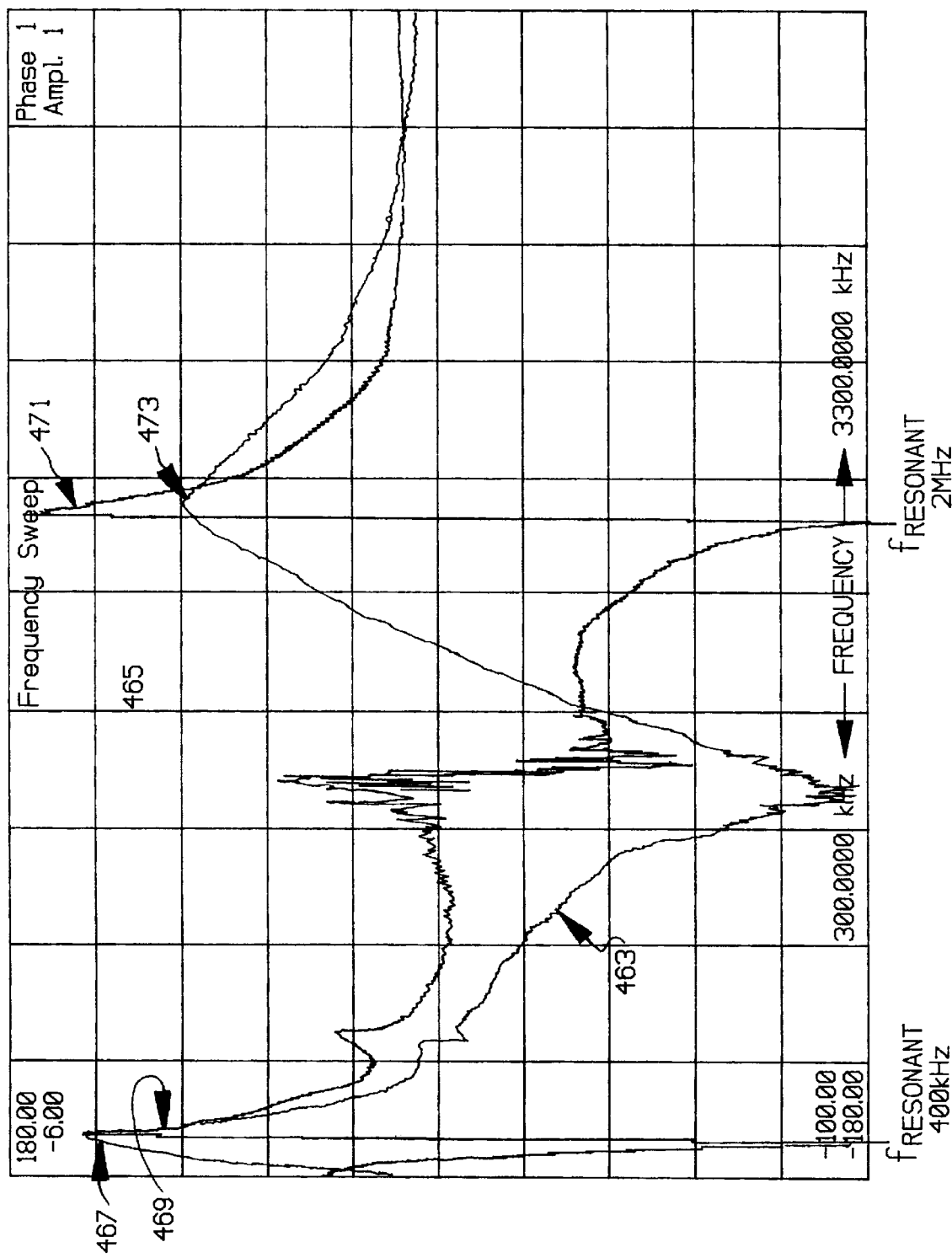
FIG. 10 is a graphical depiction of the amplitude, frequency, and phase shift data derived through a digital calibration operation.

FIG. 10 provides a depiction of an example of the type of data that can be acquired during a calibration operation. Of course, during logging operations, the data will not be recorded or depicted in graphical form. Instead, a data array will be defined which includes information about the amplitude and phase attribute of the receiving antenna's response at a particular frequency. The graphical depiction in FIG. 10 is provided for purposes of exposition. In the view of FIG. 10, the amplitude of the response of the transmitting and receiving antennas is depicted by curve 463. In FIG. 10, the phase of the response of the transmitting and receiving antennas is depicted by curve 465. In order to determine when malfunctioning is occurring, it is necessary that a normal operating condition be preestablished. This should be done with regard to a range of acceptable operating conditions. The graph of FIG. 10 depicts normal operation over a range of 300 kiloHertz to 3.3 megaHertz. In the view of FIG. 10, peaks 467, 469, 471, 473 define two resonant frequencies for the transmitting and receiving antennas, with resonances occurring at 400 kiloHertz and 2 megaHertz, since the particular antennas utilized to generate this calibration graph were resonant at both 400 kiloHertz and 2 megaHertz. From the information contained in the measurements made when the tool is operating normally, parameters can be established to alert of malfunctioning.

Figure 11A:
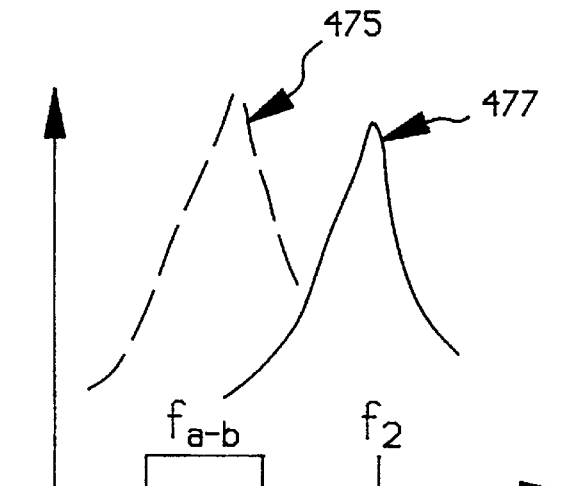
FIGS. 11A, 11B, and 11C graphically depict a variety of comparison operations which can be performed utilizing data derived from a digital calibration operation.
Figure 11B:
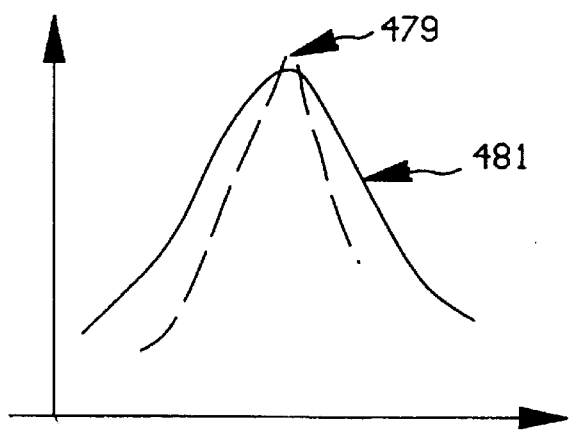
Figure 11C:
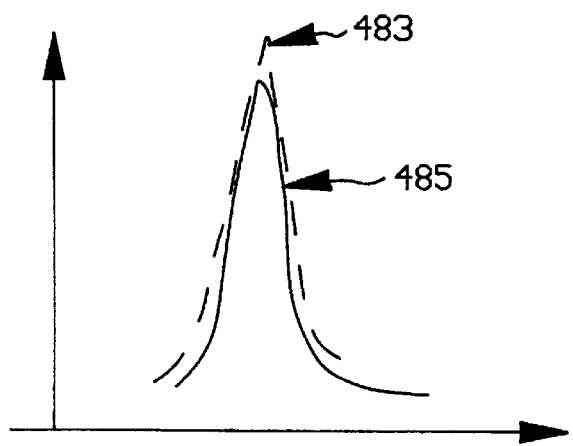

FIGS. 11A, 11B, and 11C graphically depict three techniques for detecting antenna malfunction. The first technique for detecting antenna malfunction is depicted in FIG. 11A wherein peak 475 is representative of either an amplitude or phase peak for normal operations. In contrast, peak 477, which is generated as a result of calibration operations during logging, indicates to the operator that a shift in the resonant frequency has occurred. A range of acceptable resonant frequencies can be established. If the measurement falls outside an acceptable range, a determination can be made that either the transmitting antenna or the receiving antenna is malfunctioning. FIG. 11B depicts another technique for detecting malfunctioning antennas. Peak 479 represents normal operations, while peak 481 represents a measurement made during logging. The antenna Q for the actual measurement differs significantly from the antenna Q of the normal operating state. A change in the antenna Q can thus be used to indicate malfunctioning. FIG. 11C depicts a detected diminution in amplitude between the peak 485 and the expected peak 483.

8. Correction for Mutual Coupling Errors

Figures 12, 13:
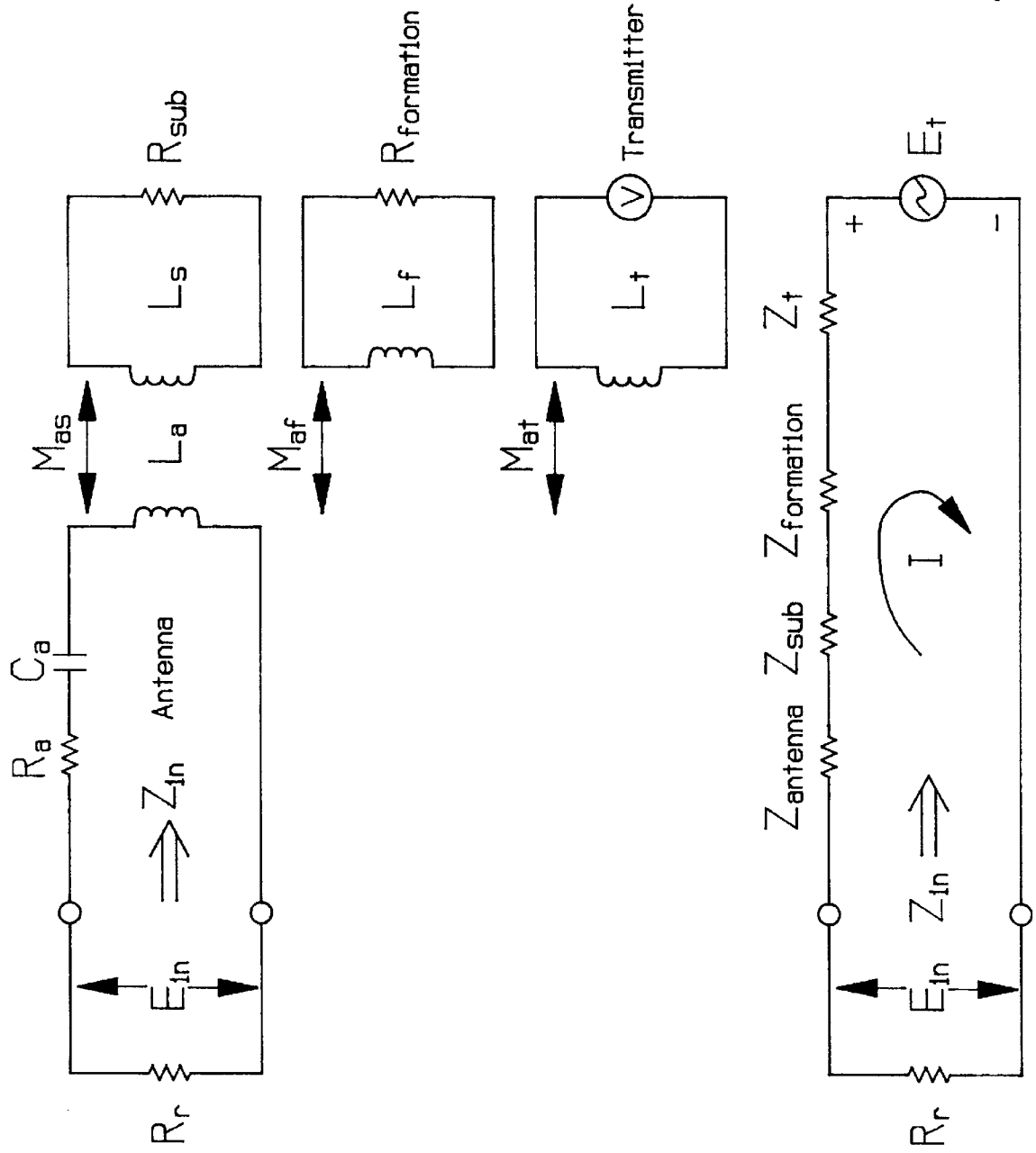
FIG. 12 is a simplified block diagram view of circuit and data processing components which can be utilized to measure the undesired mutual coupling between particular antennas.
FIG. 13 is an equivalent electrical circuit for the circuit of FIG. 12.

FIG. 12 provides an electrical schematic depiction of an equivalent circuit which depicts the relationship between antenna impedance and an antenna transfer function. This can be utilized to explain the inductive coupling which occurs in a logging tool. In this electrical schematic, the impedance of a receiving circuit is identified as $R_r$. The voltage $E_{in}$ across the receiver circuit input represents the receiving antenna's response to the measurement of the propagating electromagnetic field. $Z_{in}$ represents the impedance of the receiving antenna as seen from the receiver electronics. The impedance includes $R_s$ which is the resistive component of the receiving antenna, $C_a$ which is the capacitive component of the receiving antenna, and $L_a$ which is the inductive component of the receiving antenna. This equivalent circuit is mutually magnetically coupled to the steel drill collar logging tool subassembly $R_{sub}$, the surrounding formation $R_{formation}$, and the transmitter. The sub is essentially a resistive component which is mutually coupled through inductive component $L_s$ to the receiving antenna and mutual coupling coefficient $M_{as}$. The formation is essentially a resistive component which is coupled magnetically to the receiving antenna through inductor $L_f$ and the mutual coupling coefficient $M_{af}$. The transmitter is essentially a voltage source which is coupled to the receiving through inductor $L_f$ and the mutual coupling coefficient $M_{at}$. The voltage induced in the receiving antenna from the transmitter is the desired signal and the effect of the formation, sub, and antenna impedance on the measurement of this voltage which are variables which the method of the present invention accounts for. The circuit of FIG. 12 can be reduced to the circuit depicted in FIG. 13, with the impedances of the antenna, the subassembly, the formation, and the transmitter represented respectively as: $Z_{antenna}$, $Z_{sub}$, $Z_{formation}$, and $Z_t$. $E_t$ is the equivalent voltage source in the receiver circuit due to the transmitter. A current I is induced to flow through this equivalent circuit by voltage source $E_t$. As is depicted in FIG. 13, a voltage $E_{in}$ is developed across the receiving circuitry as a result of this current flow. The combined impedance of the antenna, the drill collar subassembly, the formation, and the transmitter is represented in this view as $Z_{in}$. The impedance of the receiving antenna, along with the impedances introduced through normal operation and undesired mutual coupling make up the impedance $Z_{in}$, as is set forth in equation number 7.1 herebelow.

$$Z_{in} = Z_{antenna} + Z_{sub} + Z_{formation} + Z_t \quad \text{EQUATION NO. 7.1}$$

The transfer impedance for the antenna is represented in equation number 7.2 herebelow.

$$R_r + Z_{antenna} + Z_{sub} + Z_{formation} + Z_t = \frac{-E_t}{I} \quad \text{EQUATION NO. 7.2:}$$

This transfer function states that the total current within the equivalent circuit of FIG. 13 is a function of the voltage of the transmitting antenna $E_t$, and all the impedances of the circuit of FIG. 13. The current can also be stated as a function of $E_{in}$ and $R_r$, as is set forth in equation number 7.3 herebelow.

$$I = \frac{-E_{in}}{R_r} \quad \text{EQUATION NO. 7.3:}$$

The transfer impedance for the antenna can be determined from these relationships in accordance with equation numbers 7.4 and 7.5 herebelow.

$$\text{Transfer Function} = \frac{E_t}{E_{in}} = \frac{R_r + Z_{antenna} + Z_{sub} + Z_{formation} + Z_t}{R_r} \quad \text{EQUATION NO. 7.4:}$$

Combining equation number 7.1 with equation number 7.4 yields equation number 7.5.

$$\text{Transfer Function} = \frac{E_t}{E_{in}} = \frac{R_r + Z_{in}}{R_r} \quad \text{EQUATION NO. 7.5:}$$

Note that the transfer function is a simple function of the receiver impedance $R_r$ and the measured antenna input impedance $Z_{in}$.

In the present invention, the particular technique utilized to measure $Z_{in}$ is a conventional "network analysis method." In accordance with this technique, a reflection coefficient $\rho$ is obtained by measuring the ratio of an incident wave to a reflected wave. Typically, a directional coupler or bridge is used to detect the reflected signal, and a network analyzer is used to supply and measure the signals. In the present invention, the numerically controlled oscillator can serve the functions of the network analyzer, since its output attributes (frequency, phase, and amplitude) can be precisely controlled, and further since the actual output is measured over a predetermined frequency interval. Directional couplers are devices which are used to separate or sample a traveling wave moving in one direction on a transmission line while remaining virtually unaffected by a traveling wave moving in the opposite direction. Thus, they are typically utilized in analyzing power transmission lines and the like. They are frequently used in combination with power splitters which receive an input, and provide two equal outputs. In the present invention, both directional couplers and power splitters are utilized to derive the measurements which are utilized in the elimination of the undesired effects of mutual coupling between receiving antennas.

The reflection coefficient is derived from the voltage of the signal reflected from the antenna and the voltage of the signal going into the antenna, in accordance with equation number 7.6 as follows.

$$\rho = \text{reflection coefficient} = \frac{\text{(voltage of signal reflected from an antenna)}}{\text{(voltage of signal going into the antenna)}} \quad \text{EQUATION NO. 7.6:}$$

Furthermore, the impedance of the antenna can be derived from the reflection coefficient and the impedance of the directional coupler $Z_o$ in accordance with equation number 7.7 as is set forth herebelow.

$$Z_{in} = \frac{(\rho+1)}{(\rho-1)} * Z_o \qquad \text{EQUATION NO. 7.7:}$$

Equation numbers 7.5 and 7.7 can be combined to determine the transfer function $E_i/E_{in}$ in terms of $R_r$ (the impedance of the receiver circuit, which is known), $Z_o$ (the impedance of the directional coupler, which is also known), and $\rho$ (the reflection coefficient, which an be calculated from a measurement of the incident signal and a measurement of the reflected signal) as follows in equation number 7.8.

$$Z_{iA} = \frac{R_p * \frac{(a+1)}{a-1} * Z_o}{R_r} \qquad \text{EQUATION NO. 7.8:}$$

From this transfer function the voltage induced into the receiving antenna by the transmitter, Et, may be determined by simply multiplying the receiver voltage by the transfer function as follows in equation number 7.9.

$$\frac{R_r}{B_r} = E_{in} = E_t \qquad \text{EQUATION NO. 7.9:}$$

wherein Et is uncorrupted by changes in $Z_{antenna}$, $Z_{sub}$, $Z_{formation}$, and $Z_t$.

Figure 14:
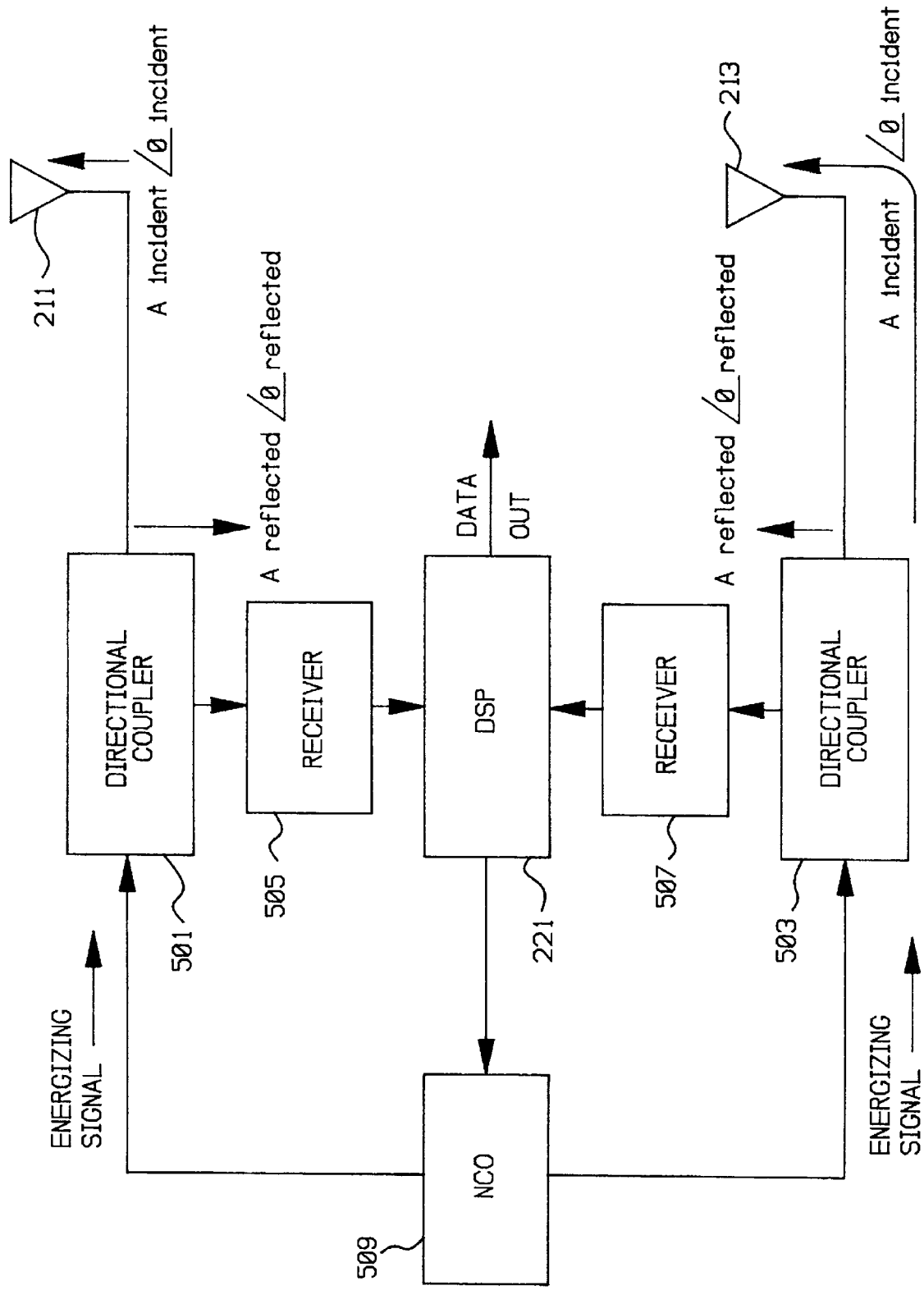
FIG. 14 is a block diagram of the technique for eliminating mutual coupling.
Figure 15:
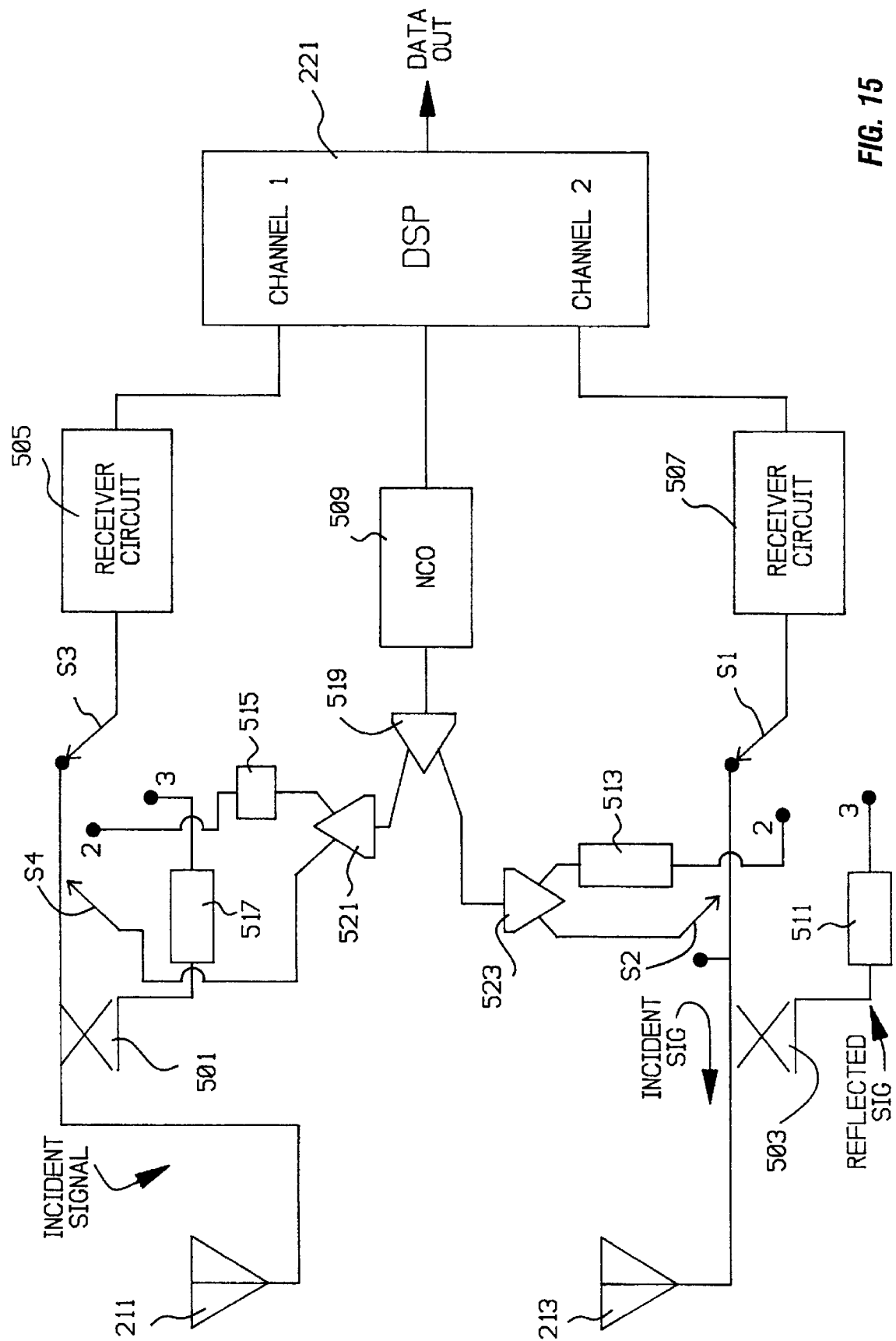
FIG. 15 is a detailed electrical schematic of the block diagram of FIG. 14.

FIG. 14 provides a block diagram view of the components which interact in the measurement process to eliminate the influence of undesired magnetic field mutual coupling between receiving antennas. FIG. 15 is a more detailed view of the components which cooperate together to make this analysis possible.

With reference first to FIG. 14, directional coupler 501, directional coupler 503, and numerically controlled oscillator 509 are especially provided to allow for the measurement which can be utilized to eliminate the effects of undesirable magnetic field mutual coupling between receiving antennas 211, 213. As will be described in connection with FIG. 15, directional couplers 501, 503 are switched in and out of the circuit depending upon whether normal reception operations are desired, or whether a mutual coupling calibration operations are required. Receiver circuits 505, 507 are identical to the receiver circuit depicted in FIG. 5A and described above. The receiver circuit has a characteristic resistance $R_r$ for receiver 605 and $R_r$ for receiver 507. These resistance values are very low (about 50 ohms) and are known with precision. Directional Coupler 501 in FIG. 15 provides a 80 dB isolation between forward and backward traveling signals. Receiving antennas 211, 213 have an effective impedance of $Z_{in}$, which may change with temperature and pressure. Digital signal processor 221 generates, or passes along, commands to numerically controlled oscillator 509 to provide an energizing signal which may be directed through either directional coupler 501 to receiving antenna 211, or through directional coupler 502 to receiving antenna 213. A certain portion of the energizing signal is accepted by receiving antenna 211 or 213, and a portion is reflected back, through directional coupler 501 to receiver 505, or through directional coupler 503 to receiver 507. The reflected signals are processed by digital signal processor 221, and passed to central processor 215. Digital signal processor 221 may simply provide a circuit memory buffer for the storage of data, which is then periodically fetched by central processor 215 for further processing. This activity is represented by the "data out" bus of FIG. 14. In the preferred embodiment of the present invention, each of receiving antennas 211, 213 is analyzed separately.

In broad overview, in the present invention, the technique for correcting a measurement made with a particular receiving antenna for the (corrupting) error component due to undesirable magnetic field mutual coupling is accomplished by making the following measurements over a predefined frequency interval (such as 100 Hertz to 6 megaHertz): (1) direct an energizing signal to a particular receiving antenna, and measure with precision the amplitude and phase attributes of the incident wave; (2) measure with precision the reflected wave which reflects off of the receiving antenna and back through a directional coupler; (3) calculate the reflection coefficient $\rho$ from the measurements of the incident wave and reflected wave; (4) utilize the calculated value of reflection coefficient $\rho$, and the known impedance $Z_0$ of the directional coupler, to calculate the input impedance $Z_{in}$ for the particular receiving antenna; (5) utilize $Z_{in}$ and the known (or fixed) impedance of the receiver circuit $R_r$, to calculate the transfer function for that particular antenna. Note that this determination is made for all operating frequencies of interest.

With specific regard to the preferred embodiment of the present invention, measurements will need to be made for 400 kiloHertz and for 2 megaHertz, since these are the two operating frequencies are utilized during logging operations. Note that the transfer function provides a measure of the ratio of the voltage generated in the receiving antenna as a consequence of an interrogating electromagnetic signal ($E_t$) and the voltage detected at the input of the reception circuit ($E_{in}$). In other words, the transfer function at a particular frequency equals $E_t \div E_{in}$. This transfer function may be applied to measurements made during logging operations to eliminate the influence of the corruption in the detected voltage ($E_{in}$) which is due to magnetic field mutual coupling and thermal (and other) drifts in antenna response. This correction may be accomplished by merely multiplying a detected signal ($E_{in}$) times the transfer function value for the receiving antenna at the interrogation frequency which is sensing the interrogating signal. In this manner, the measurement is corrected to supply an uncorrupted signal $E_t$ for further processing. In the preferred embodiment of the present invention, the mathematical operations which eliminate the corrupting influence of the undesirable magnetic field mutual coupling occur in either digital signal processor 221 or central processor 215.

In other words, for each measurement made by receiving antenna 211, digital signal processor 221 (or central processor 215) automatically fetches a value recorded in memory for the transfer function of receiving antenna 211 at the particular frequency of the interrogating signal which is being utilized. The measurement made utilizing receiving antenna 211 is multiplied by the transfer function value; the resulting product is a measurement value which is corrected for the corrupting influence of undesirable magnetic field mutual coupling between receiving antenna 211 and receiving antenna 213. Likewise, when receiving antenna 213 is utilized to measure an interrogating electromagnetic field, digital signal processor 221 (or central processor 215) fetches the transfer function value for the particular frequency of the interrogating field, and then multiplies that value times the measurement obtained from receiving antenna 213. The product is the measurement made with receiving antenna 213 which has been corrected for the corrupting influence of undesirable magnetic field mutual coupling between receiving antenna 213 and receiving antenna 211. The details of operation are set forth below in the description in connection with FIG. 15.

With reference now to the view of FIG. 15, receiving antenna 211 is depicted as being optionally connected through directional coupler 501 to receiver circuit 505 and digital signal processor 221. Receiving antenna 213 is likewise depicted as being optionally coupled through directional coupler 503 to receiver circuit 507 and digital signal processor 221. Receiving antennas 211, 213 are optionally coupled to the output of numerically controlled oscillator 509 through power splitters 519, 521, and 523. Attenuators 511, 513, 515, and 517 are provided at selected positions within the circuit for load balancing purposes. Preferably, each attenuator provides a 60 dB load. In the circuit of FIG. 15, four switches are provided: switch S1, switch S2, switch S3, and switch S4. Each of these switches is under the control of digital signal processor 221 and/or central processor 215 (of FIG. 5A). Switches S1, S3 are three-positioned switches, whiles switches S2, S4 are two-position switches. Each switch is electrically operable and is under the binary control of a particular output pin of digital signal processor 221. Changes in the binary condition of the output pin of digital signal processor 221 will toggle switches S2, S4 between open and closed positions, while switches S1, S3 are toggled between the three positions.

FIG. 15 will now be utilized to describe six basic measurement operations which underlie and allow the technique of the present invention of eliminating the undesired effects of magnetic field mutual coupling between receiving antennas and phase drift due to high wellbore temperatures or pressures.

Step 1: in this step, switch S1 is set in position number two, switch S2 is closed, switch S3 is placed in position number one, and switch S4 is left open. Numerically-controlled oscillator 509 is coupled to receiving antenna 213 through switch S2 to allow an electromagnetic propagating wave to pass between receiving antenna 213 and receiving antenna 211. Also, in this particular configuration, receiver circuit 507 is connected to receive and monitor the output of numerically controlled oscillator 509 through power splitter 523 and impedance 513 while receiving antenna 213 is energized. Additionally, receiving circuit 505 is connected to monitor the signal originating from receiving antenna 211 in response to the electromagnetic wave which travels from receiving antenna 213 to receiving antenna 211.

Step 2: this step is performed simultaneously with Step 1. Receiving circuit 505 is coupled through switch S3 through receiving antenna 211, and monitors the response of receiving antenna 211 to the electromagnetic propagating wave which is generated at receiving antenna 213 (which is operating as a transmitter) and receiving at receiving antenna 211 (which is operating as a receiver). In Step 2, all the switch positions are identical to those positions of Step 1.

The result of the simultaneous performance of these operations it that channel 1 of digital signal processor 221 records data from receiving antenna 211 through receiver circuit 505, while channel 2 of digital signal processor 221 records the output of numerically controlled oscillator 509 through receiver circuit 507. In the preferred embodiment of the present invention, numerically controlled oscillator 509 is commanded by digital signal processor 221 to step through a predetermined range of frequencies. The data accumulated on channel 1 and channel 2 of digital signal processor 221 thus defines two datasets: one which records the energizing signals supplied to receiving antenna 213 (the "incident signal"), which is operated as a transmitter, and another which records the response of receiving antenna 211 to that energizing signal.

Figure 16A:
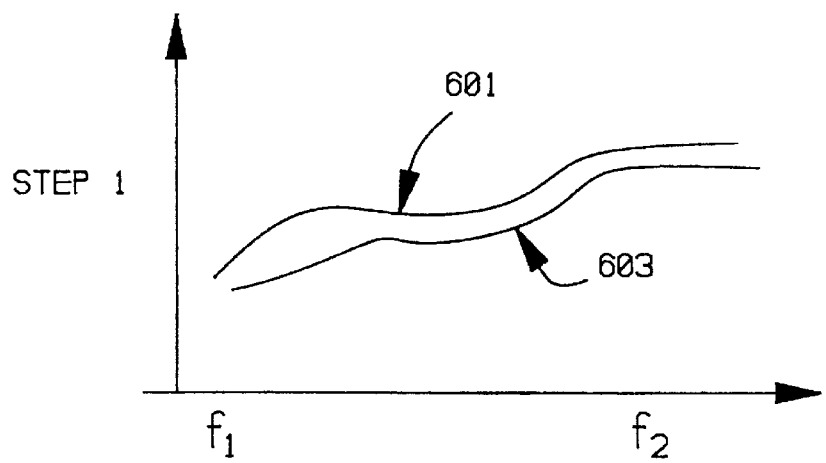
FIGS. 16A, 16B, 16C, 17A, 17B, and 17C depict types of measurements obtained with the circuit of FIG. 15.

FIG. 16A provides a graphic depiction of data which is recorded on channel 2 of digital signal processor 221, with curve 601 providing a view of the amplitude of the output of the numerically controlled oscillator over the predefined frequency range of $f_1$ to $f_2$, and with curve 601 providing a record of the phase attributes of the output of the numerically controlled oscillator 509 for the range of frequencies from $f_1$ to $f_2$. Together, these values for amplitude and phase provide a measure of the "incident signal".

Figure 16B:
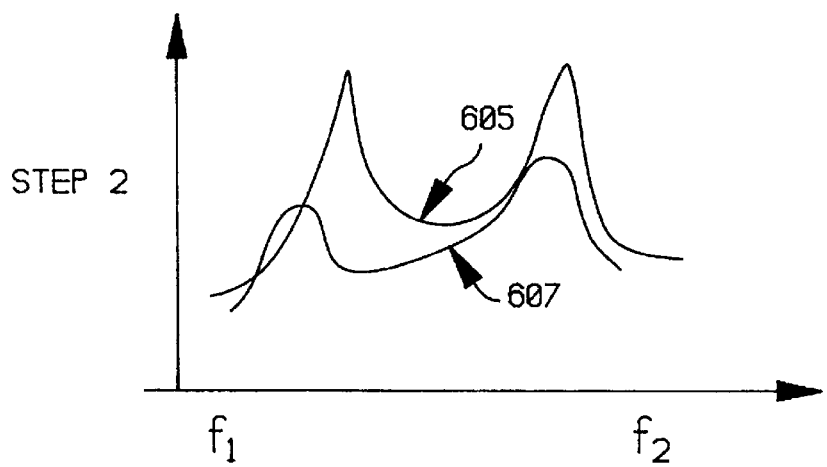

FIG. 16B provides an exemplary view of the type of data which can be recorded on channel 1 of digital signal processor 221, with curve 605 representative of the amplitude response of receiving antenna 211 to the energizing electromagnetic wave provided by receiving antenna 213, over the predefined range of frequencies of $f_1$ to $f_2$, and with curve 607 providing information about the amplitude response of receiving antenna 211 over the same range of frequencies. The information contained in FIG. 16B is similar to that contained in FIG. 10, but provides information about the operating condition of receiving antennas 211, 213.

The type of data analysis which is discussed above in connection with FIGS. 10, 11A, 11B, and 11C can be performed upon the receiver-to-receiver profile. In other words, the signal recorded on channel 1 provides a measure of the combined response of receiving antenna 211 (operating as a transmitter) and receiving antenna 213 (operating as a receiver) in combination with the impact of the borehole and formation on the signal transmission. Data sets can be created for transmission in one direction (receiving antenna 213 operating as a transmitter, and receiving antenna 211 operating as a receiver) as well as the other direction (receiving antenna 211 operating as a transmitter, and receiving antenna 213 operating as a receiver). The data sets assembled for these operations can be compared with profiles developed in the laboratory for normal operation. Changes or shifts in resonant frequency, antenna Q, or the amplitude of response at a particular frequency can provide important information about whether the receiving antennas 211, 213 are operating as desired, or whether they are damaged or out of calibration.

Figure 16C:
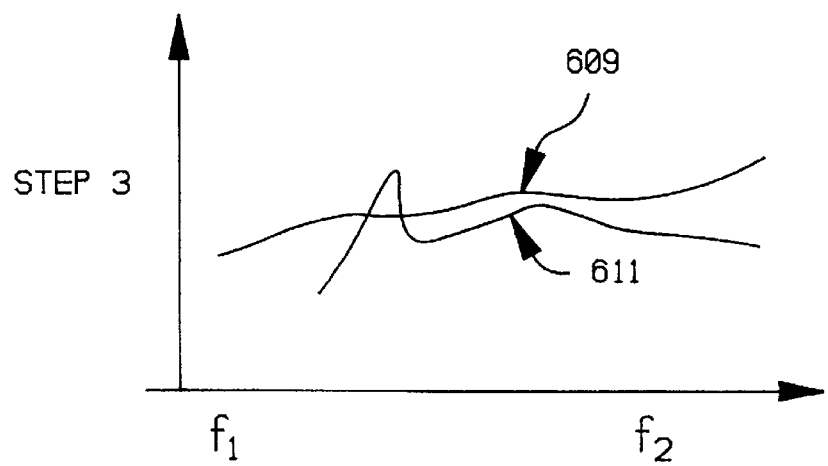

Step 3: in this step, switch 1 is set in position three, and switch 2 is closed. The positions of switch S3 and switch S4 are unimportant for this operation (but an open position is preferred). In this operation, numerically controlled oscillator 509 directs an interrogating signal through power splitter 519, power splitter 523, and switch S3 toward directional coupler 503 and receiving antenna 213. A portion of the energizing signal is accepted by receiving antenna 213, and represents the "incident signal", while a portion is rejected by receiving antenna 213 and represents the "reflected signal." The reflected signal is directed through attenuator 511 and switch S1 to receiver circuit 507. Preferably, numerically controlled oscillator 509 is stepped through a predetermined frequency range, and receiver circuit 507 monitors the reflected signal over the particular frequency range, and ports the data into channel two of digital signal processor 221. FIG. 16C provides a graphic depiction of the type of data which is recorded in channel two of digital signal processor 52, with curve 609 representative of the amplitude attributes of the reflected signal and curve 611 representative of the phase attributes of the reflected signal.

In steps 4, 5, and 6, the process is reversed, with receiving antenna 211 serving as the transmitting antenna. This provides information from a different point of view.

Figure 17A:
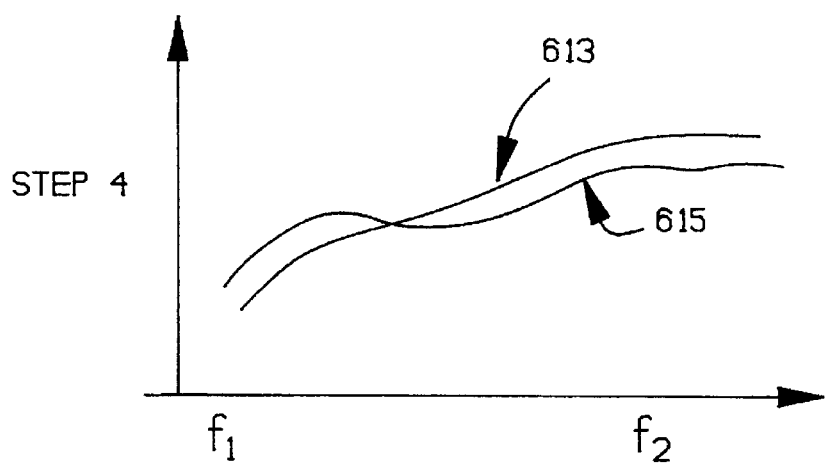

Step 4: in this step, switch S3 is set in position two, switch S4 is closed, switch S1 is set in position one, and switch S2 is left open. In this configuration, numerically controlled oscillator 509 may be stepped through a predefined frequency range, and receiver circuit 505 can record the amplitude and phase of the output of numerically controlled oscillator 509 (the "incident signal"), and provide this to channel one of digital signal processor 221. FIG. 17A provides a view of the type of amplitude 613 and phase 615 data which may be recorded during this operation.

Figure 17B:
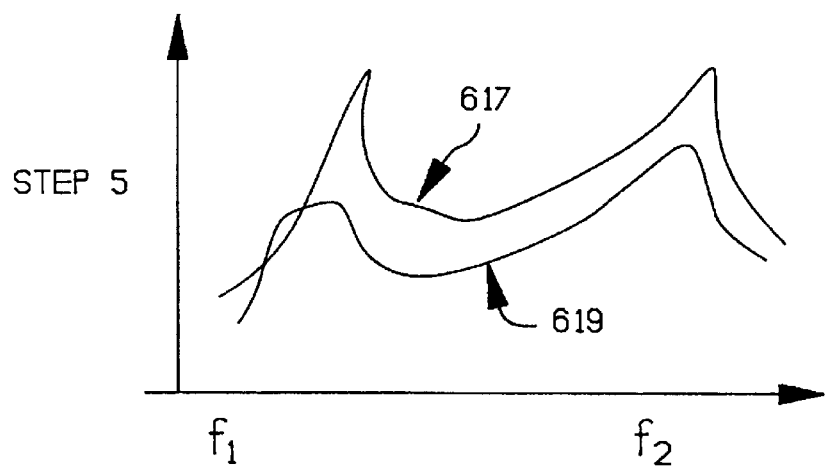

Step 5: This step is performed simultaneously with step 4. With the same particular switching configuration of Step 1, receiving antenna 211 is supplied with an energizing signal, causing an electromagnetic wave to propagate toward receiving antenna 213. Receiving antenna 213 responds to the propagating electromagnetic signal, and this response is monitored by receiver circuit 507 and recorded on channel two of digital signal processor 221. FIG. 17B graphically depicts the amplitude response curve 617 and the phase response curve 619, both over the predetermined frequency range.

Figure 17C:
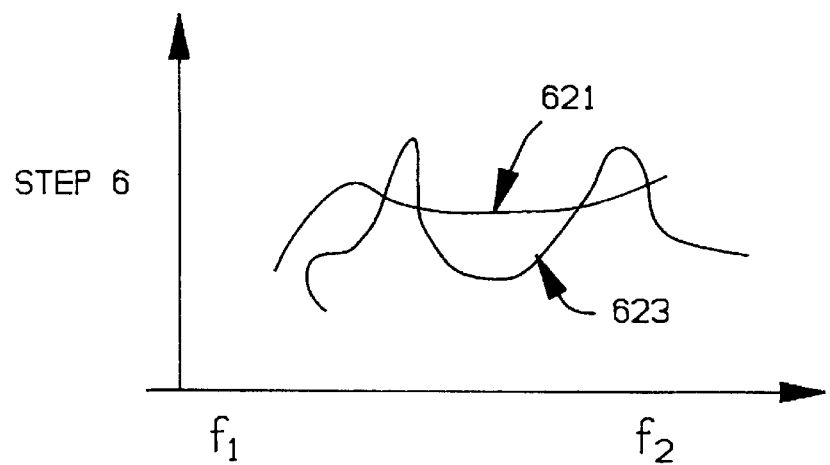

Step 6: in this step, switch S3 is set in position three, switch S4 is closed, switch S1 is set in position 1, and switch S2 is left open. In this particular switching configuration, the energizing signal provided by numerically controlled oscillator 509 is directed toward receiving antenna 211. A portion of the energizing signal is accepted by receiving antenna 211, and a portion is reflected. The reflected portion is routed through attenuator 517 and switch S3, where it monitored by receiver circuit 505, and recorded to channel one of digital signal processor 221. FIG. 17C provides a graphical depiction of the datasets which are maintained in channel one of digital signal processor 221 in graphic form.

In the preferred embodiment of the present invention, the data from these operations are arranged in data arrays, to allow for the use of conventional data manipulation operations in order to detect or identify particular attributes of the dataset, such as maximum responsiveness, minimum responsiveness, rates of change of the data, and the relative position of particular data attributes. Diagnostic operations can be performed utilizing these datasets. For example, the responses recorded in datasets corresponding to the information displayed in graphical form in FIGS. 16A and 17A may be compared. Since the numerically controlled oscillator 509 has "phase coherency," the amplitude and phase measurements of the datasets of FIGS. 16A and 17A should be identical. The failure to find similarity, or the discovery of dissimilarity, can serve to diagnose a variety of mechanical problems, including broken switches, a malfunctioning receiver, or other component failure. For an alternative example, the datasets which are visually represented in FIGS. 16B and 17B may be compared. The curves of FIGS. 16B and 17B should be identical, since they represent the combined response of the receiving antennas and the borehole region intermediate the receiving antennas.

Figure 18:
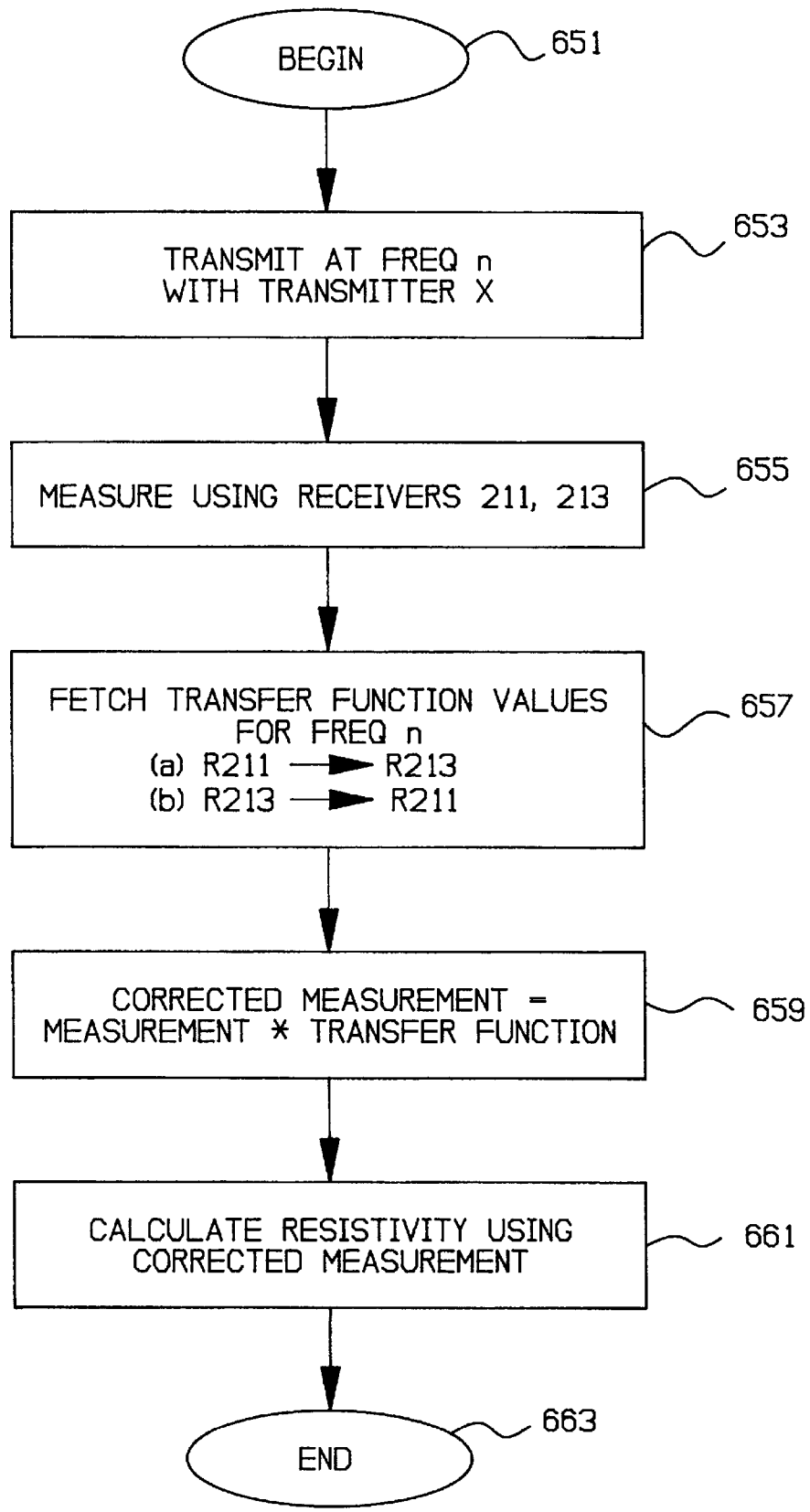
FIG. 18 is a flowchart representation of the technique of eliminating the corrupting influence of mutual coupling and antenna drift.

FIG. 18 is a flowchart depiction of the preferred technique of the present invention for correcting for the undesired corrupting influence of (1) magnetic filed mutual coupling between receiving antennas, and (2) any drift in antenna response. The process begins at flowchart block 651. In block 653, a particular transmitter is energized with a current having a particular frequency to generate an electromagnetic field which propagates through the borehole, and which is detected at receivers 211, 213, in accordance with software block 655. Then, in accordance with software block 657, digital signal processor 221 or central processor 215 fetch transfer function values for the particular operating frequencies for (a) the mutual coupling impact of receiving antenna 211 on receiving antenna 213, and (b) the mutual coupling impact of receiving antenna 213 on receiving antenna 211. Then, in accordance with software block 659, the transfer function value of the impact of receiving antenna 211 on receiving antenna 213 is applied to the measurements made with receiving antenna 213. Then, the transform value for the impact of receiving antenna 213 on receiving antenna 211 is applied to the measurements made with receiving antenna 211. Then, in accordance with software block 661, resistivity values for the formation are calculated using the corrected measurements, and the process ends at block 663. These operations are performed for every measurement made during logging operations. The transfer functions associated with transmission operation frequencies of 400 kiloHertz are utilized to correct for mutual coupling and thermal error components present during 400 kiloHertz logging operations, while the transfer functions associated with 2 megaHertz are utilized to correct for the influence of mutual coupling and drift components during 2 megaHertz transmission operations.

9. Borehole Caliper Operations

Figure 19:
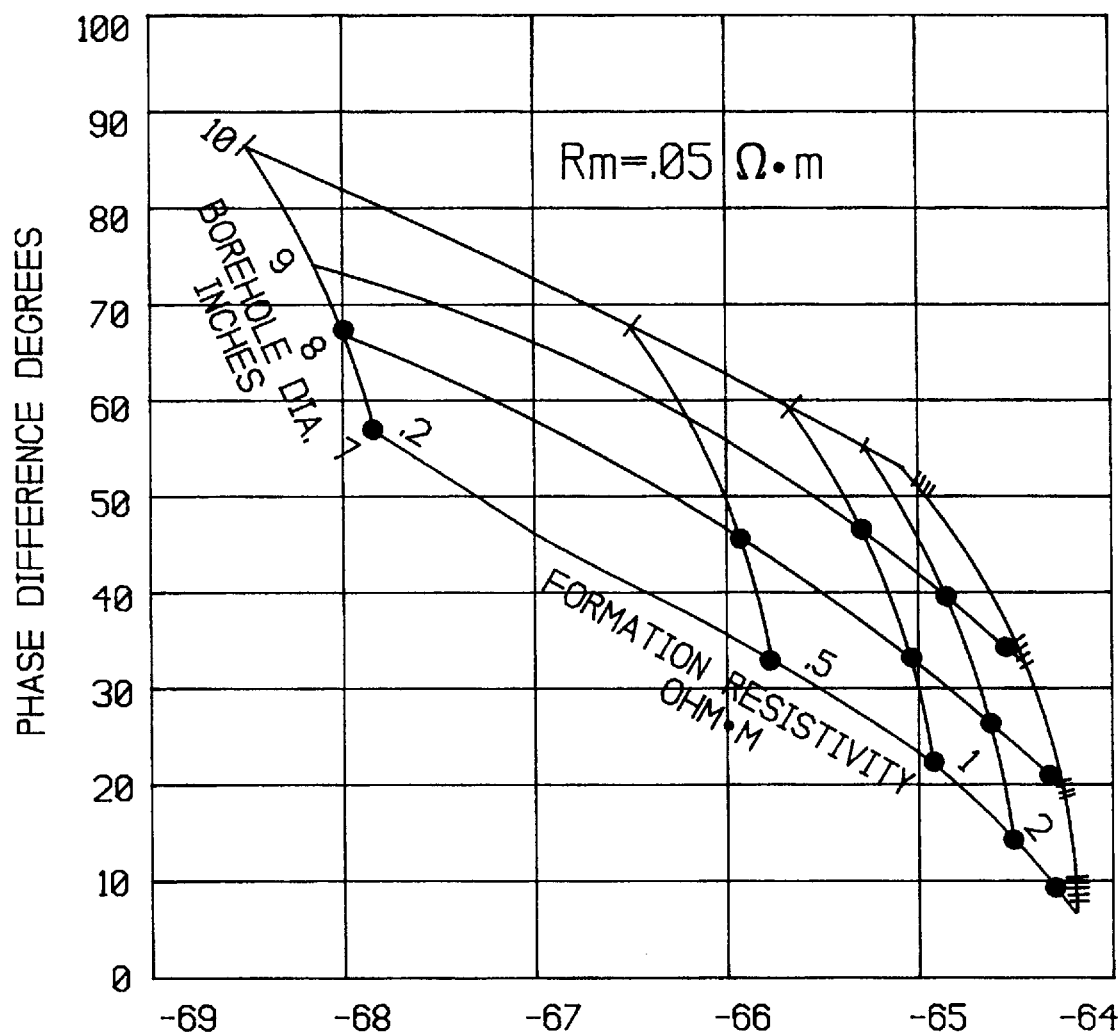
FIG. 19 is a graph which depicts how amplitude attenuation and phase shift measurements can be used to determine borehole diameter.

The ability to accurately calculate amplitude attenuation and phase shift, which are uninfluenced by mutual coupling and drift errors, allows for meaningful wellbore calipering operations. An accurate determination of the amplitude attenuation caused by the formation alone or the wave propagating between receiving antennas 211, 213, and an accurate measure of the phase difference between receiving antennas 211, 213, can be utilized with a library of graphs or data which are recorded in computer memory. FIG. 19 depicts a graph of phase difference in degrees versus attenuation in dB. With respect to these X- and Y-axes, a plurality of curves are provided. A plurality of curves are provided which correspond to borehole diameter, in inches. In FIG. 19, borehole diameters of 7", 8", 9", and 10" are graphed. A plurality of curves are provided which represent formation resistivity in ohm*meters. FIG. 19 depicts formation resistivity measurements of 0.2 ohm*meters, 0.5 ohm*meters, 1.0 ohm*meters, 2.0 ohm*meters, and 200 ohm*meters. This graph is accurate when the drilling mud has a resistivity of 0.05 ohms*meters ($R_m$). The graph of FIG. 19 is merely an exemplary graph. In practice, a plurality of graphs or datasets are provided for a plurality of mud resistivities $R_m$.

Provided that the formation resistivity and the mud resistivity $R_m$ are known, the amplitude attenuation and phase shift of the electromagnetic interrogating field can be utilized to determine the diameter of the borehole in the region of the logging apparatus. For example, with reference to FIG. 19, assuming that the formation resistivity is 0.5 ohm*meters and the mud resistivity $R_m$ is 0.05 ohm*meters, a calculated amplitude attenuation of −66 dB and a phase difference of 55° indicates that the borehole has a diameter of approximately 9". In accordance with the present invention, central processor 215 and digital signal processor 221 can be programmed to periodically or intermittently calculate borehole diameter, and transmit it to the surface utilizing mud pulse telemetry techniques. If the borehole diameter is enlarged to 10", this should be reflected by changes in the amplitude attenuation and phase shift. In contrast, if the borehole narrows in diameter to 8", this would also be reflected in the amplitude attenuation and phase shift measurements. Borehole calipering operations can only be conducted if uncorrupted measurements of amplitude attenuation and phase shift can be obtained. Since the present invention allows for the correction of any corrupting influence of magnetic mutual coupling, or thermal and other types of drift, such measurements can be utilized to accurately determine borehole diameter. In the preferred embodiment of the present invention, a plurality of data sets are provided, each corresponding to a different mud resistivity $R_m$ and a particular formation resistivity. The measurements of amplitude attenuation and phase shift are then utilized to determine borehole diameter.

10. The Determination of Dielectric Properties

The logging tool of the present invention may be utilized for the measurement of geophysical parameters of earth formations penetrated by a borehole and more particularly utilized to make propagation resistivity measurements at multiple frequencies and at multiple transmitter-receiver spacings. Measurements are made by using one or more transmitters which induce an alternating voltage into the borehole and the earth formation penetrated by the borehole and by using one or more longitudinally spaced receivers to detect the amplitude and phase of electromagnetic radiation induced within the borehole and earth formation. The measured responses are affected by properties of the earth formation including electrical conductivity, magnetic permeability, dielectric permeability and the pore volume of porosity of the rock matrix. In addition, the borehole environs also affect the measurements. The following text describes means and methods for determining the conductivity of formation water, the dielectric constant of the composite of the rock matrix and any oil saturation within the pore space of the rock matrix, and the water filled porosity of the rock matrix. By combining the measurements with other borehole devices which measure total effective formation porosity, the oil saturation of the formation can be computed even in formations with fresh waters.

Induction techniques have been used for a number of years to determine the resistivity and other electromagnetic parameters of earth formations penetrated by a borehole. Historically, formation resistivity has been the primary parameter of interest since it is used to delineate hydrocarbons from saline waters. Resistivity measurements can not be used to delineate hydrocarbons from relatively fresh waters due to a lack of contrast in the resistivities of the two fluids. Conceptually, an alternating current is applied to a transmitter of a borehole instrument thereby generating a primary electromagnetic field in the earth formation in the vicinity of the transmitter. The primary field interacts with the earth formation thereby setting up a secondary field with the amplitude and phase of this secondary field being related to electromagnetic properties of the formation. Fluids in the borehole and the invasion of these fluids into the formation can adversely affect the measure of electromagnetic properties of the undisturbed or virgin formation. Multiple receivers located at different longitudinal spacings from the transmitter are employed to measure the secondary field and, among other functions, to produce additional measurements which are used to minimize the effects of the borehole and near borehole environs. Although correction for borehole effects is not a major objective of the present invention, the subject will be somewhat pertinent in this disclosure and the concept is hereby introduced as a precursor to discussion which will follow.

A review of the physical properties and principles involved in the present invention will now follow. Phase shift and attenuation measurements in the low megahertz (MHz) frequency range are dependent upon only three electromagnetic properties and the manner in which these three properties are combined and spatially distributed near the borehole transmitter and receiver assembly. The three properties that control, as an example, the propagation of a 2 MHz electromagnetic wave are (1) magnetic permeability, (2) conductivity, and (3) dielectric permittivity. The primary parameter of interest is conductivity (or resistivity) since this is the primary parameter used in hydrocarbon saturation calculations if the connate water is saline. In order to relate the measured phase shift and attenuation measurements made with the borehole instrument to conductivity, assumptions must be made concerning the magnetic permeability and dielectric permittivity of the formation.

Magnetic permeability is defined as the ability of magnetic dipoles in the formation to align themselves with an external field. Minerals and fluids commonly found in sedimentary earth formations do not exhibit significant magnetic permeability. In computing resistivities from measurements of amplitude and phase measurements from a device operating in the mid kilohertz (KHz) to low MHz frequency range, minimal error is introduced in assuming a value of magnetic permeability to be equal to that of free space, or $1.25 \times 10^{-6}$ Henrys/meter.

Conductivity is defined as the ability of a material to conduct an electric charge, while dielectric permittivity is defined as the ability of a material to store an electric charge. Dielectric permittivity is usually expressed in terms of relative dielectric constant, $\epsilon_r$, which is the dielectric permittivity of the substance in question divided by the dielectric permittivity in free space, $\epsilon_0 = 8.854 \times 10^{-12}$.

Attenuation is now turned to dielectric permittivity and the physical principles behind the effects of this parameter upon attenuation and phase signals measured in a borehole environment. In sedimentary formations, dielectric permittivity arises from the ability of electric dipoles to align themselves with an alternating electromagnetic field induced by the borehole instrument. Water molecules will be used for purposes of discussion. There are three phenomena contributing to $\epsilon_r$ in a porous earth formation. The first contribution is the rotation of dipolar water molecules. The water molecule has a slight positive charge on the side to which are bound the two hydrogen atoms, and a corresponding negative charge on the side of the molecule opposite to the bound hydrogen atoms. In the presence of an applied electric field, the water molecule will rotate to align the positive and negative poles of the molecule with the applied electric field. In an alternating (AC) filed such as that produced by the borehole instrument, the water molecule will rotate back and forth as the polarity of the applied field alternates. During the time period in which the water molecule is in actual rotation seeking to align with the applied field, the movement of the charge represents electrical charges moving in phase with the applied field and are therefore carrying current and contributing to the composite formation conductivity. Once aligned with the field, the polarized water molecules represent fixed or stored charges and thereby contribute to the formation permittivity until the polarity of the alternating applied field is reversed. At this time, the water molecules again rotate contributing again to composite formation conductivity. This sequence, of course, repeats with the cycling of the applied AC field. Ions dissolved in the formation pore water are a second contributor to $\epsilon_r$ in that they will also be set in motion by the applied AC field and migrate in the direction of the field until they encounter a physical obstruction such as a rock grain forming the boundary of the pore space. Once the ions abut the pore boundary and being to accumulate, they likewise become fixed or "stored" charges thereby contributing to the formation dielectric permittivity as described by M. A. Sherman, "A Model for the Frequency Dependence of the Dielectric Permittivity of Rock", *The Log Analyst*, Vol. 29, No. 5, September–October, 1988. Cations attached to cation exchange sites on the surface of certain clay minerals are a third contributor to $\epsilon_r$ in that they can also move under the influence of an applied AC field. The movement of cations between various exchange sites produces effects similar to those of free ions in the pore water.

Complicating the issue of dielectric effects if the fact that $e_r$ values are dependent upon the frequency of the applied field. At low frequencies, dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Likewise, the movement of cations can be completed prior to the reversal of the field polarity. Therefore, at low frequencies, water molecules, dissolved ions and cations spend most of their time in a fixed orientation or position and only a small fraction of the time moving during any given cycle of the applied AC electromagnetic field. At high frequencies, however, the polarity of the applied field will reverse before the three types of mobile charges come to rest. In this situation, the mobile charges spend most of their time moving in phase with the external electromagnetic field thereby increasing the conductivity and resulting in a lower dielectric constant. The phenomena of changing dielectric and conductivity values with frequency is known as dispersion. The frequency at which the rotating molecules or mobile ions can no longer keep pace with the oscillating field is known as the "relaxation frequency". The relaxation frequency, relative dielectric constant $\epsilon_r$, and conductivity will depend upon various factors such as porosity, mean pore size, the resistivity of the water $R_w$, and shale mineralogy as described in the previously cited reference by Sherman.

J. C. Sims, P. T. Cox and R. S. Simpson, "Complex Dielectric Interpretation of 20 MHz Electromagnetic Logs", Paper SPE 15486, 61st *Annual Technical Conference and Exhibition of the Society of Petroleum Engineers,* Oct. 5–8, 1986, teaches the use of a mixing formula to interpret dielectric log data, but measurements made at only one frequency are employed. U.S. Pat. No. 3,891,916 to R. A. Meador et al teach the use of two frequencies, both much higher than 2 MHz, to determine dielectric constant. Meador et al, however, teach the use of amplitude measurements to determine dielectric constant and resistivity and do not address the problem of dielectric dispersion using two frequencies with both amplitude and phase measurements. U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency. K. S. Cole and R. H. Cole, "Dispersion and Absorption in Dielectrics", *Journal of Chemical Physics,* Vol. 9. P 341 (1941) disclose a model for dielectric dispersion which can be used as a mixing model in a somewhat similar to the previously referenced CRIM model and could be used as an element in the embodiment of the current invention. There are many other mixing and dispersion models that might also be used.

This brief view of pertinent basic physical principles will assist in fully disclosing the means and methods of the current invention and advances of the current invention over prior art.

The present invention is directed toward the accurate measure of the conductivity (or resistivity) of earth formation penetrated by a borehole. As discussed previously, formation resistivity combined with formation porosity and connate water resistivity can be used to compute formation hydrocarbon saturation of a porous formation. The invention is further directed toward the determination of the dielectric constant of the formation. This measurement is used to correct resistivity measurements made at certain frequencies for the adverse effects of the dielectric permittivity of the formation. The invention is directed still further toward the determination of the volume fraction of the formation saturated with water. This measurement, when combined with an independent measure such as a neutron porosity measurement which responds to total formation liquid (water plus liquid hydrocarbon), can be used to determine hydrocarbon saturation of the formation in either fresh or saline water environments. Hydrocarbon saturation can not be determined using resistivity measurements only in fresh water environments since the resistivity of fresh water and hydrocarbon exhibits little contrast. How these objectives are obtained will now be described.

Solutions to Maxwell's equations in homogeneous lossy media are a function of a factor commonly referred to as the propagation constant or wave number, defined herein as "k", which contains conductivity, dielectric constant and magnetic permeability terms. A plane wave solution will have the form:

$$V = Ce^{Ux} \qquad \text{EQUATION NO. 10.1:}$$

where
V=a field variable;
C=a constant
e=the naperian log base
i=the square root of −1;
x=the distance traveled; and $$k = [(\omega^2 \mu_o \mu_r \epsilon_o \epsilon_x) + (i\omega \mu_o \mu_r \sigma)]^{1/2} \qquad \text{EQUATION NO: 10.2:}$$

where:
$\mu_o$=the magnetic permeability of free space;
$\mu_s$=the relative permeability (which is 1.0 for free space and most earth materials);
$\epsilon_o$=the dielectric pormittivity of free space;
$\epsilon_r$=the relative dielectric constant (which is 1.0 in free space);
$\omega$=the angular frequency of the applied field; and
$\sigma$=the conductivity which is the inverse of resistivity.
the term k can be rewritten in terms of a relative complex dielectric constant, $\epsilon_o$ which includes the effect of dielectric constant and conductivity, as $$k = k_e \sqrt{\epsilon_c} \sqrt{\mu_r} \qquad \text{EQUATION NO. 10.3:}$$

where
$k_o$=the wave number in free space;
$\mu_r$=1; and
$\epsilon_c = [\epsilon_r + i\sigma(1/\omega\epsilon_m)]$ We now assume a model of the earth formation wherein there are two layers of different propagation constants k and different complex relative dielectric constants $\sigma_c$ with the first region spanning (1−φ) units of length and the second region spanning φ units of length. A plane wave incident on the layers and passing through the layers without reflection will have the form $$\phi^{ik_2\phi4} \phi^{ik_2(1-\sigma)} \phi^{i(k_2\sigma - k_4(1-\sigma 0))} \qquad \text{EQUATION NO. 10.4:}$$

where the subscripts 1 and 2 denote parameters associated with layers 1 and 2 respectively.

The effective propagation constant for this model, $k_{\it{eff}}$, is therefore $$k_{\it{eff}} = k_o \sqrt{\epsilon_{\it{eff}}} = k_o [\sqrt{\epsilon_{c,2}} \, \phi + \sqrt{\epsilon_{c,1}} \, (1-\phi)] \qquad \text{EQUATION NO. 10.5:}$$

where $\epsilon_{c,1}$ is the complex relative dielectric constant in region 1, and $\epsilon_{c,2}$ is the complex relative dielectric constant in region 2.

Equation number 10.5 is solved for the equivalent relative dielectric constant to obtain

EQUATION NO. 10.6:

$$\epsilon_{eff} = \epsilon_{c,2}\phi^2 + \epsilon_{c,1}(1-\phi)^2 + 2(1-\phi)\phi\sqrt{\epsilon_{c,1}\epsilon_{c,2}}$$

Considering all of the above relationships leading to equation number 10.6, it is apparent that the effective real relative dielectric constant is therefore corrupted by the imaginary parts of the relative dielectric constants of the two regions and likewise the effective conductivity is corrupted by the real parts of the relative dielectric constants. The model is now further related to actual earth formations. The first region is equated to connate water filling the pore space of the rock matrix with the water fractional volume being $\phi$ of the total formation volume. The second region is equated to the rock matrix with the rock matrix fractional volume being $(1-\phi)$ of the total formation volume. Expanding equation number 10.6 to illustrate real and imaginary components and designating terms with respect to the above formation model yields.

EQUATION NO. 10.7:

$$\epsilon_{r,eff} + i\sigma_{eff}/\omega\epsilon_o = \phi^2\epsilon_w + 2\phi(1-\phi)\sqrt{(\epsilon_w + i\sigma_w/\omega\epsilon_o)\epsilon_m} + (1-\phi^2)\epsilon_m$$

wherein the subscripts w and m designate parameters associated with the water and rock components of the formation, respectively. Note that $\sigma_m$ is equal to zero. If measurements are made at two known frequencies $\omega=\omega_1$, $\omega_2$, equation number 10.7 yields two independent complex equations. Because both real and imaginary parts of these equations must be equal, measurements at two frequencies actually yield four independent equations. The dielectric constant of water, $\epsilon_w$, is independent of the salinity of the water thus is a known quantity. The two frequencies are predetermined thus are known. The quantities $\epsilon_{eff}$ and $\sigma_{eff}$ are measured. The four independent equations can, therefore, be used to solve for the remaining three unknown quantities, namely the porosity $\phi$, the conductivity of the water $\sigma_w$ and the dielectric constant of the rock $\epsilon_m$.

It is noted that a plurality of transmitter-receiver-operating frequency combinations can be used in embodiments of the invention as long as the chosen combination yields four independent equations relation $\sigma_{eff}$ and $\epsilon_{eff}$ to $\sigma_w$, $\epsilon_m$, and $\phi$. It should also be noted that the dielectric constant of the rock matrix and the dielectric constant of any hydrocarbon contained within the pore space of the rock are essentially equal and the conductivity of each is essentially zero. The computed quantity $\phi$ is therefore the fraction of water within the formation and not necessarily the effective porosity of the formation in the sense commonly used in the art. In order to obtain effective formation porosity, it is necessary to combine the "water filled" porosity yielded by the present invention with a second, independent, measure of formation porosity which responds to the total fluid filled porosity. An example of such a second measurement would be a thermal neutron "porosity" measurement which responds to the hydrogen content of the formation. Since most hydrogen in earth formation resides in the pore space rather than the rock matrix and since the response is essentially the same for both water and liquid hydrocarbons, the neutron porosity measurement yields total liquid porosity.

The invention is directed toward, but not limited to, MWD applications. The downhole apparatus comprises a drill collar, at least one transmitter and at least one receiver. The transmitter comprises a coil of one or more windings about the outside of the drill collar. The receiver likewise comprises a coil of one or more windings about the outside diameter of the drill collar and spaced longitudinally from the transmitter. It is a common practice of use a multiplicity of transmitters and receivers, all of which are longitudinally spaced along the drill collar and electrically insulated from the metallic drill collar. Multiple transmitters and receivers are employed for a number of reasons which include the minimization of borehole and near borehole effects and the measure of amplitude and phase at different radial positions with respect to the center of the borehole or, using terminology common in the art, to measure response at differing "depths of investigation". These applications will be discussed briefly. For purposes of disclosing the current invention, discussion will be focused upon one transmitter operating at two frequencies and one receiver pair which measures amplitude ratio and phase difference signals induced by the transmitter at each of the two frequencies.

Figure 20:
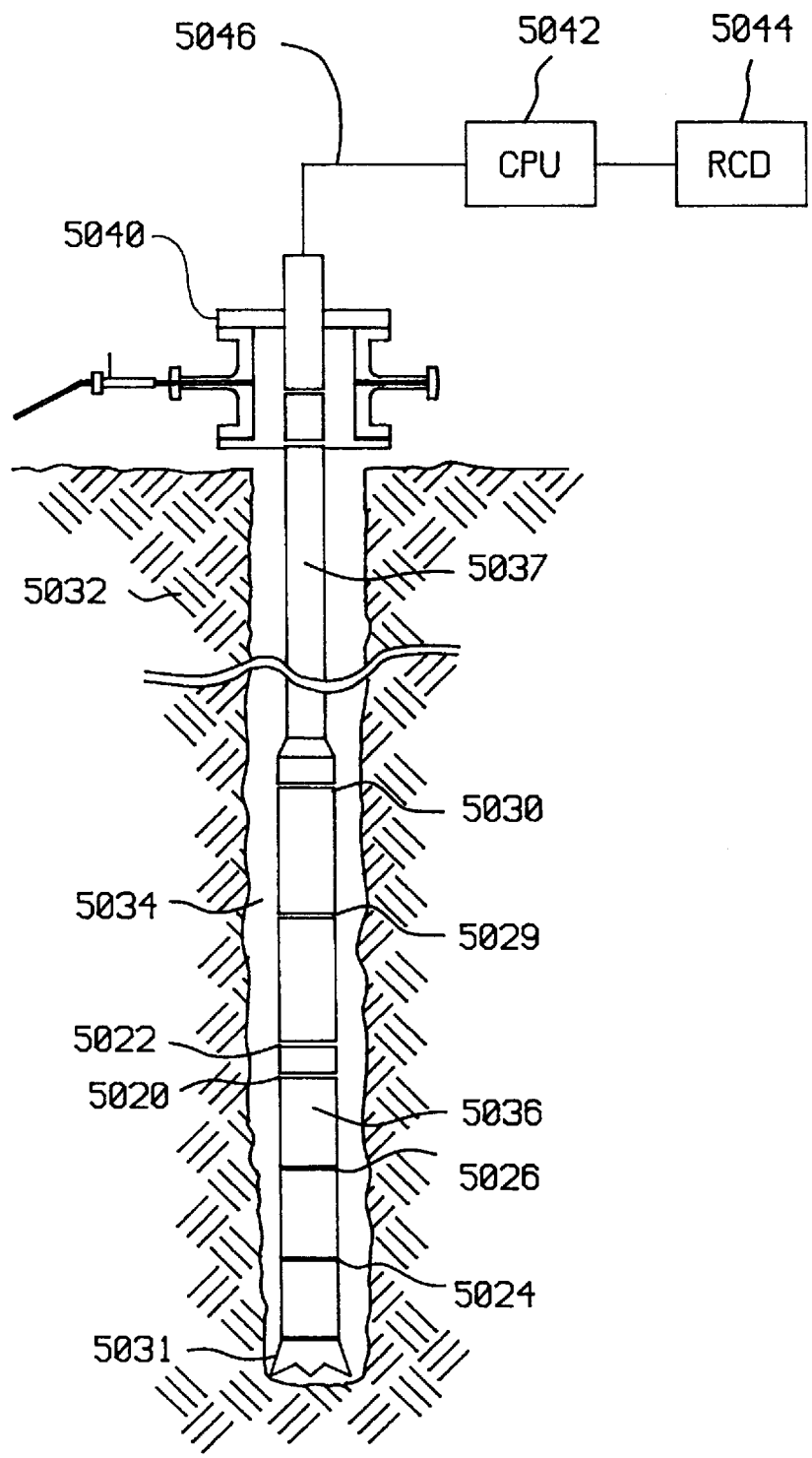
FIG. 20 illustrates the invention in a measurement-while-drilling (MWD) embodiment.

The invention employed in a MWD environment is illustrated in a very general manner in FIG. 20. The drill bit 5031 is attached to the metallic drill collar 5036 which, in turn, is mounted on the wellbore drill string 5037. This assembly is shown suspended in a wellbore 5034 which penetrates the earth formation 5032. A means for rotating the drill string 5037 is identified by the numeral 5040. Four transmitter coils of one or more turns are identified by the numerals 5026, 5024, 5029, and 5030. The axes of the coils are coincident with the axis of the drill collar 5036. The coils are electrically insulated from and slightly recessed within the outer diameter of the drill collar thereby comprising integral elements of the collar assembly. Two receiver coils are identified by the numerals 5020 and 5022. The geometries of these coils are quite similar to the geometries of the transmitter coils and again comprise integral elements of the collar assembly 5036. Transmitter coils are arranged symmetrically on either side of the midpoint between receiver coils 5020 and 5022. Power sources and control circuitry for the transmitters and receivers are not shown. Data recorded by the receivers can be either transmitted in real time to the surface using drilling fluid pulsing means (not shown) or alternately can be reduced with recording means downhole (not shown) for later retrieval. For the real time data transmission embodiment, signals from the receivers are transmitted to the surface by a path means generically denoted by the numeral 5046, transferred to a CPU for processing and correlated with depths from a drill collar depth indicator (not shown), and output to recorder 5044 which displays the computed parameters of interest as a function of depth at which the input measurements were made. An alternate embodiment comprises a processor unit (not shown) mounted within the drill collar 5036 to perform data processing downhole. Memory capacity is usually limited in MWD borehole instruments. In order to most effectively utilize memory capacity, it is often desirable to process measured data downhole and store processed results rather than the more voluminous measured data.

Figure 21:
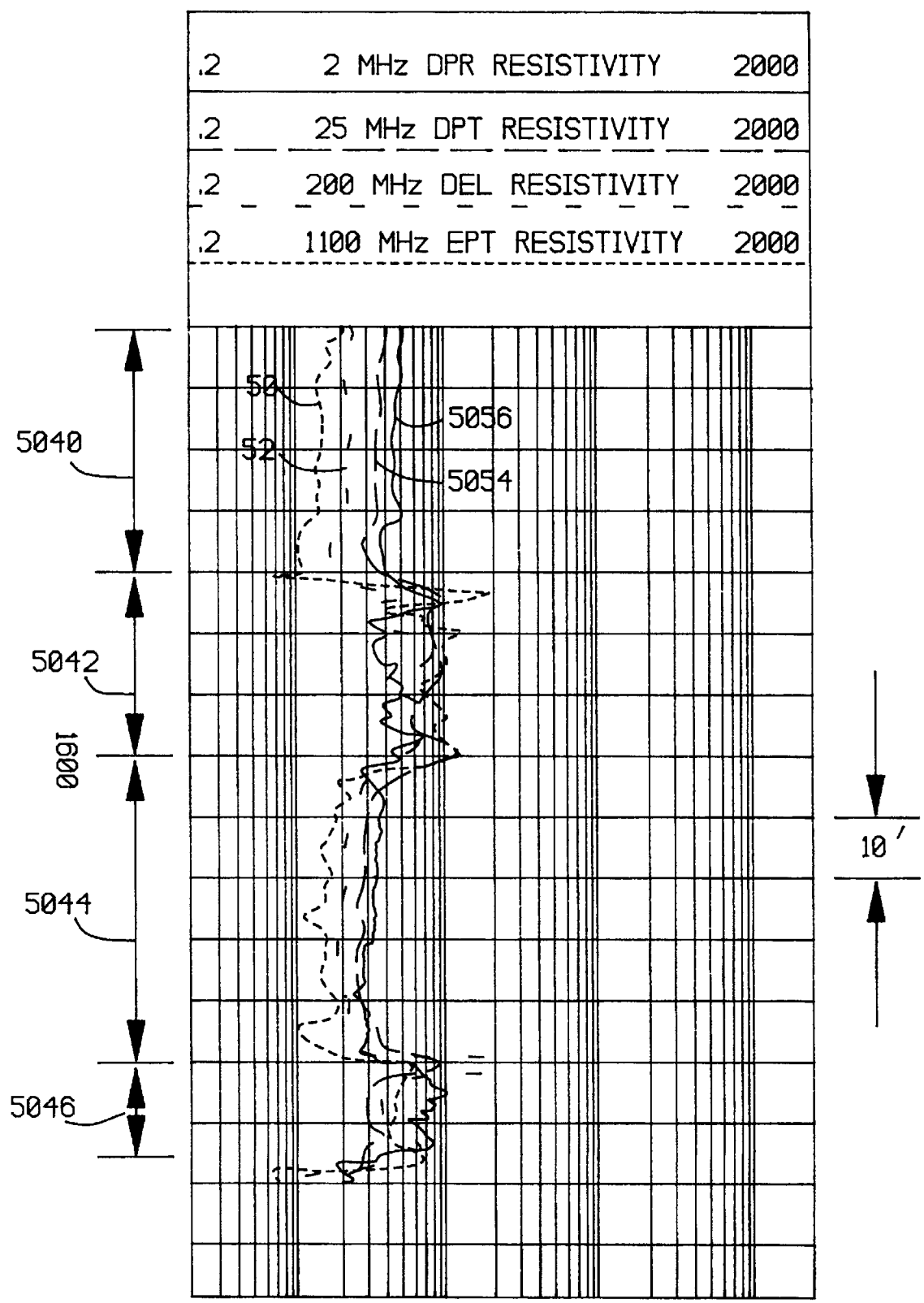
FIG. 21 shows apparent resistivity measured at four difference transmitter frequencies and recorded as a function of depth within a well borehole.
Figure 22:
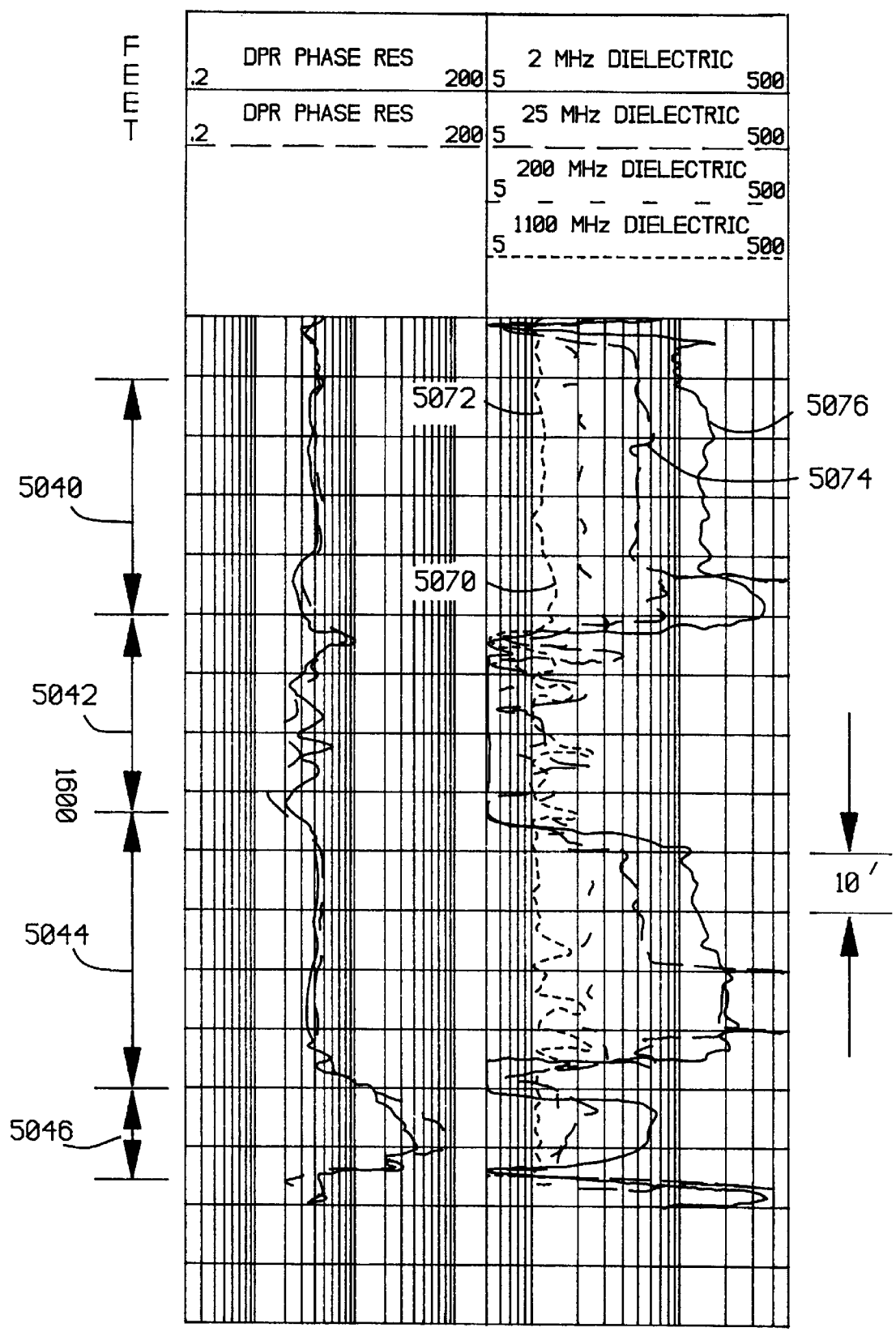
FIG. 22 shows apparent dielectric constant determined at four transmitter frequencies and recorded as a function of depth within a well borehole.
Figure 23:
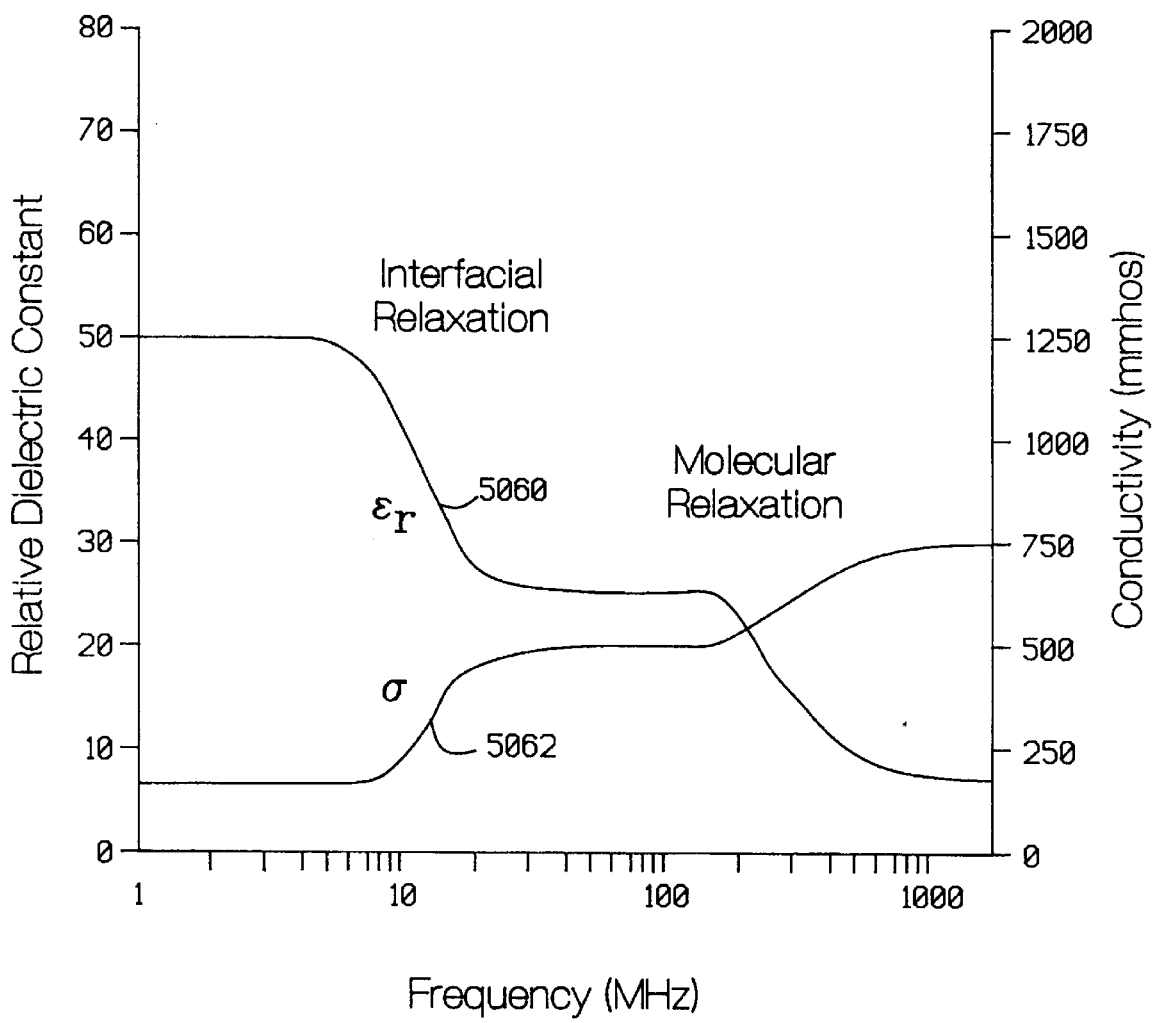
FIG. 23 illustrates the variation of measured relative dielectric constant and conductivity as a function of transmitter frequency.
Figure 24:
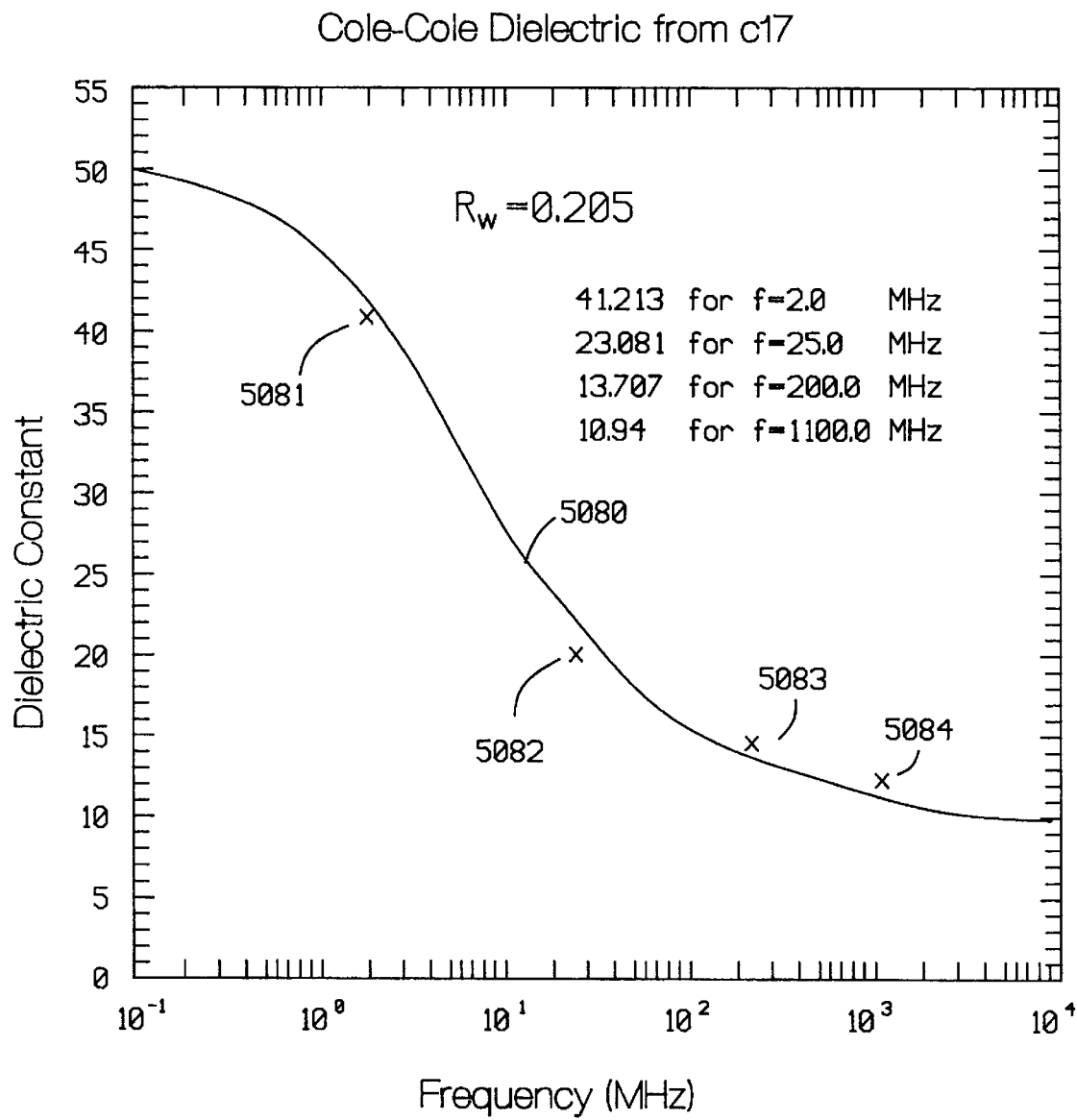
FIG. 24 depicts a plot of computed variation in dielectric constant as a function of transmitter frequency and a comparison of theoretical values with measured values at four different transmitter frequencies.

FIG. 21 illustrates resistivity, which is the inverse of conductivity, measured at four different transmitter frequencies as a function of depth, in feet, within a borehole. The measurements were made in a test well in which the characteristics of the formations are well known from numerous studies of well log and core data as referenced in "Comparison of MWD, Wireline and Core Data from a Borehole Test Facility", Paper SPE 22735, proceedings of the *Society of Petroleum Engineers 66th Annual Conference and Exhibition*, pp 741–754, (1991). These "logs" of resistivity clearly illustrate the effects of dispersion effects as a function of the frequency of the induced electromagnetic field. Attention will be focused on the zones denoted by the numerals 5140 and 5144 which are shales and the low permeability limestone zone denoted by the numeral 5146. Zone 5142 is a permeable sandstone, and is therefore invaded by the drilling fluid. Radial invasion combined with differing depths of investigations for the measurements at different frequencies mask the dispersion effects. Zone 5142 will therefore be ignored in this discussion. Curves 5150, 5152, 5154 and 5156 represent resistivities measured at frequencies of 1100 MHz, 200 MHz, 25 MHz and 2 MHz, respectively. Knowing that zones 5140, 5144, and 5146 are radially homogenous (that is, non-invaded by the drilling fluid), it is concluded that the observed dispersion is due to dielectric effects. FIG. 22 illustrates relative dielectric constant measurement over the same formation zones of interest but at different frequencies where curves 5170, 5172, 5174 and 5176 represent measurements at 1100 MHz, 200 MHz, 25 MHz, and 2 MHz, respectively. Dielectric dispersion is again quite apparent. The phenomena of both dielectric and conductivity (or resistivity) dispersion and their dependency upon the frequency of the induced field has been discussed in a qualitative or conceptual sense in a previous section. The phenomena can be quantified as illustrated in FIG. 23 which illustrates generalized theoretical dispersion plots for a clean sandstone formation. The dielectric dispersion curve 5160 illustrates that in general $\epsilon_r$ decreases as frequency increases. Conversely, the conduction curve 5162 illustrates that conductive dispersion increases with increasing frequency. Both curves 5160 and 5162 also clearly illustrate frequency ranges at which interfacial relaxation and molecular relaxation occur. To assess whether the variations in the relative dielectric constant $\epsilon_r$ observed in the logs of FIG. 22 are indeed consistent with dispersion effects, the four values of $\epsilon_r$ depicted by curves 5170, 5172, 5174 and 5176 at a depth of 1660 feet in the limestone formation 5146 were compared in FIG. 24 to a dispersion curve 5180 based upon published (M. R. Taherain et al, "Dielectric Response of Water-Saturated Rocks", *Geophysics*, Vol. 55, No. 12, December 1990) dielectric measurements made on limestone core samples with matrix and connate water resistivities very similar to the limestone of formation 5146. The superimposed data points 5181, 5182, 5183, and 5184 are average readings of the curves 5176, 5174, 5172, and 5170 taken at a depth of 1660 feet in zone 5146, respectively. The good agreement between the core-derived dispersion curve and the log derived measurements from these two carbonate formations suggest that the differences between the various $\epsilon_r$ values from the log are indeed due to dispersion. Considering FIGS. 21, 22, 23 and 24 in combination, it is apparent that any model which simultaneously extracts dispersion corrected resistivity and dielectric constant values from measurements of phase difference and amplitude ratio at varying frequencies must quantitatively include the frequency of the induced electromagnetic field.

Recall that one of the basic objectives of the invention is to determine conductivity (or resistivity) of the formation which is free of dispersion effects. A second objective is to determine the dielectric constant of the formation which, again, is free of dispersion effects. A third objective is to determine effective water filled porosity of the formation which, when combined with independent measurements of total liquid filled porosity, can be used to determine the hydrocarbon saturation of the formation. A theoretical Complex Refractive Index Model (CRIM) has been developed which relates $\epsilon_r$ to true formation resistivity and meets the previously stated objectives of the invention. The development of the model begins with the solutions to Maxwell's equations in homogeneous lossy media are a function of a factor commonly referred to as the propagation constant or wave number, defined herein as "k", which contains conductivity, dielectric constant and magnetic permeability terms. A plane wave solution will have the form $$V = Ce^{ikx}$$ EQUATION NO. 10.8:

where
V = a field variable;
C = a constant
e = the naperian log base
i = the square root of 1;
x = the distance traveled; and $$k = [(\omega^2 \mu_d \mu_r \epsilon_o \epsilon_r) + (i\omega \mu_d \mu_r \sigma)]^{1/2}$$

where:
c = the speed of light = 2.998 $10^8$ (meters/second);
$\mu_o$ = the magnetic permeability of free space = $4\pi \times 10^{-7}$ (Henrys/Meter);
$\mu_r$ = the relative permeability (which is 1.0 for free space and most earth materials);
$\epsilon_o$ = the electric permittivity of free space = $8.854 \times 10^{-12}$ (Farads/Meter);
$\epsilon_r$ = the relative dielectric constant (which is 1.0 in free space);
$\omega$ = the angular frequency of the applied field; and
$\sigma$ = the conductivity.

The term k can be rewritten in terms of a relative complex dielectric constant, which includes the effect of dielectric constant and conductivity, as $$k = k_o \sqrt{\epsilon_c \mu_r}$$ EQUATION NO. 10.10:

where
$k_o$ = the wave number in free space;
$\mu_r = 1$;
and the relative complex dielectric constant is $$\epsilon_c = [\epsilon_r + i\sigma(1/\omega \epsilon_o)]$$

Note that the complex relative dielectric constant $\epsilon_o$ is defined such that when the conductivity $\sigma$ goes to zero, the complex relative dielectric constant goes to the real relative dielectric constant equals the real relative dielectric constant $\epsilon_r$.

We now assume a model of the earth formation wherein there are two layers of different propagation constants k and differing complex relative dielectric constants with the first region spanning (1−φ) units of length and the second region spanning φ units of length. A plane wave incident on the layers and passing through the layers without reflection will have a factor of the form $$e^{ik_2\phi}e^{ik_1(1-\phi)} = e^{i(k_2\phi + k_1(1-\phi))}$$ EQUATION NO. 10.11:

where the subscripts 1 and 2 denote parameters associated with layers 1 and 2, respectively. The effective propagation constant for this mode, $k_{eff}$, is therefore $$k_{eff} = k_2\phi + k_1(1-\phi)$$ EQUATION NO. 10.12:

or in terms of the complex dielectric constant defined above

EQUATION NO. 10.13:
$$k_{eff} = k_o \sqrt{\epsilon_{eff}} = k_o [\sqrt{\epsilon_{c,2}} \; \phi + \sqrt{\epsilon_{c,1}} \; (1-\phi)]$$

where $\epsilon_{c,1}$ is the complex relative dielectric dconstant of layer 1 and $\epsilon_{c,2}$ is the complex relative dielectric constant of layer 2.

Equation number 10.13 is solved for the effective relative dielectric constant to obtain EQUATION NO. 10.14:
$$\epsilon_{eff} = \epsilon_{c,2}\phi^2 + \epsilon_{c,1}(1-\phi)^2 + 2(1-\phi)\phi \sqrt{\epsilon_{c,1}\epsilon_{c,2}}$$

The model is now further related to actual earth formations. The first region is equated to connate water filing the pore space of the rock matrix with the water fractional volume being φ of the total formation volume. The second region is equated to the rock matrix with the rock matrix fractional volume being (1−φ) of the total formation volume. Expanding equation number 10.14 to illustrate real and imaginary components and designating terms with respect to the above formation model yields EQUATION NO. 10.15:
$$\epsilon_{r,eff} + i\sigma_{eff}/\omega\epsilon_o = \phi^2\epsilon_w + 2\phi(1-\phi)\sqrt{(\epsilon_w + i\sigma_w/\omega\epsilon_o)\epsilon_m} + (1-\phi^2)\epsilon_m$$

where the subscripts w and m identify parameters associated with the water and rock matrix components, respectively. Note that the conductivity of the rock matrix is equal to zero.

The effective real dielectric constant is therefore corrupted by the imaginary part of the dielectric constants of the two regions, and likewise the effective conductivity is corrupted by the real parts of the relative dielectric constants. That is EQUATION NO. 10.16:
$$\epsilon_{r,eff} = Re(\epsilon_{eff}); \sigma_{eff} = \omega\epsilon_o Im(\epsilon_{eff})$$

In order to calculate the dielectric constants that we would expect to observe in clean water saturated rocks, it will be assumed that the rocks are composed of two parts which comprise the rock matrix and the connate water. The resistivity of the water and the porosity of the rock matrix are varied within reasonable limits and the dielectric constant of the combination of the two parts, which is the quantity actually sensed by the borehole instrument, is calculated utilizing the two component mixing relationship derived above. The subscripts w and m designate parameters associated with the water and rock parts, respectively.

Figure 25B:
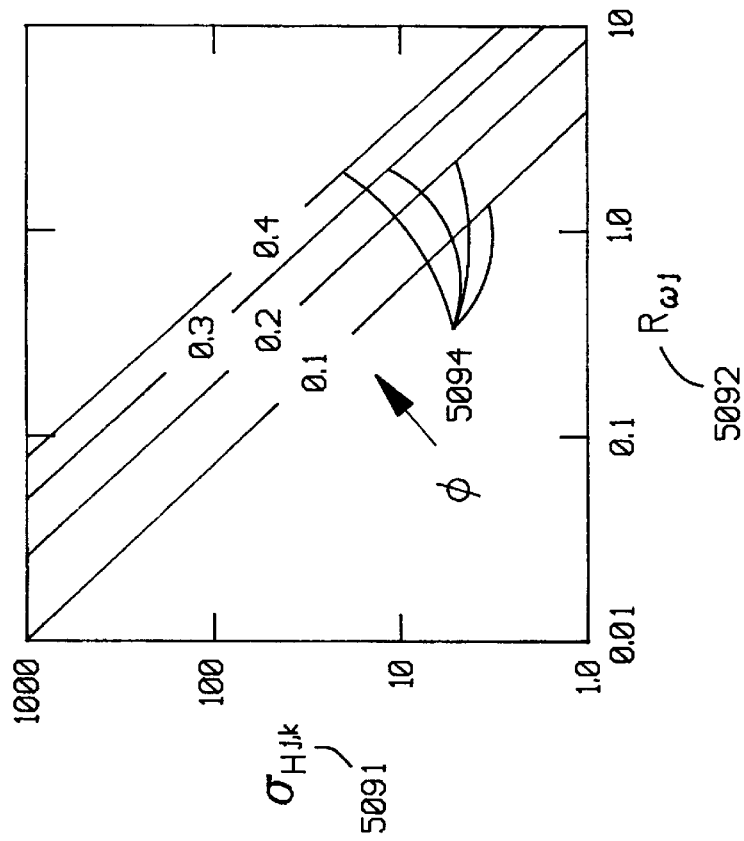
FIGS. 25a and 25b illustrate the variation of the real portion of effective dielectric constant and the real portion of effective formation conductivity as a function of water resistivity, respectively, at various formation porosities.
Figure 25A:
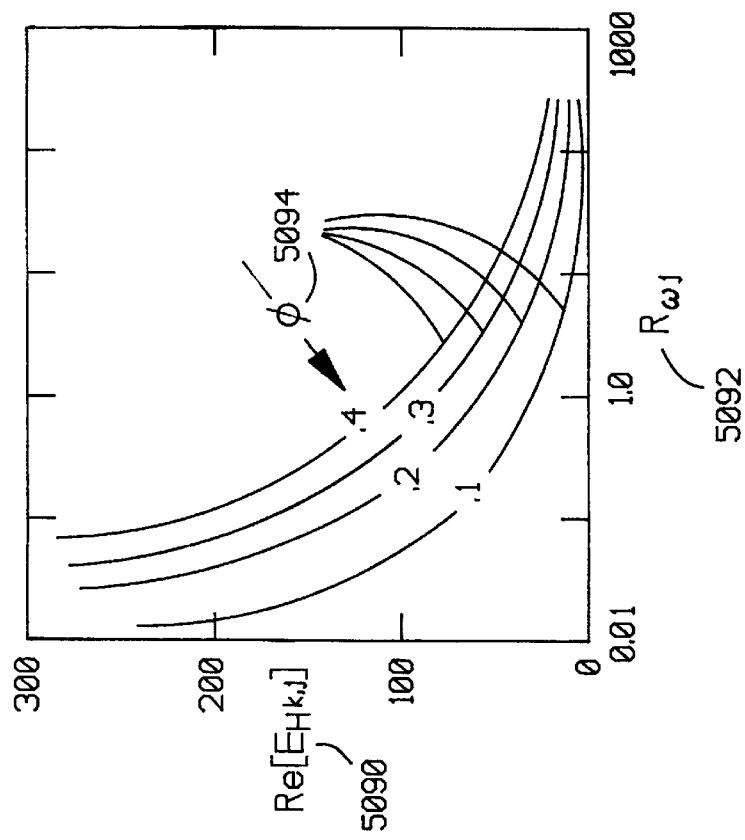

The relationship of equation number 10.15 can be used to graphically illustrate the functional relationships between the measured quantities and the parameters which are of interest and which are to be determined. FIGS. 25A and 25B are presented as typical illustrations of these relationships. The real parts 5190 of the effective dielectric constant as defined by equation number 10.15 is plotted in FIG. 25A as a function of the formation water resistivity, denoted on the abscissa as 5192, for various porosities 5194. The abscissa is logarithmic and the ordinate is linear. These plots are for a frequency $\omega_1$=2 MHz. The real part 5191 of the formation effective conductivity is plotted in FIG. 25b as a function of formation water resistivity 5192, again at $\omega_1$=2 MHz and again for varying porosities 5194. Both the ordinate and the abscissa are logarithmic. Similar plots can be generated for the real and imaginary components of and $\phi_{eff}$ at $\omega_1$=2 MHz and likewise plots for both the real and imaginary parts of and at a second frequency=400 KHz. These are graphical depictions of a set of four independent equations used to determine the "unknown" formation parameters of interest, namely the effective conductivity (or resistivity), the effective dielectric constant and the water filled porosity of the formation.

Attention is again directed to FIGS. 21 and 22 which show resistivity and dielectric data, respectively. FIG. 21 depicts data from four downhole systems, with the 2 MHz data being measured with a MWD system and the remaining being measured with wireline systems. FIG. 22 depicts dielectric data measured with the same systems. Dispersion of the measurements as a function of frequency is clearly exhibited in both logs. Based upon the previously discussed principles, the dispersion in the resistivity measurements would be expected to be small at 2 MHz and lower frequencies. Attention is drawn in particular to zone 5146 which is known from core data to be impermeable carbonate. Dispersion in this zone can only be attributed to dielectric effects. Zone 5142 is a sandstone which is known to be permeable and therefore invaded with drilling fluids prior to running the wireline logs. The observed dispersion in this zone must be attributed to, at least in part, to invasion effects as well as dielectric effects. Data from zone 5150 will, therefore, be used to illustrate the determination of dielectric dispersion of resistivity measurements. Attention is further drawn to FIG. 24 which illustrates observed dielectric data superimposed upon laboratory measurements of dielectric constant as a function of frequency published in the previously cited Taherain reference. The curve as illustrated was fitted using the model of Cole and Cole as previously referenced. At a depth of 1660 feet, dielectric constants measured at 2 MHz and 25 MHz are denoted by the numerals 5141 and 5121, respectively and the corresponding resistivities are denoted by the numerals 5138 and 5127, respectively. These values of $\epsilon_{eff}$ and $\sigma_{eff}=1/R_{eff}$ are inserted into equation number 10.7 at the respective frequencies, real and imaginary parts of equation number 10.7 are equated yielding a set of four equations, and a non-linear regression scheme such as a ridge regression is employed to solve for the resistivity of the water $R_w=1/\sigma_w=0.16$, the dielectric constant of the rock matric $\epsilon_m=9.0$, and the formation porosity ø=0.05 or 5%. These are reasonable values for impermeable carbonate and agree well with core data taken in zone 5146.

11. The Use of Multiple Depths and Frequencies for Simultaneous Inversion of Electromagnetic Borehole Measurements The logging tool of the present invention may be utilized to measure geophysical parameters of earth formations penetrated by a borehole. The tool employs propagation resistivity techniques utilizing a downhole instrument comprising multiple, longitudinally spaced transmitters operating at different frequencies with a plurality of longitudinally spaced receiver pairs. An electromagnetic wave is propagated from the transmitting antenna coil into the formation in the vicinity of the borehole and detected as it passes the receiving antenna of the receiver pair. The basic parameters measured at the receivers are the amplitude and phase shift of the sensed electromagnetic wave. The downhole instrument is conveyed along the borehole by the drill string or other means thereby making the basic measurements as a function of position or depth of the downhole instrument within the borehole. A plurality of parameters of interest can be determined by combining the basic measurements. Such parameters including the resistivity, dielectric constant and porosity of the formation as well as the degree to which the fluid within the borehole migrates into or "invades" the virgin formation. Numerous factors affect the accuracy and precision of the desired parametric measurements. These include, but are not limited to, the radial position of the measuring device within the well bore, the shape or eccentricity of the borehole, the type of borehole fluid and the electrical and mechanical characteristics of the transmitters and receivers. In addition the amplitude and phase measurements made at different transmitter-receiver spacings or at different transmitter frequencies exhibit different responses to vertical changes in the formation as the instrument is conveyed along the borehole. The invention is further directed toward the combination of multiple electromagnetic propagation measurements to obtain more accurate and precise measurements of formation resistivity, dielectric constant, porosity and borehole fluid invasion profile when the perturbing effects of the borehole environs and vertical resolution properties of the transmitter receiver combinations have been minimized. The invention is still further toward the measure of the properties of the well bore itself which may be used to evaluate mechanical properties of the rock and the effectiveness of the drilling program.

Induction techniques have been used for a number of years to determine the resistivity of earth formations penetrated by a borehole. Historically, formation resistivity has been used to delineate hydrocarbons from saline formation waters. Resistivity cannot, however, be used to delineate hydrocarbon from relatively fresh formation waters since both fluids exhibit very high resistivity. The resistivity contrast between the resistivity of hydrocarbon and fresh water is less than the precision of borehole resistivity measurement systems. Hydrocarbons and waters, both saline and fresh, do exhibit measurable contrast in dielectric constant. Dielectric constant can therefore be used to delineate hydrocarbons from fresh waters or waters of unknown salinity as well as will be discussed later. Using induction techniques to measure formation parameters, an alternating current is applied to one or more transmitters of the borehole instrument thereby generating an electromagnetic field in the vicinity of the transmitter. The primary field interacts with the earth formation thereby setting up secondary fields with the amplitude and the phase of the secondary fields being related to electromagnetic properties of the formation. Amplitude and phase are the primary or "raw" parameters measured by the receivers. These raw measurements are combined to obtain the parameters of interest and to eliminate unwanted noise as will be detailed in this disclosure.

As mentioned previously amplitude and phase measurements made at different transmitter receiver spacings and at different frequencies exhibit different resolutions. Prior art has matched th vertical resolutions using various convolution and deconvolution techniques prior to combining multiple measurements. This is referred in the art as "serial" data processing. U.S. Pat. No. 4,609,873 to Percy T. Cox, et al teaches the use of a wireline logging system comprising at least three transmitter coils and at least two receiver coils to determine resistivity and dielectric constant of a subsurface formation adjacent to a drilling fluid invented zone. The transmitters are operated at a single frequency of 30 MHz. Amplitude and phase measurements are made and serially processing of the data is employed. At relatively low transmitter frequencies, serial processing introduces only negligible errors. At higher transmitter frequencies in the 2 MHz range or higher, vertical resolution is affected not only by the physical arrangement of the transmitter receiver combinations, but also significantly by the electromagnetic properties of the borehole environments and the formation. The function dependence of vertical resolution and transmitter frequency is addressed in the publication "2-MHz Propagation Resistivity Modeling in Invaded Thin Beds", W. Hal Meyer, *The Log Analyst*, July–August 1993, p.33 and "Inversion of 2 MHz Propagation Resistivity Logs", W. H. Meyer, SPWLA 33rd *Annual Logging Symposium*, Paper H, Jun. 14–17, 1992. Stated another way, serial processing of data can introduce significant error at transmitter frequencies in the range of 2 MHz and higher. In order to obtain accurate and precise parametric determinations at these frequencies, it is necessary to compute the parameters of interest and to make the required corrections, including corrections for the effects of differing vertical resolutions, simultaneously. Methods for accomplishing this goal will be detailed in this disclosure.

The present invention is directed toward the accurate measure of the resistivity and other geophysical parameters of earth formations penetrated by a borehole. The invention is further directed toward the processing of eight independent measurements related to formation properties and borehole environment properties thereby obtaining the desired geophysical parameters of interest simultaneously with any required corrections. This invention is still further directed to obtaining measurements of borehole and near borehole parameters which have not been available in the prior art and which yield valuable information concerning mechanical properties of the rock formation and perhaps information concerning the effectiveness of the drilling program. The borehole device comprise an elongated mandrel and further comprises and array of two receivers and two pairs of symmetrically spaced transmitters. All transmitters and receivers are positioned longitudinally along the mandrel portion of the downhole instrument. Each transmitter pair if located symmetrically on each side of a point midway between the receiver pair. Alternately, the R-T-T-R configuration described in detail above can also be utilized. The preferred embodiment is directed toward, although not limited to, measurement while drilling (MWD) applications. In the MWD embodiment, the mandrel comprises a drill collar which is conveyed along the borehole by the drill string. The transmitter and receivers comprise coils of one or more turns wrapped around the outside of the drill collar, with the axis of the transmitter and receiver coil being coincident with axis of the drill collar. All coils are electrically insulated from the metallic drill collar. Power sources and control circuitry for the transmitters and receivers are located within the drill collar it is common in the art to utilize pairs of transmitters and receivers to minimize or "compensate" for gross effects of the borehole and to compensate for certain electromechanical properties of the borehole instrument. This subject is addressed in details in a U.S. application Ser. No. 08/188,064, filed Jan. 28, 1994 which is assigned to the current assignee and is hereby fully incorporated in this disclosure by reference.

In the preferred embodiment both amplitude and phase measurements are made at two frequencies of 400 KHz and 2 MHz and at two effective transmitter-receiver spacings. This yields a total of eight independent measurements per depth interval as the borehole device is conveyed along the borehole. In principle the set of eight equations can be solved for eight "unknowns". The unknowns include the geophysical formation properties of resistivity, dielectric constant and porosity, and additional parameters quantifying invasion and borehole properties such as rugosity and ellipicity. The latter borehole parameters have been considered as sources of "noise" in prior art resistivity measurements. When quantified, however, such borehole characteristics provide useful information concerning rock properties and the effectiveness of the drilling program. Finally, resolution matching of measurements of different vertical resolutions is accomplished simultaneously in the solution of the set of eight equations. In the preferred embodiment, the eight independent parameters are: $R_{p,n,1}$, $R_{a,n,1}$, $R_{p,f,1}$, $R_{a,f,1}$, $R_{p,n,2}$, $R_{a,n,2}$, $R_{p,f,2}$, and $R_{a,f,2}$, where the subscript "p" and "a" denote phase difference and amplitude ratio measurements calculated using the two receivers, respectively, "n" and "l" denote near and far spacing between the transmitter receiver pairs, respectively, and "1" and "2" denotes transmitter frequency $\omega_1$ and $\omega_2$, respectively. It is noted that these eight "measured" signals receive some preprocessing and are not directly measured "raw" amplitude and phase signals from each of the sixteen possible symmetrical transmitter-receiver combinations. Measurements from symmetrical transmitter-receiver pairs are combined using techniques known in the art to eliminate error such as that induced by rapidly varying borehole conditions prior to processing using the methods of this invention. Combination of signals from symmetric transmitter-receiver pairs to minimize adverse environmental and system effects are disclosed in detail in the previously cited U.S. patent application Ser. No. 08/188,064. The combination of the above eight measurements to obtain parameters of interest will be detailed in the following discussions.

It should be understood that the invention is not bound or limited to the transmitter-receiver spacings and operating frequency combinations described above. Any combinations which respond differently to vertical and radical changes in the borehole environs are suitable embodiments of the invention. As an example, amplitude and phase measurements made of a single effective transmitter-receiver spacing and at four frequencies will yield eight independent measurements per depth interval. As a second example, amplitude and phase measurements made at four effective transmitter-receiver spacings and at a single operating frequency will likewise yield eight independent measurements per depth interval. Transmitter-receiver spacing and operating frequency combinations can be varied even further to yield a set of independent measurements which is greater or less than eight. It should be understood, however, that the number of unknown parameters that can be uniquely determined increases or decreases as the number of independent measurements increases or decreases.

Figure 26:
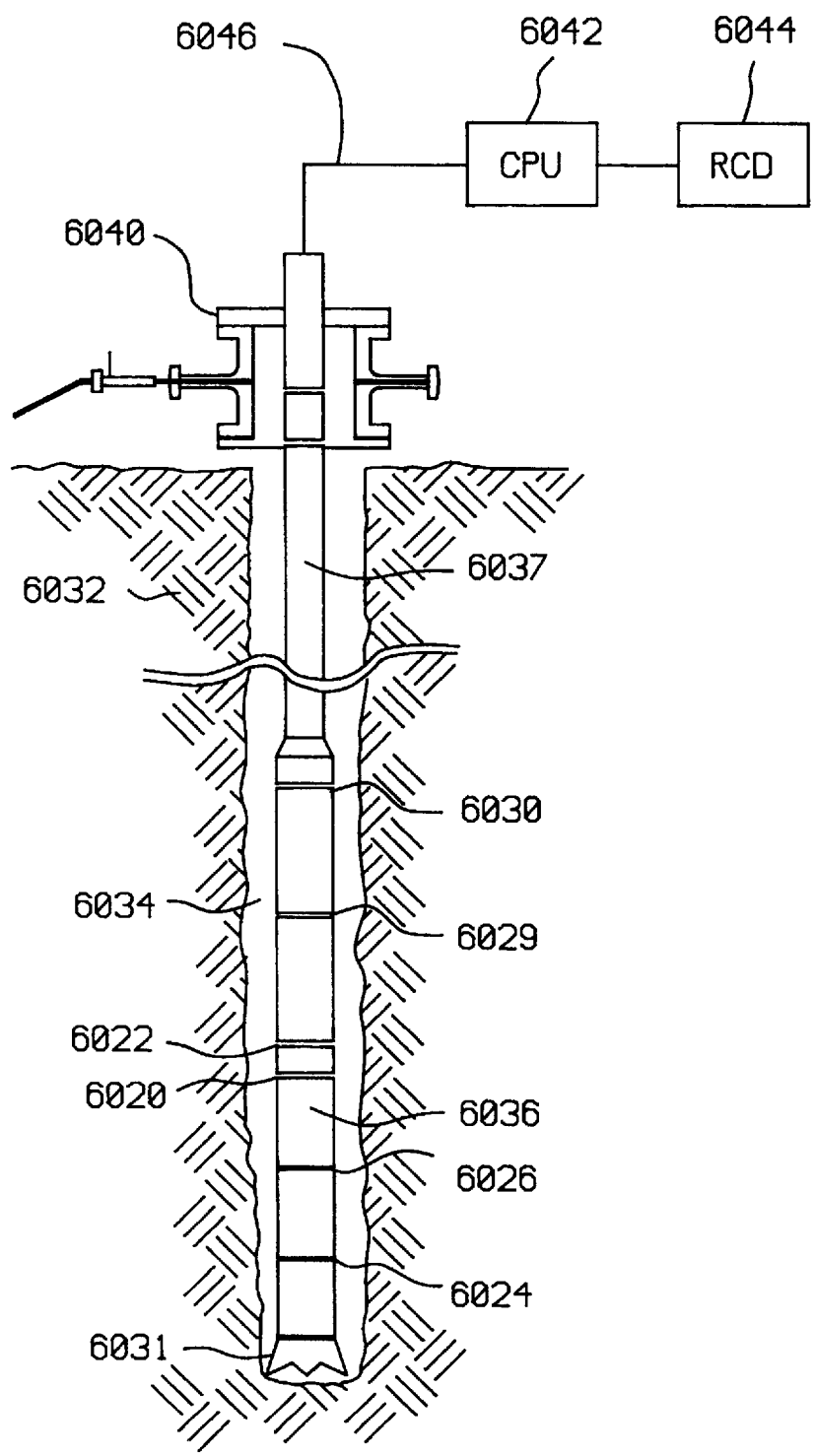
FIG. 26 illustrates the invention in a measurement-while-drilling (MWD) embodiment.

The invention employed in a MWD environment is illustrated in a very general manner in FIG. 26. The drill bit 6031 is attached to the metallic drill collar 6036 which in turn is mounted on a wellbore drill string 6037. This assembly is shown suspended in a well bore 6034 which penetrates the earth formation 6032. A means of rotating the drill string 6037 is identified by the numeral 6040. Four transmitter coils of one or more turns are identified by the numeral 6026, 6024, 6029 and 6030. The axes of these coils are coincident with the axis of the drill collar 6036. The coils are electrically insulated from and slightly recessed within the outer diameter of the drill collar thereby comprising integral elements of the collar assembly. Two receiver coils are identified by the numerals 6020 and 6022. Geometries of these coils are quite similar to the geometries of the transmitter coils and again comprise integral elements of the collar assembly 6036. Power sources and control circuitry (not shown) for the transmitter and receivers are contained within the drill collar assembly 6036. Data recorded by the receivers can either be transmitted in real time to the surface using drill fluid pulsing means (not shown) or stored in downhole memory and subsequently retrieved at the surface. For a real-time data transmission embodiment, signals from the receiver are transmitted to the surface by a path means generically denoted by the numeral 6046, transferred to a CPU 6042 for processing and correlation with depths from a drill collar depth indicator (not shown), and output to recorder 6044 which displays the computed parameters of interest as a function of depth at which the input measurements were made.

An alternate embodiment comprises a processor unit (not shown) contained within the drill collar 6036 with which measured data are processed downhole rather than at the surface of the earth. Memory capacity of most MWD borehole instruments is limited. In order to most effectively utilize downhole memory, it is often more efficient to process measured data downhole and store the results rather than store the more voluminous measured data.

Figure 27:
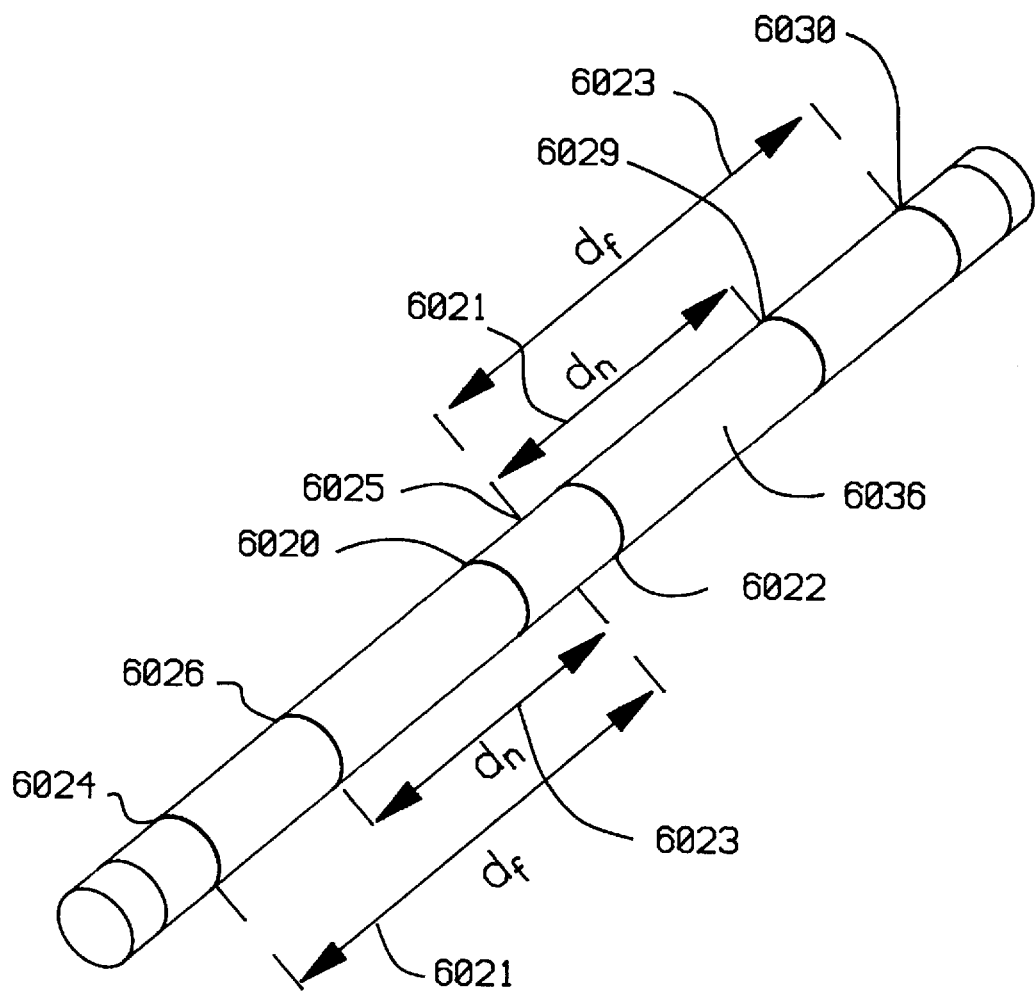
FIG. 27 shows a more detailed view of the transmitter and receiver arrays mounted on a drill collar.

Details of the drill collar 6036 containing the transmitter and the receiver arrays are shown in FIG. 27. The near spacing $d_n$ between transmitter and receiver is denoted by the numeral 6023 and the far spacing $d_f$ is denoted by the numeral 6021. Both the near spacing distances 6023 and far spacing distances 6021 are measured with respect to the midpoint 6025 between the receivers 6020 and 6022. Point 6025 is commonly referred to as the "measure point" of the borehole instrument. For transmitter frequency $\omega_1$ the phases of the signal detected at receivers 6020 and 6022 resulting from the sequential transmission from transmitters 6026 and 6029 are combined algebraically to obtain $R_{p,n,1}$. The amplitudes of these received signals are simultaneously measured and combined yielding $R_{a,n,1}$. Again for a transmitter frequency $\omega_1$, the phase of the signals received at receivers 6020 and 6022 resulting from the sequential transmission from transmitters 6024 and 6030 are combined algebraically to obtain $R_{p,l,1}$. The amplitudes of these signals are likewise simultaneously measured and combined yielding $R_{a,f,1}$. The above sequence is repeated with a second transmitter frequency $\omega_2$ yielding $R_{p,n,2}$, $R_{a,n,2}$, $R_{p,f,2}$ and $R_{a,f,2}$. The end result is eight apparent resistivity measurements comprising amplitude and phase shift measured at two transmitter-receiver spacings and at two transmitter frequencies.

Figure 28:
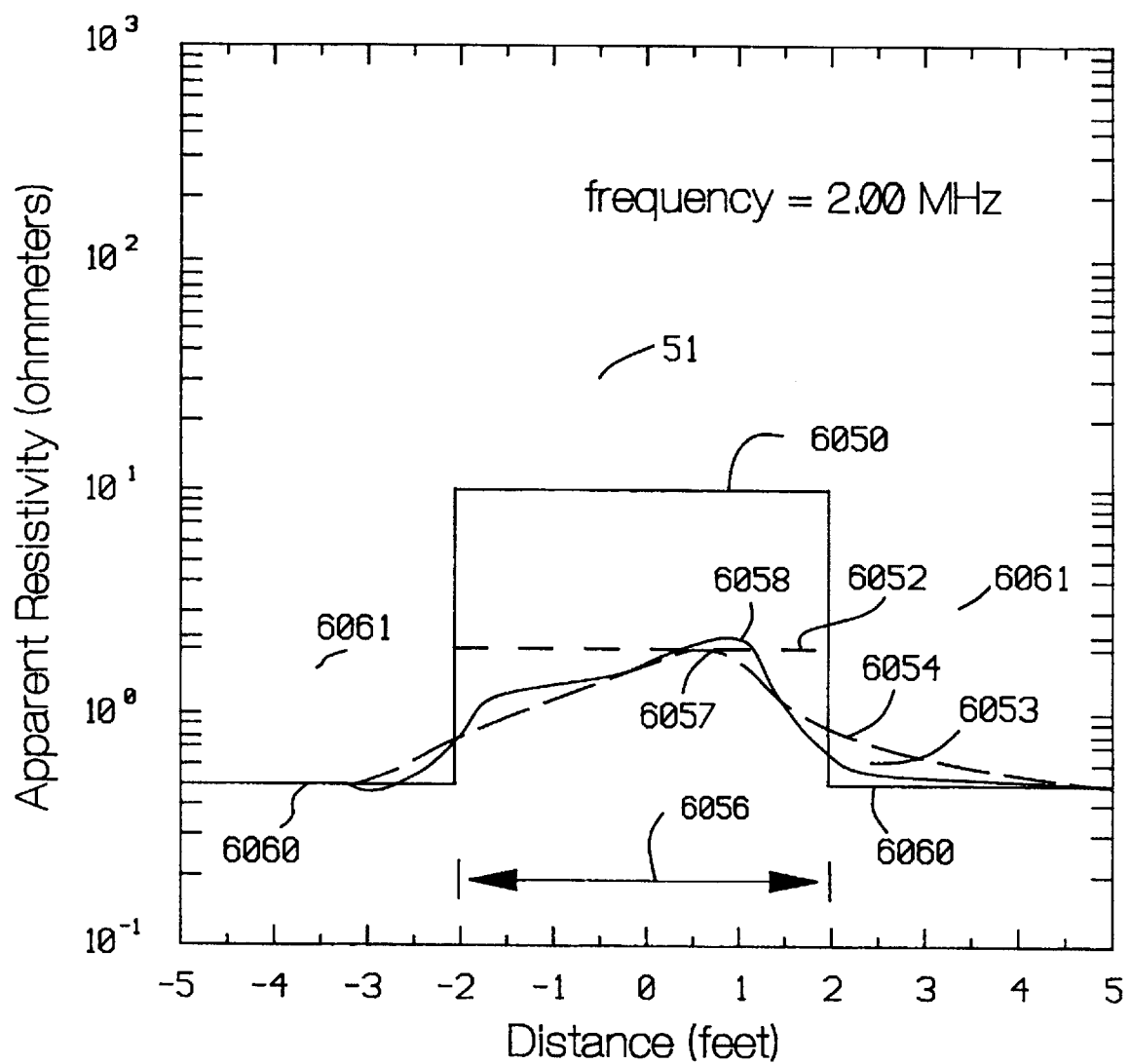
FIG. 28 illustrates measured amplitude and phase resistivities across a relatively thin formation bounded by formations of essentially infinite vertical extent.

FIG. 28 illustrates hypothetical measurements of resistivity across a thin formation bed denoted by the numeral 6051. This bed of vertical extent 6056 is bounded on either side by formation of essentially infinite vertical extent identified by the numeral 6061. In the example, the vertical extent 6056 of bed 6051 is 4.0 feet. The true resistivity of the bed is 10 ohm-meters as illustrated by curve 6060 and the bed is invaded to a depth of $d_i$=60 inches. With the resistivity of the invaded zone $R_{xo}$=2.0 ohm-meters as illustrated by curve 6052. The resistivity of the surrounding or shoulder formation, $R_{SHOULDER}$=0.5 ohm-meters, is illustrated by curve 6060. The shoulder formations are not invaded by the drilling fluids. Curves 6052 and 6054 illustrate the apparent phase and amplitude resistivities measured across the bed boundaries at a transmitter frequency of $\omega_1$=2 MHz. Using previously defined nomenclature, curve 6052 is computed from the difference of the two receivers and is denoted by $R_{p,f,1}$ and curve 6054 is calculated from the ratio of the two receivers and is denoted by $R_{a,f,1}$. Note that similar curves are generated at a second frequency $\omega_2$ but are not shown. It can be seen that the maximum or peak values of curves 6052 and 6054 within zone 6051, denoted by the numerals 6058 and 6057, respectively, are 2.23 and 2.07 ohm-meters, respectively. Both apparent resistivity measurements diverge greatly from the actual or true resistivity of $R_t$10 ohm-meters.

Figure 29:
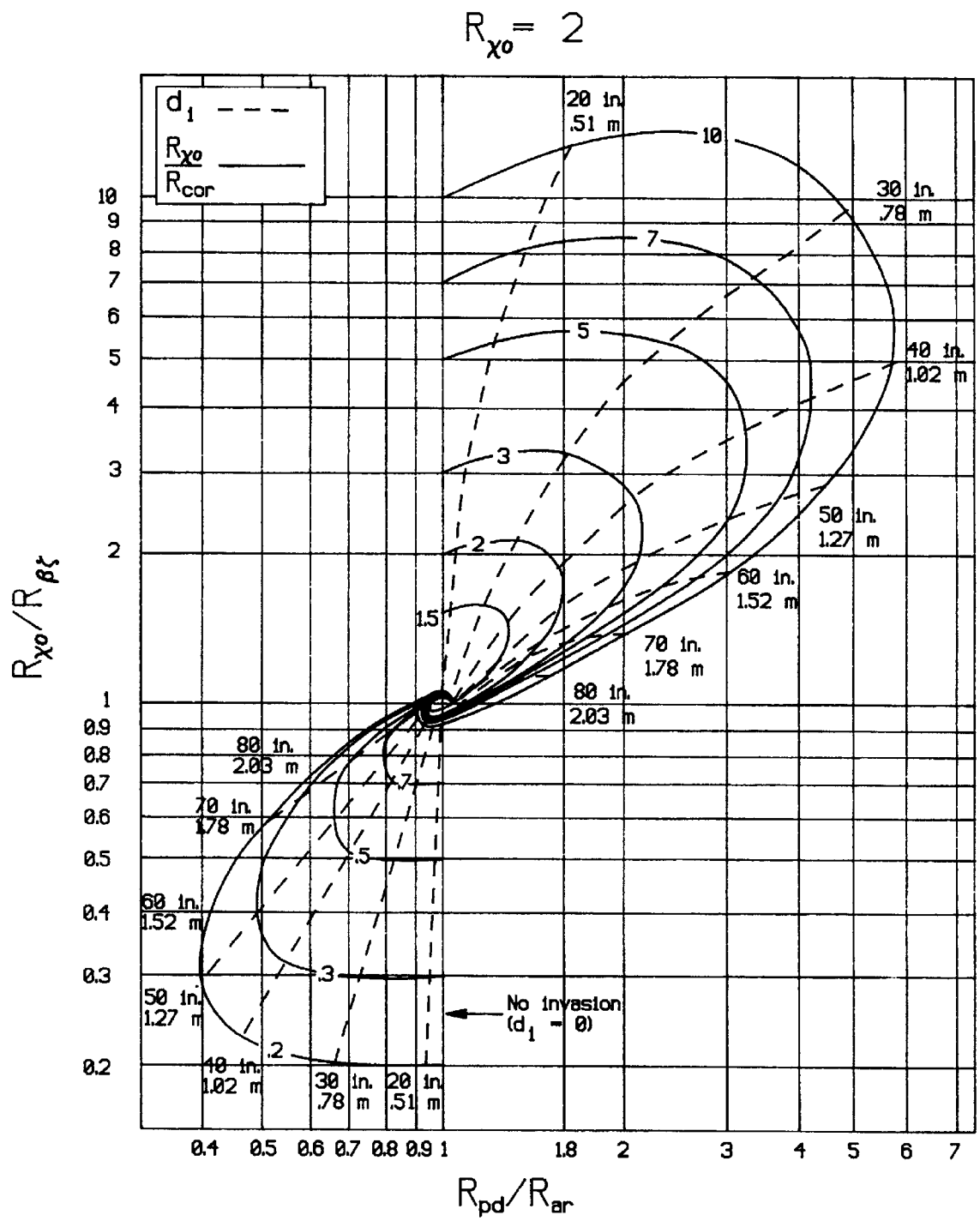
FIG. 29 is a graphical depiction of an algorithm for serially correcting apparent resistivity for the effects of invasion of the drilling fluid.
Figure 30:
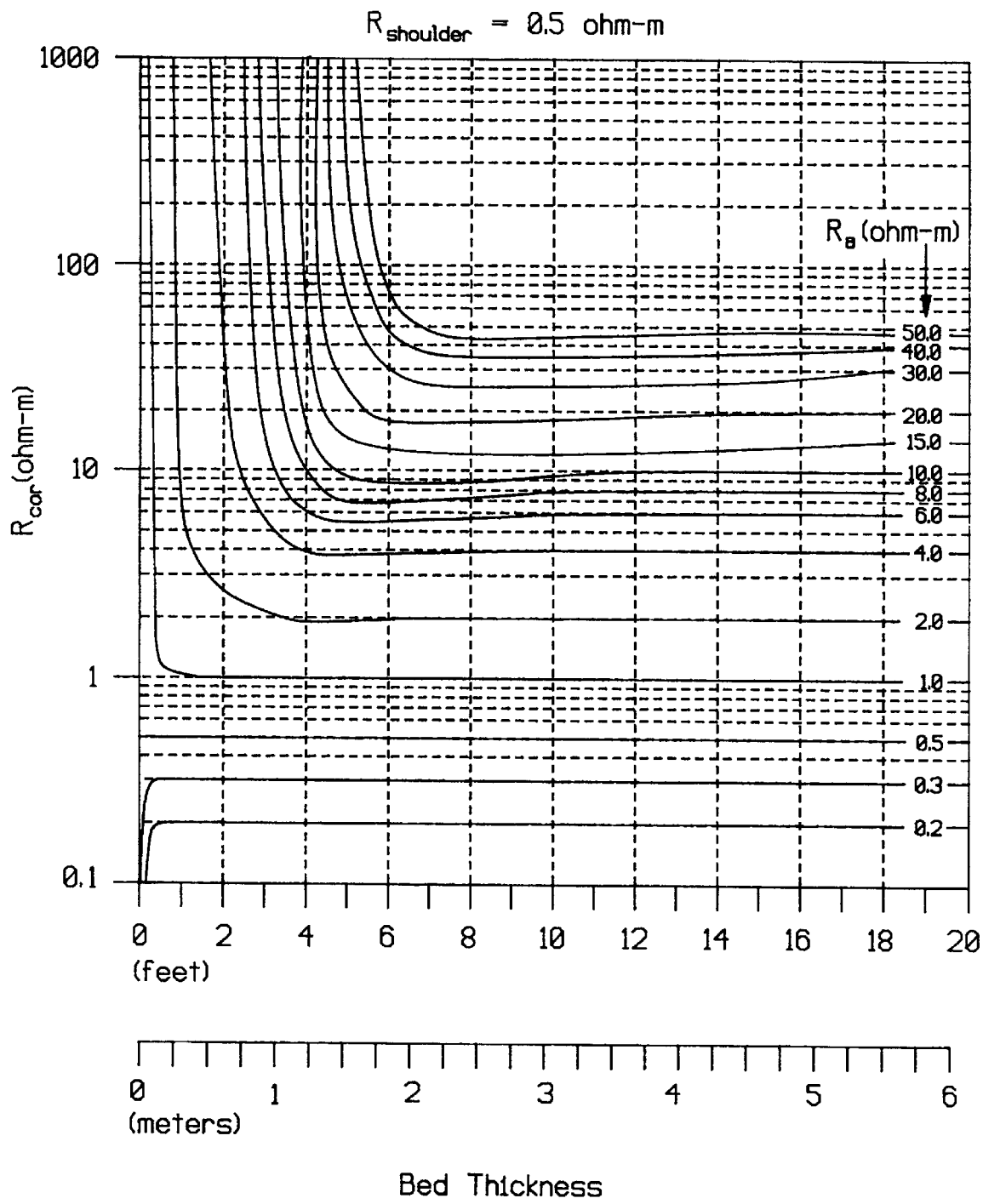
FIG. 30 is a graphical depiction of an algorithm for serially correcting phase resistivity measurement for the effects of finite bed thickness.
Figure 31:
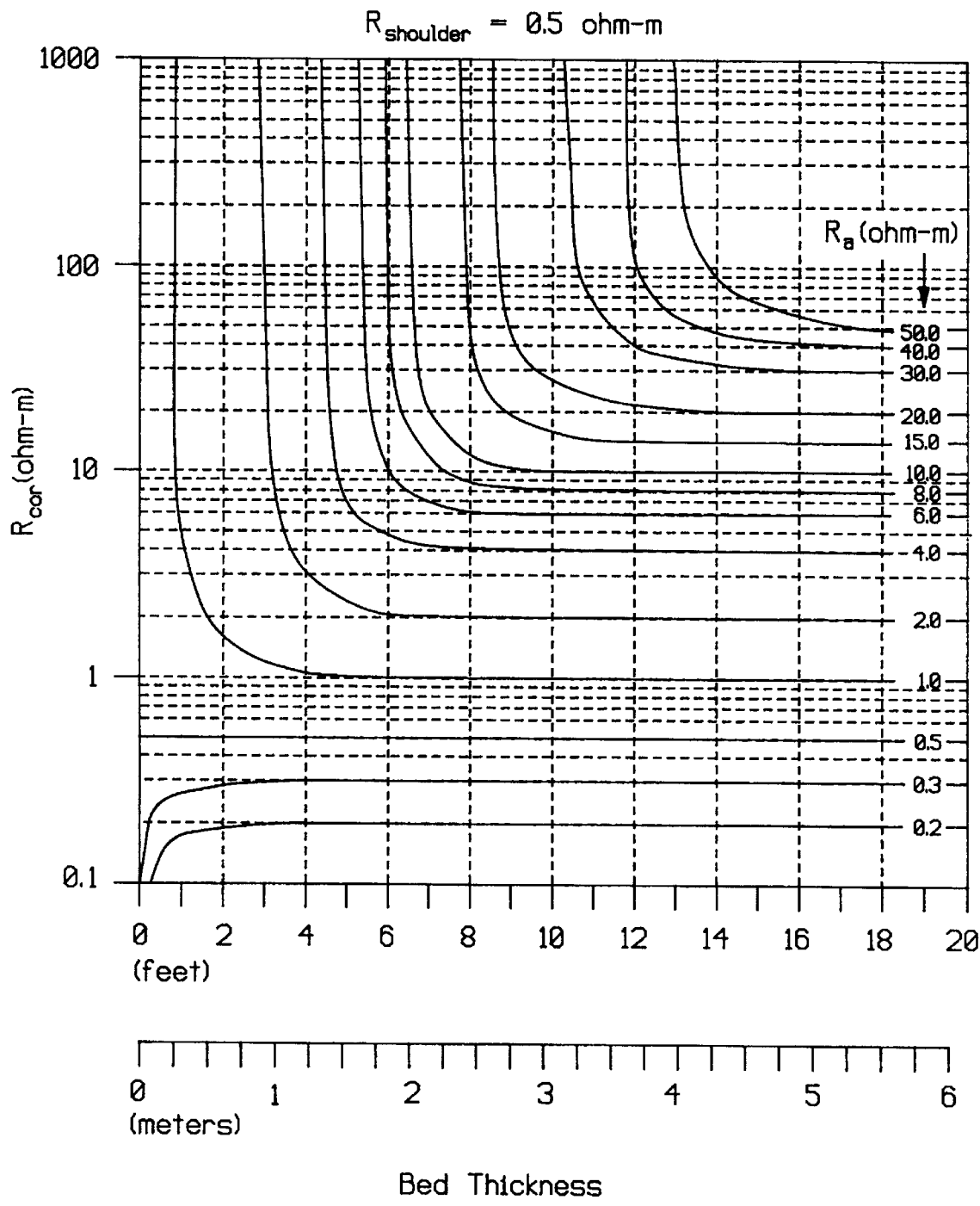
FIG. 31 is a graphical depiction of an algorithm for serially correcting amplitude resistivity measurement for the effects of finite bed thickness.

FIG. 29 is a graphical representation of an algorithm for correcting apparent resistivity measurements made at a frequency of 2 MHz for the effects of invasion in formations of infinite vertical extent. Using values for $d_i$=60 inches, $R_{xo}$=2.0 ohm-meters and the maximum phase and amplitude values of 2.23 and 2.07 ohm-meters, respectively, the resulting "corrected" value for true resistivity, $R_{cor}$=2.09 ohm meters, still exhibiting significant divergence from the actual bed resistivity value of 10.0 ohm-meters. Bed boundary corrections are applied to the maximum phase and amplitude resistivity measurements 6058 and 6057 using correction algorithm depicted graphically in FIGS. 30 and 31, respectively, using a bed thickness of 4.0 feet. $R_a$ denotes apparent resistivity measurement in using the charts. These corrected values are then serially corrected for invasion, again using the synthetic data depicted graphically in FIG. 28. After applying both bed boundary corrections and invasion corrections serially, the resulting "corrected" value for true resistivity is $R_{cor}$=5.2 ohm meters which still exhibits significant deviation from the true resistivity value of 10.0 ohm meters. It is apparent that serially corrections for the hypothetical example at a frequency of 2 MHz is totally inadequate. Similarly, the same sequence of corrections using corresponding amplitude and phase resistivities made at $\omega_2$=400 MHz is also totally inadequate. Serially corrections for additional parameters such as borehole diameters, resistivity of the drilling fluid, dielectric effects and formation anisotropy also yield inadequate corrections at either transmitter frequency for true resistivity.

The current invention utilizes the eight previously defined measurements of apparent resistivity along with the comprehensive model of the response of the borehole instrument in a variety of formation and borehole conditions to simultaneously determine formation and borehole parameters of interest. The process is generally defined by the matrix equation:

$$[R]=[T]\times[X] \quad \text{EQUATION NO. 11.1:}$$

where [R] is a 1×8 matrix representing eight measures of apparent resistivity at multiple frequencies and transmitter spacings as defined previously, and [X] is a 1×8 matrix representing 8 parameters of interest to be determined. For the example being considered, $R_1$, $R_{20}$, $R_{SHOULDER}$, $d_I$ and the thickness of the zone 6056 are included as elements of the matrix [X]. [T] is an 8×8 transform matrix based upon the comprehensive model of the borehole instrument response in a variety of borehole and formation conditions. As an example, [T] comprises the response of the response functions for the borehole instrument across bed boundaries, the responses characteristics as a function of invasion, and response functions for all other borehole and formation parameters discussed previously in this disclosure. The values of the elements of [T] will depend upon resistivity and will, therefore, depend upon the matrices [X] and [R]. As a result of this functional dependence, equation number 11.1 is not a simple linear matrix equation. U.S. Pat. No. 5,144,245 to M. M. Wisler, assigned to the assignee of this disclosure, described such a model and is hereby entered by reference. A non-linear regression scheme is used to invert the equation (11.1) yielding $$[X]=[T]\times[R] \quad \text{EQUATION NO. 11.2:}$$

Solving equation for [X], which includes $R_1$ as a element, a corrected value of $R_t$=10 ohm-meters is obtained for the hypothetical example shown in FIG. 28. The fact that sets for two transmitter frequencies are used in the present invention contributes to the convergence of the measured and true formation resistivities when compared to the previous computations using only measurements at 2 MHz. Equally important in the conversion is that the current invention employs simultaneous inversion of the measurements at multiple frequencies and multiple spacings. The errors introduced at higher frequencies resulting from serial processing are thus avoided.

12. The Use of Raw Amplitude and Phase in Propagation Resistivity Measurements to Measure Borehole Environmental Parameters The logging tool of the present invention may be utilized for the measurement of geophysical parameters of earth formations penetrated by a borehole and more particularly to propagation resistivity measurements at multiple transmitter frequencies and multiple transmitter receiver spacing. In addition the invention is directed toward the measurement of physical parameters of the borehole in addition to resistivity properties of the formation penetrated by the borehole. Measurements are made using an array of four transmitters and two receivers. Elements of the transmitter receiver array are longitudinally and symmetrically spaced along an elongated borehole instrument. Each transmitter induces an alternating voltage into the borehole and the earth formation in the vicinity of the borehole. The amplitudes and phase shifts of the signals produced by these induced alternating electromagnetic fields are measured by the receivers. These signals are effected by numerous formation, near borehole and borehole parameters. The measurements are combined to yield resistivity of the formation, parameters relating to the invasion of drilling fluids into the formation in the near borehole region, and physical characteristics of the borehole itself. The invention is directed toward, but not limited to, measurement while drilling (MWD) applications.

Multiple transmitter and receiver arrays have been employed in prior borehole induction measurements. The primary parameter of interest is the resistivity of the virgin or uninvaded formation from which the hydrocarbon saturation of the formation is determined. Symmetric pairs of transmitters and receivers have been employed to minimize or "cancel" the effects on the resistivity measurements of rapidly changing borehole parameters such as borehole diameter, eccentricity and rugosity. U.S. Pat. No. 4,899,112 to Brian Clark et al teaches a well logging technique in which electromagnetics are used to measure formation resistivity at different radial depths of investigation. In addition, the cited patent teaches methods for determining the existence, location and properties of beds and caves, and also teaches means for determining changes in the size of the borehole. The measurements are based upon the observation that phase and amplitude apparent resistivity measurements, made at a given transmitter frequency and a given transmitter-receiver spacing, exhibit different depths of investigation. The teachings of Clark do not provide means for the user to select from a "menu" the parameters of interest as does the present invention. There are other advantages of the present invention that will be emphasized in the following discussions. Multiple transmitter-receiver spacings have also been employed in the prior art to obtain measurements into the formation of varying radial depths of investigation. Combining such measurements tends to minimize borehole effects as well as yield information concerning the radial extent of the invasion of drilling fluid into the virgin formation. Invasion measurements can be related to the permeability of the formation which, in turn, is related to the producibility of fluids contained within the formation rock matrix. Again, no attempts have been made in the prior art to obtain quantitative measures of electromagnetic properties of the formation. Multiple transmitter frequencies have also been applied in the prior art to enhance and separate electromagnetic properties of the formation such as resistivity and dielectric constant, obtaining varying effective radial depths of investigation and to a lesser extent to minimize borehole effects. Once again, contributions from the borehole effects have not been quantified and related to the physical condition of the borehole.

The invention is directed toward the simultaneous measurement of electromagnetic parameters of earth formations penetrated by a borehole, the invasion profile of fluids into the formation during the drilling operation, and the physical characteristics of the borehole. Electromagnetic properties of the formation such as resistivity are used to determine hydrocarbon saturation in the presence of saline, connate waters. The drilling fluid invasion profile is indicative of the permeability of the formation. Finally the physical properties of the borehole such as rogosity and ellipticity can be related to the mechanical properties of the rock matrix and to the effectiveness of the drilling operation. A knowledge of rock matrix properties is extremely useful in specifying subsequent completion activities such as possible fracturing and even perforating programs. Knowing the condition of the borehole, the drilling program can often be modified to increase efficiency such as modifying drilling parameters to increase bit penetration rates.

The boreholes instrument portion of the invention comprises an elongated mandrel such as a drill collar and a measurement-while-drill (MWD) embodiment. Two receivers comprising coils of one or more turns are wrapped around the outside diameter of the drill collar and spaced longitudinally along the center of the drill collar. Four transmitters comprising coils of one or more turns are wrapped around the outside diameter of the drill collar and are spaced symmetrically and on either side of the midpoint between the two receiver coils. All transmitter and receiver coils are electrically insulated from the metallic drill collar. Transmitters are activated sequentially at a first frequency. The phase and amplitude of the induced electromagnetic signals are measured four measurements of amplitude and four measurements of phase shift. The procedure is then repeated at a second transmitter frequency yielding an additional four measurements of amplitudes and four measurements of phase shift. An apparent resistivity measurement is calculated from each of these sixteen corrected "raw" measurements. Each apparent resistivity calculation, being uncorrected by means previously mentioned, is greatly affected by the borehole and the near borehole environs. These raw measurements and corresponding apparent resistivity calculations are used, therefore, to determine borehole characteristics such as borehole diameter, rugosity and eccentricity as well as providing means for correcting apparent resistivity measurements for these borehole effects. Stated another way the invention not only provides formation resistivity measurements corrected for perturbing effects of the borehole, but also provides means for quantifying these corrections thereby providing useful information on the physical properties of the well bore. These well bore properties, in turn, can be related to such parameters as mechanical properties of the rock matrix, shallow invasion profiles, and the effectiveness of the drilling program. The vertical resolution of the sixteen apparent resistivity measurements are, in general, different and vary from measurement to measurement when borehole conditions are rapidly varying. It is necessary to apply deconvolution techniques in order to "match" the vertical resolution of all sixteen measurements prior to combining these data using means previously mentioned. Resolution matching is not an independent data processing step as is often the case in prior art, but is an integral step in the calculation of all parameters of interest.

It should be understood that other transmitter-receiver-operating frequency combinations can be utilized. As an example, two transmitters and four receivers with the transmitters operating at two frequencies will also yield sixteen raw measurements. Expanding the variability concept even further, an array of one receiver operating at one frequency and eight receivers will also yield sixteen raw measurements of amplitude and phase as will one receiver and one transmitter operating at eight frequencies. The transmitter-receiver frequency combination can also be varied to yield a raw measurement total greater than or less than sixteen with a corresponding increase or decrease in the number of parameters of interest that can be uniquely determined.

Figure 32:
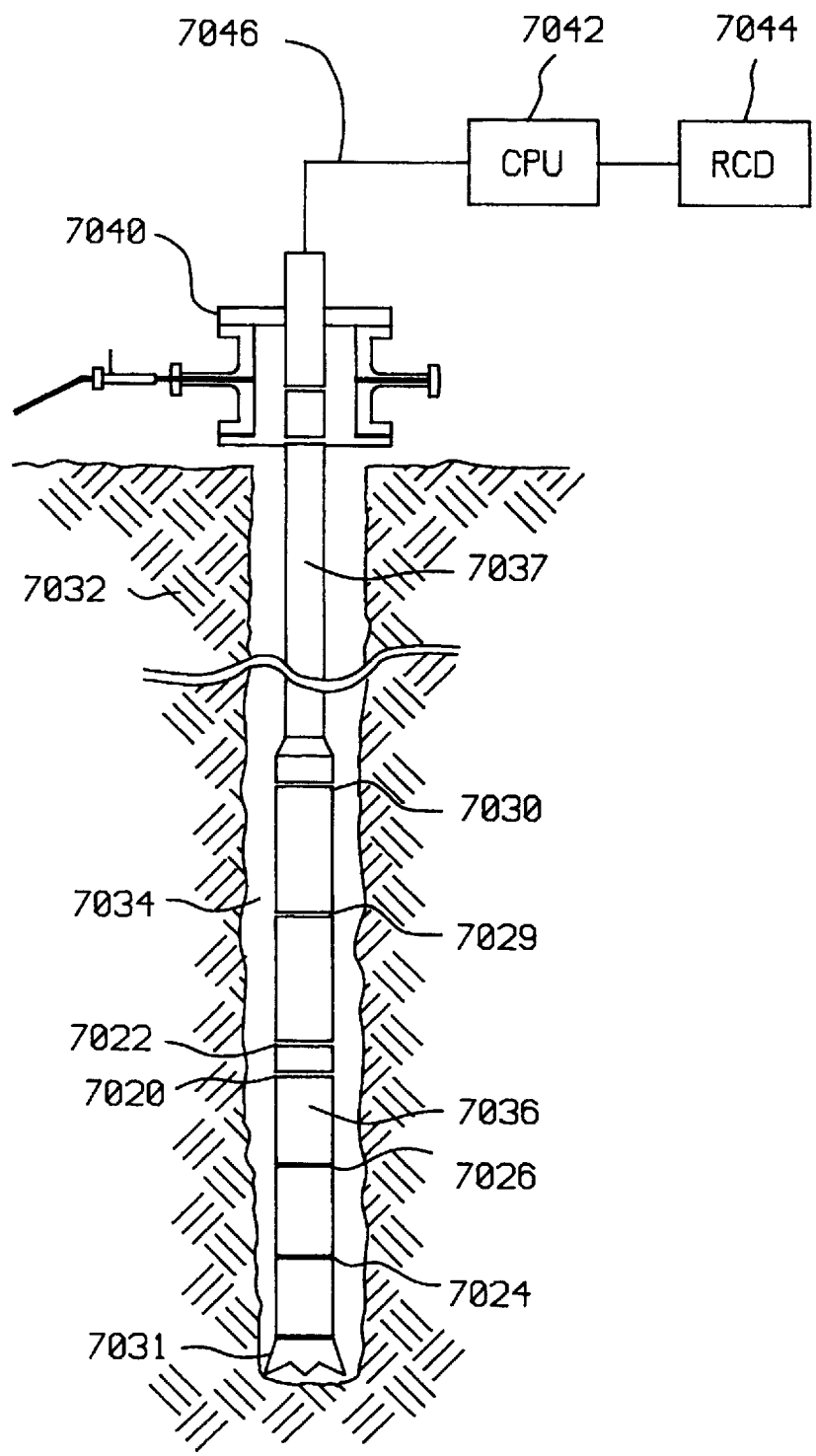
FIG. 32 illustrates the invention in a MWD embodiment.

The invention employed in an MWD environment is illustrated in a very general manner in FIG. 32. The drill bit 7031 is attached to a metallic drill collar 7036 which in turn is mounted on the well bore drill string 7037. This assembly is shown suspended in a well bore 7034 which penetrates the earth formation 7032. A means of rotating the drill string 7037 is identified by the numeral 7040. Four transmitter coils of one or more turns are identified by the numerals 7026, 7024, 7029 and 7030. The axes of these coils are coincident with the axis of the drill collar 7036. The coils are electrically insulated from and slightly recessed within the outer diameter of the drill collar thereby comprising an integral element of the drill collar assembly. Two receiver coils are identified by the numerals 7020 and 7022. The geometries of these coils are quite similar to the geometries of the transmitter coils and again comprise integral elements of the collar assembly 7036. Power sources and control circuitry for the transmitters and receivers are internal to the drill collar 7036 and are not shown. Data recorded by the receivers can either be transmitted in real time to the surface using drilling fluid, pulsing fluid, pulsing means (not shown) or alternately can be recorded with the recording means downhole (not shown) for later retrieval. For the real time data transmission embodiment, signals from the receivers are transmitted to the surface by path means generically noted by the numeral 7046, transferred to a CPU 7042 for processing and correlating the depths from the drill collar depth indicator (not shown), with these results being transferred to a recorder 7044 which displays the computer parameters of interest as a function of depth at which the input measurements were made. An alternate embodiment comprises a processor unit (not shown) mounted within the drill collar 7036 to perform data processing downhole. Memory capacity is usually limited in MWD borehole devices. In order to most effectively utilize the limited memory, it is often desirable to process raw data downhole and store the processed data rather than store or transmit the more voluminous raw data.

Figure 33:
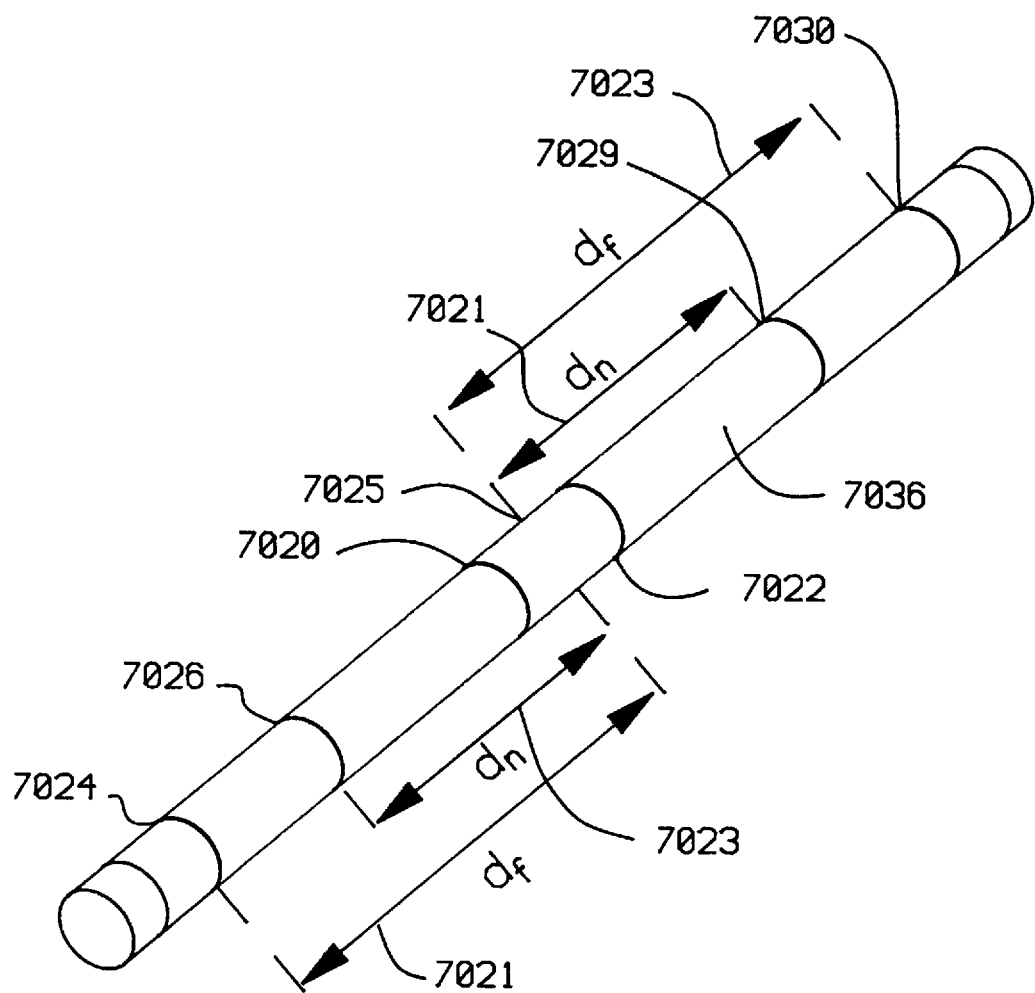
FIG. 33 shows a more detailed view of the transmitter and receiver coil arrays mounted on a drill collar.

An enlarged view of the drill collar and transmitter receiver array is shown in FIG. 33. The two receivers are denoted by the numerals 7020 and 7022. Transmitters 7026 and 7024 are longitudinally spaced distances 7023 and 7021, respectively, from the midpoint 7025 between receivers 7020 and 7022. Transmitters 7029 and 7030 are likewise longitudinally spaced distances 7021 and 7023 respectively from the midpoint 7025. Again, power sources and control circuitry for the transmitters and receivers which are internal to the drill collar are not shown. The symmetrical spacing pattern of transmitters and receivers about the midpoint 7025 between receivers 7020 and 7022 is preferred but not a necessary condition for the embodiment of the invention. The transmitters 7024, 7026, 7029 and 7030 are activated sequentially at a given frequency $\omega_1$. The phase and amplitude of the induced electromagnetic signal are measured at each receiver transmitter pair thereby yielding a total of eight measurements of amplitudes and eight measurements of phase shift which will be identified as $A_l$ and $P_l$, respectively, where (l=1, . . . 8). The procedure is then repeated at a second transmitter frequency $\omega_2$ yielding an additional eight measurements of amplitude and eight measurements of phase shift which will be identified as $A_i$ and $P_i$, respectively, where (i=9, . . . 16). The above defined cycle is repeated as the borehole instrument is conveyed along the borehole. In summary, sixteen parameters are measured as a function of instrument depth within the borehole.

The processing of measured data can best be visualized by matrix operation wherein the previously defined sixteen raw amplitude and phase measurements are multiplied by a non-square matrix which transforms these sixteen measurements into the parameters of interest. The parameters of interest can be varied and can include traditional formation evaluation related parameters such as resistivity and dielectric constant as well as near borehole parameters such as the radial extent of invasion of the formation by drilling fluid and the resistivity of the invaded zone. Furthermore, borehole parameters such as borehole diameter, eccentricity and ellipticity can be quantified as well as the resistivity of the fluid contained within the borehole. The number of parameters of interest must be limited to sixteen or less in the preferred embodiment. In an alternate embodiment, the number of parameters of interest can be greater than the number of raw data measurements. This condition yields an underdetermined set of equations requiring that initial estimates be supplied for the number of parameters of interest exceeding the number of raw data measurements. Regression techniques are then used to minimize the discrepancy between tool response predicted by the model and the set of measured raw data. The preferred embodiment employing sixteen measured parameters will directed to toward the measurement of borehole and near borehole parameters. For purposes of illustration, it will be assumed that five borehole or near borehole parameters are to be determined. These will be denoted $B_n$, where n=1, . . . , 5. The matrix operator is written as $$[T] \times [M] = [B] \quad \text{EQUATION NO. 12.1:}$$

where $$[B] = \begin{bmatrix} B_1 \\ . \\ . \\ . \\ B_5 \end{bmatrix} \quad \text{EQUATION NO. 12.2:}$$

-continued $$[M] = \begin{bmatrix} A_1 \\ . \\ . \\ . \\ A_{16} \\ . \\ . \\ . \\ P_1 \\ . \\ . \\ . \\ P_{16} \end{bmatrix} \quad \text{EQUATION NO. 12.3:}$$

and $$[T] = \begin{bmatrix} T_{1,1} & T_{1,2} & \ldots & T_{1,32} \\ . & & & . \\ . & & & . \\ . & & & . \\ T_{5,1} & T_{5,2} & \ldots & T_{5,32} \end{bmatrix} \quad \text{EQUATION NO. 12.4:}$$

The matrix [T] is a transform which represents a comprehensive model of the borehole instrument response with the borehole, near borehole, and formation conditions being variables. Since the elements $T_{i,j}$ are predicted by the model, the borehole parameters to be determined, $B_n$ (n=1, . . . , 5), can be calculated directly from the measured parameters represented by the matrix [M]. Using the formalism of equation number 12.1, it is essential that the model represented by [T] yield parameters of interest (the "unknowns") as a function of the downhole instrument response (the measured quantities).

Figure 34:
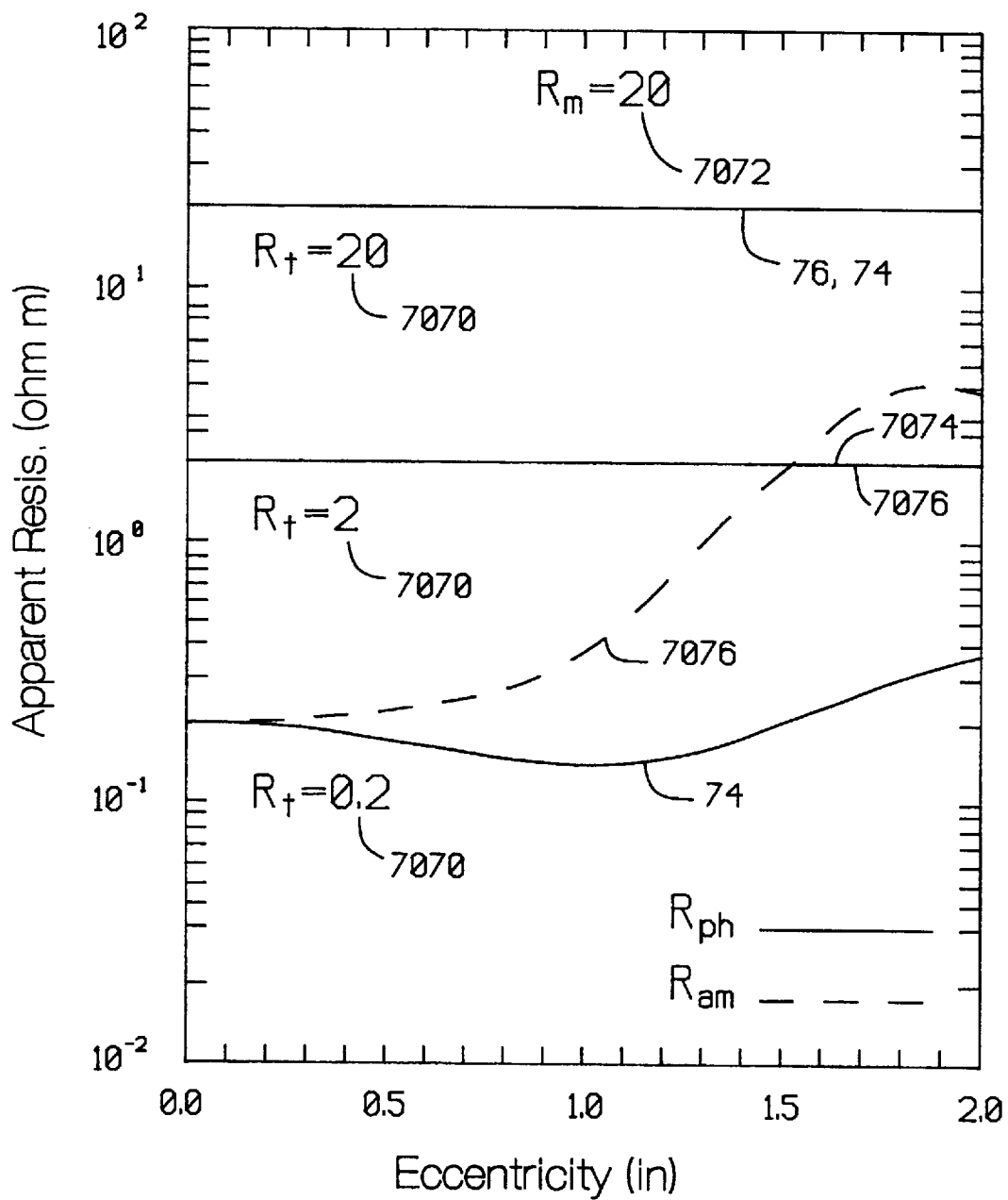
FIG. 34 graphically illustrates the interdependence of apparent phase and amplitude resistivity, true formation resistivity, and borehole eccentricity for a borehole fluid resistivity of 20 ohm meters.
Figure 35:
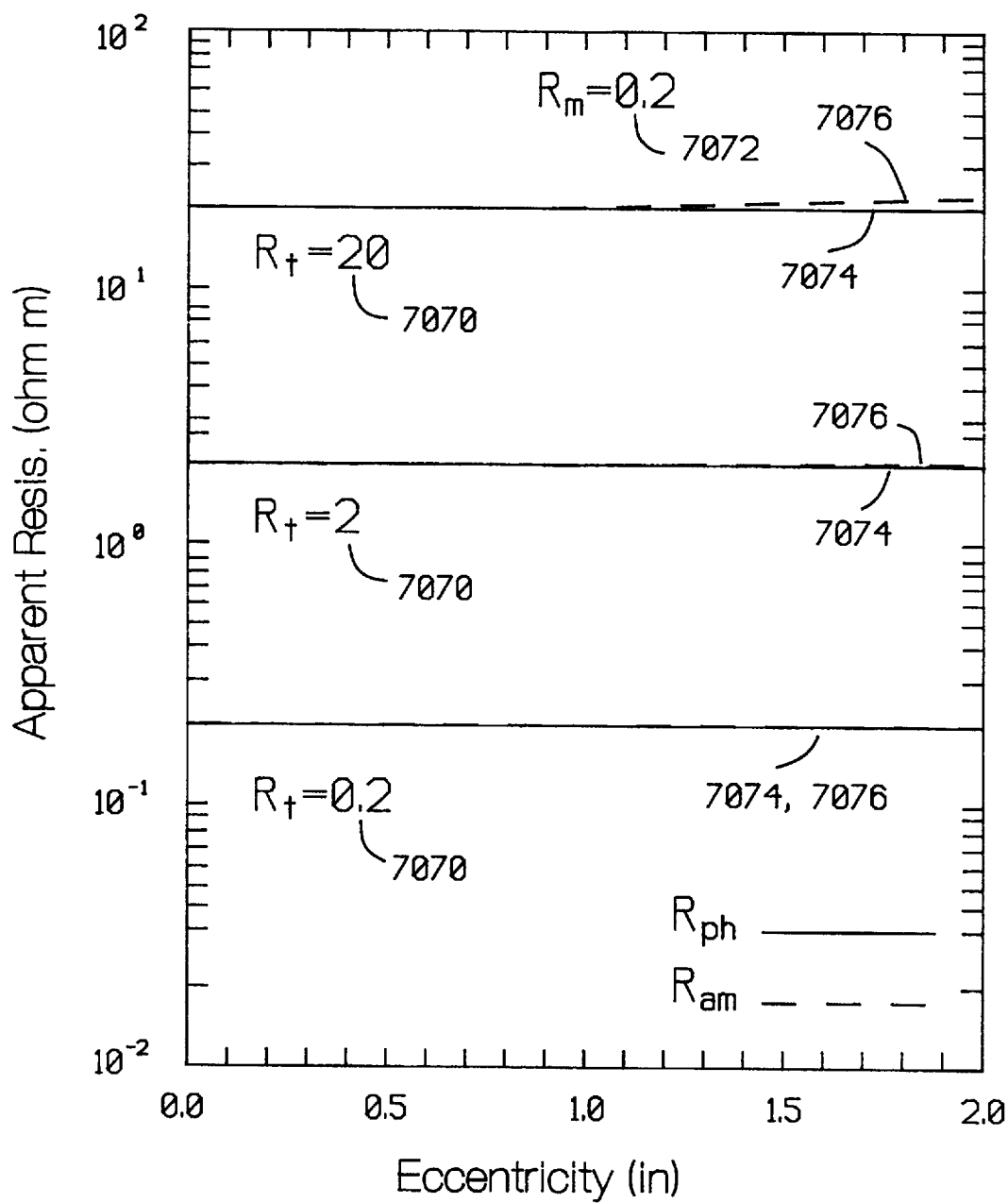
FIG. 35 graphically illustrates the interdepence of apparent phase and amplitude resistivity, true formation resistivity, and borehole eccentricity for a borehole fluid of resistivity of 0.2 ohm meters.

Jian-Qun Wu and Macmillian M. Wisler ("Effects of Eccentering MWD Tool on Electromagnetic Resistivity Measurements", SPWLA, 31st Annual Logging Symposium, Jun. 24–27, 1990) disclose a method for calculating the effects of a tool being eccenterred in a borehole upon resistivity measurements and is hereby entered by reference. As an example of this work, FIG. 34 illustrates the variations of measured of apparent phase 7074 and amplitude ratio 7076 resistivities, respectively, at a given transmitter-receiver spacing, as a function of eccentricity for formation resistivity 7070 of 0.2, 2.0 and 20 ohm meters and with a borehole fluid resistivity 7072 of 20 ohm meters. The transmitter frequency is 2 MHz. A similar plot is shown in FIG. 35 for a borehole fluid resistivity of 0.2 ohm meters and all other parameters remaining the same. In these examples, functional relationships have been developed which yield apparent resistivity values that will be measured by the borehole instrument (the measured quantities) as a function of formation and borehole resistivities and eccentricity which are the "unknown" quantities to be determined with means and methods of this invention. The responses are computed using a model developed around basic electromagnetic wave propagation principles using borehole geometry. The calculations have been verified experimentally. J.-Q. Wu, M. M. Wisler and J. F. Towle ("Effects of Arbitrarily Shaped Boreholes and Invasion on Propagation Resistivity Measurements in Drilling Horizontal Wells", *Progress in Electromagnetic Research Symposium*, Pasadena, Calif., Jul. 14, 1993) likewise discloses means for determining the measured response of borehole instruments in terms of circular and non circular invasion profiles and also in terms of instrument eccentricity within the borehole. This publication is hereby incorporated in this application by reference. Again measured quantities are expressed in terms of unknown parameters of interest. Stated another way the cited reference discloses means for calculating the forward problem which if incorporated in the comprehensive model, the current invention would cast the matrix equation number 12.1 in the reverse direction yielding equation number 12.5

$$[T] \times [B] = [M] \qquad \text{EQUATION NO. 12.5:}$$

where $$[T] = \begin{bmatrix} T_{1,1} & T_{1,2} & \ldots & T_{1,5} \\ & & \vdots & \\ & & \vdots & \\ T_{32,1} & T_{32,2} & \ldots & T_{32,5} \end{bmatrix} \qquad \text{EQUATION NO. 12.6:}$$

The solution of equation number 12.6 for [B] requires a regression scheme which is in general non-linear. That is, values of the parameters of interest, namely the elements of [B], are iterated until the elements of [M] calculated from equation (6) converge upon the actual measured values $A_i$ and $P_i$ (i=1, ..., 16). It is again emphasized that the other borehole and near borehole parameters are included in the model. Such additional parameters might include borehole diameter and resistivity of the invaded zones. Those parameters detailed in FIGS. 34 and 35 are presented as examples to illustrate the concepts of the data processing method. The additional characteristics of the response of the downhole instrument, obtained by mathematical modeling, are likewise incorporated as elements of the matrix [T].

13. The Use of Redundant Data for Log Quality Measurements

The logging tool of the present invention may be utilized to measure of geophysical parameters of earth formations penetrated by a borehole. The invention employs propagation resistivity techniques using a downhole instrument comprising multiple longitudinally spaced transmitters operating at different frequencies and a plurality of longitudinally spaced receivers. An electromagnetic wave is propagated from the transmitting antenna coil into the formation in the vicinity of the borehole and is detected as it passes the receiving antennas. The basic or "raw" parameters measured by the receivers are the phase and the amplitude of the passing wave. The downhole instrument is conveyed along the borehole making a plurality of raw measurements as a function of depth within the borehole from which geophysical parameters of interest are computed as a function of depth within the borehole. It is quite common in the prior art to first combine raw data measurement and then to compute parameters of interest from these process measurements. A typical example is the computation of apparent resistivity from the difference in phase of signals detected at receivers at different longitudinal spacings from the transmitter. A second example is the computation of apparent resistivity from the ratio of the amplitude of signals detected at the longitudinally spaced receivers. Such preprocessing or data combination is performed primarily to eliminate the gross effects of the borehole and is well known in the prior art. No attempt is made in the prior art to simultaneously track systematic errors associated with the measurements of apparent resistivity.

The current invention provides means and methods for determining error which can be related to uncertainty associated with geophysical parameters measured with a downhole instrument of the type previously described. The user of the information, or "analyst", selects the parameters of interest which might include the resistivity (or conductivity) of the formation, the dielectric constant of the formation, or perhaps the degree to which drilling fluids invade the formation in the vicinity of the borehole. The analyst's primary interests are usually the determination of the hydrocarbon saturation, porosity and permeability of the formations penetrated by the borehole. It is highly desirable to make such measurements while drilling or soon after the drilling of the well borehole so that critical economic decisions concerning the amount and producibility of hydrocarbons in place can be made. Based upon this information, the well will either be completed or abandoned. The accuracy and precision of geophysical parameters selected to make such critical decisions is also of prime importance. The error measurements provided by the current invention can also be used to indicate equipment malfunctions of both the electrical and mechanical types. Although prior art teaches means and methods of measuring a wide range of geophysical parameters using electromagnetic techniques, little, if any, emphasis is placed upon determining the quality of the measurements. Usually the analyst can only rely on past experience in assigning, at best, qualitative estimates of the quality of the measurements obtained from the borehole instrument and associated system. Any error analysis is usually performed long after the measurements are made and usually not at the well site. Stated another way, prior art does not provide means and methods for determining the quality of electromagnetic based geophysical measurements in real-time or near real-time, although real-time or near real-time economic and operational decisions are made based upon these measurements.

There is a critical need for quantitative indications of the quality of geophysical measurements made in formations penetrated by a borehole. More particularly there is a need for such quality measurements simultaneous with the measurements of parameters of interest. This is especially true in electromagnetic type measurements of formation resistivity which weighs so heavily in the decision to complete or abandon the well. The present invention provides this very information by providing means and methods for measuring geophysical parameters selected by the analyst and simultaneously yielding quantitative measurements of the quality or error associated with the measurements of the selected parameters.

The invention is directed toward the simultaneous measurement of a plurality of parameters, specified by the analyst, associated with the formation and borehole environment, and the simultaneous measurement of the quality or uncertainly associated with these measurements. Parameters of interest selected by an analyst might include the resistivity of the formation from which hydrocarbon saturation is computed, invasion profiles of the drilling fluid which are indicative of the permeability of the formation, and perhaps physical characteristic of the well bore itself such as diameter, ellipticity, and rugosity. The borehole related parameters might be used by the analyst to determine, as an example, the rock mechanics of the formation. As discussed previously, errors associated with the measurements are critical in the analyst decision concerning completion or abandonment of the well. Information concerning rock mechanics might guide the analyst in perforating after casing has been set or even in the design of hydraulic formation fracture operations subsequent to the setting of casing. The invention allows the analyst to choose parameters needed to make informed decisions as long as the total number of chosen parameters is less than thirty two for the preferred embodiment. Choices of parameters can vary from well to well depending upon need.

The borehole instrument comprises an elongated mandrel such as a steel drill collar in a measurement-while-drilling (MWD) embodiment of the invention. Two receivers comprising coils of one or more turns are wrapped around the outside diameter of the drill collar and spaced longitudinally near the center of the drill collar. Four transmitters comprising coils of one or more turns are wrapped around the outside of the drill collar and are spaced symmetrically in pairs on either side of the receiver array thereby forming eight transmitter-receiver pairs. All transmitter and receiver coils are electrically insulated from the steel drill collar. Transmitters are activated sequentially at a first frequency. The phase and amplitude of the induced electromagnetic signal are measured yielding four measurements of amplitude and four measurement of phase at each of the two receivers. The procedure is repeated at a second transmitter frequency yielding an additional four measurements of amplitude and four measurements of phase at each of the two receivers. Each sequence as described therefore yields thirty two independent, raw measurements. The measurement sequence is continuously repeated as the instrument is conveyed along the borehole. A mathematical model, which is based upon fundamental electromagnetic wave propagation properties, describes the theoretical response of the borehole instrument as a function of numerous formation and borehole parameters. Such parameters include formation resistivity, invasion parameters, formation bed boundary effects, borehole conditions and the like. The model contains fewer than thirty two variable parameters while the borehole instrument yields thirty two measured parameters as described previously. The system of unknown parameters is therefore "overdetermined" in the sense that there is more measured parameters than variable or unknown parameters to be determined. It should be noted that other transmitter-receiver-operating frequency or spacing combinations can be utilized. As an example, two transmitters and four receivers can effectively comprise eight transmitter-receiver pairs. Using this combination and operating the transmitters at two operating frequencies would yield thirty two raw data measurements. One transmitter-receiver pair with the transmitter operating at sixteen different frequencies would likewise yield thirty two raw data measurements. Furthermore, transmitter-receiver-operating frequency combinations can be selected which yield more than thirty two raw data measurements, or fewer than thirty two raw data measurements. The number of selected parameters of interest must, however, always be less than the number of raw data measurements so that the resulting system of equations is over determined.

Non-linear inversion techniques are used to determine the set of selected unknown parameters which, through the model, predicts a tool response which most closely matches the thirty two measured raw data points. The predicted tool responses and the measured tool responses will exhibit no discrepancies only if (a) there is no error associated with the measured data and (b) if the model represents without error the response of the instrument in every encountered borehole and formation condition. This is because there are more measured data points than unknown variable parameters in the model. Any degree of non-conformance or "mismatch" of the model data and the measured data is a measure of inaccuracy of either the data or the model or both the data and the model. In all cases the determined non-conformance is treated as a quality indicator for the determined parameters of interest. In other words, an uncertainty is attached to each parameter selected by the analyst based upon the goodness of fit between the model and the measured data.

Figure 36:
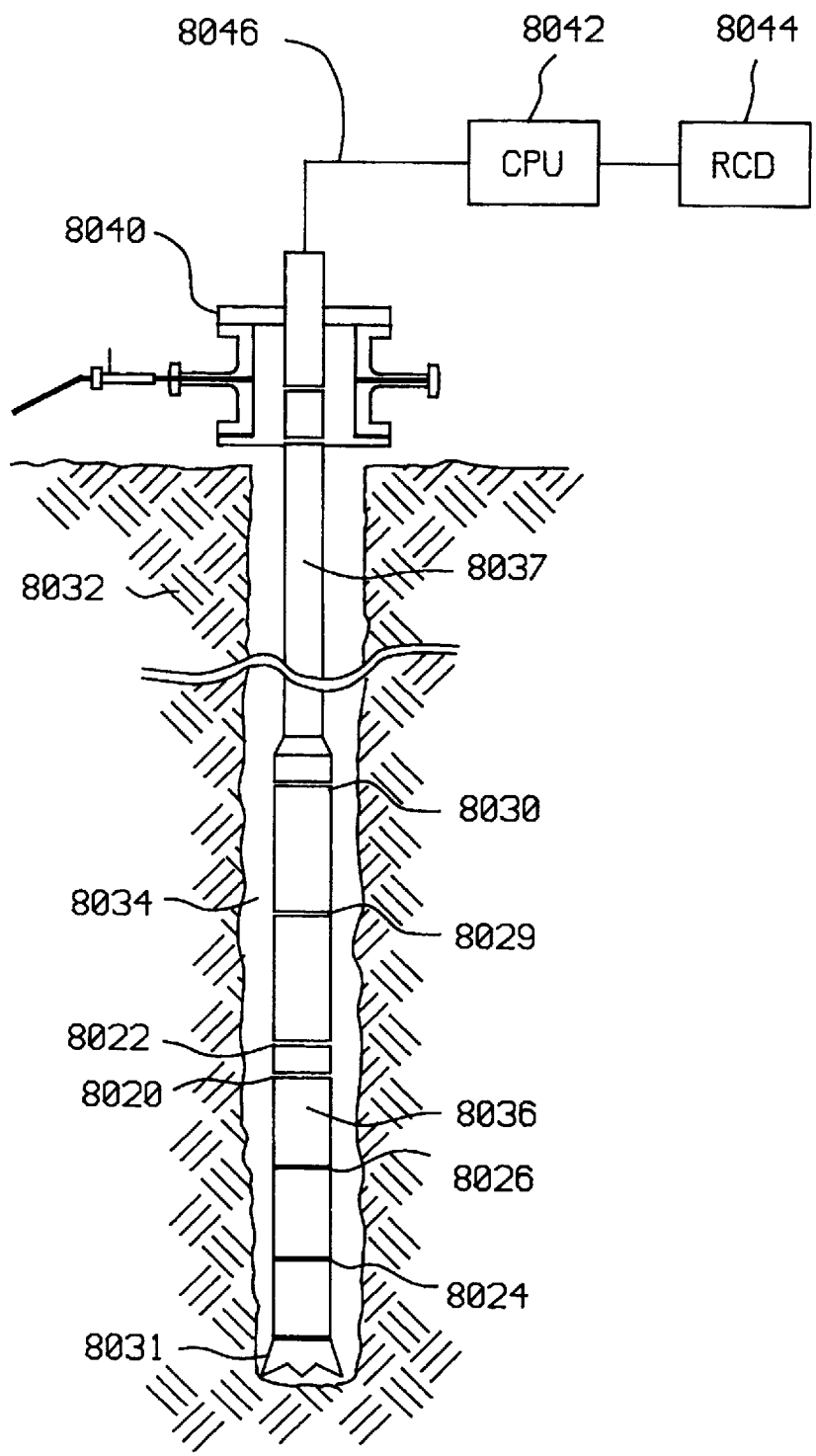
FIG. 36 illustrates the invention in a measurement while drilling (MWD) embodiment.

The invention maybe employed in a measurement while drilling (MWD) or a wireline logging environment. The preferred embodiment in an MWD environment is illustrated in a very general manner in FIG. 36. The drill bit 8031 is attached to a metallic drill collar 8036 which in turn is mounted on the wellbore drill string 8037. This assembly shown suspended in a wellbore 8034 which penetrates the earth formation 8032. A means for rotating the drill string 8037 is identified by the numeral 8040. FOur transmitter coils of one or more turns are identified by the numerals 8036, 8024, 8029 and 8030. The axis of the coils are coincident with the axis of the drill collar 8036. The coils are electrically insulated from and slightly recessed within the outer diameter of the drill collar, thereby comprising integral elements of the collar assembly. Two receiver coils are identified by the numerals 8020 and 8022. The geometries of these coils are quite similar to the geometries of the transmitter coils and again comprise integral elements of the collar assembly 8036. Power sources and control circuitry for the transmitters and receivers are internal to the drill collar 8036 and are not shown. Data recorded by the receivers can either be transmitted in real-time to the surface using drilling fluid pulsing means (not shown) or alternately can be recorded with downhole recording means (not shown) contained within the drill collar 8036 for a later retrieval. For the real-time data transmission embodiment, signals from the receivers are transmitted to the surface by a path means generally denoted by the numeral 8046, transferred to a CPU unit 8042 for processing and correlated with depths from the drill collar depth indicator (not shown), and output to recorder 44 which displays the computed parameters of interest as a function of depth at which the input measurements were made. An alternate embodiment comprises a processor unit (not shown) mounted within the drill collar 8036 to perform data processing downhole. Memory capacity and telemetry channel bandwidth is usually limited in MWD borehole devices. In order to utilize the limited memory capacity and telemetry channel bandwidth most effectively, it is often more efficient to process raw data downhole and store processed results rather than the more voluminous raw data.

Figure 37:
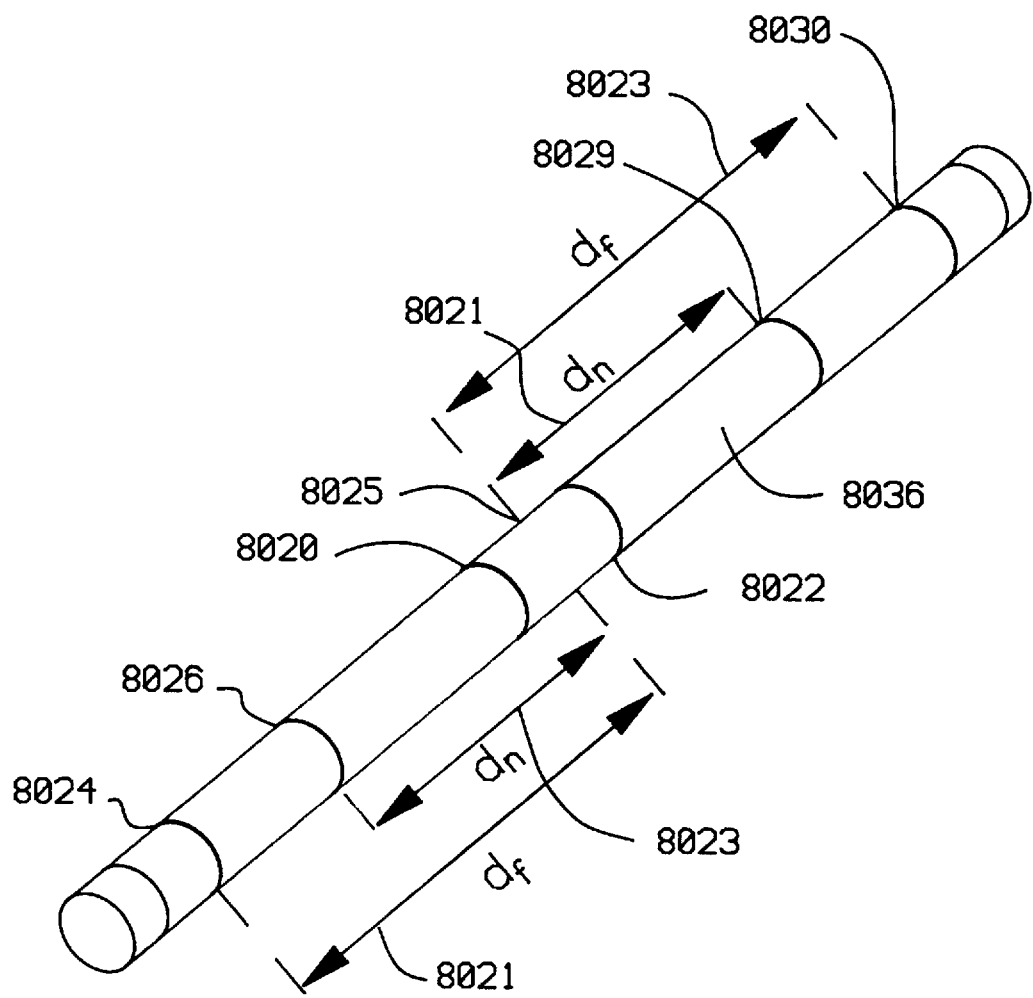
FIG. 37 illustrates in detail the drill collar comprising the transmitter and receiver coil arrays.

The drill collar comprising the transmitter receiver coil array is shown in greater detail in FIG. 37. The two receiver coils are denoted by the numerals 8020 and 8022. Transmitter coils 8026 and 8024 are longitudinally spaced distances 8023 and 8021, respectively, from the receiver 8020. The transmitter coils 8029 and 8030 are likewise longitudinally spaced distances 8021 and 8023, respectively, from the transmitter 8022. Again, power sources and control circuitry for the transmitters and receivers are contained within the drill collar and are not shown. The symmetrical spacing pattern of transmitters and receivers about a point 8025 midway between receivers 8020 and 8022 is preferred but not a necessary condition for the embodiment of the invention.

Transmitters 8024, 8029 and 8030 are activated sequentially at a first frequency $\omega_1$. The phase and amplitude of the induced electromagnetic signal is measured at the receiver nearest to each activated transmitter thereby yielding four measurements of amplitude and four measurements of phase shift. These measured parameters will be identified as $A_i$ and $P_i$, respectively, where (i=1, . . . , 4). The procedures is repeated at a second frequency $\omega_2$ yielding an additional four measurements of amplitude and four measurements of phase, identified hereafter as $A_{i\ and}\ P_i$, respectively, where (i=5, . . . , 8). The entire procedure is then repeated for the receiver farthest from each activated transmitter yielding values of $A_i$ and $P_i$ where (i=9, . . . , 16). In summary, a total count of thirty two parameters is measured by the borehole instrument. The above combined procedure of transmitting at frequencies $\omega_1$ and $\omega_2$, and recording received signals is repeated sequentially as the instrument is conveyed along the borehole.

Parameters of interest related to the formation, near borehole, and borehole are selected by the analyst. These parameters might include formation resistivity, formation dielectric constant, radius of invasion of the drilling fluid, resistivity of the drilling fluid and perhaps the diameter of the borehole. The selected number of parameters must be less than thirty two so that the system of equations described in the following section is over determined thereby permitting uncertainty associated with the selected parameters to be determined. For purposes of illustration, it will be assumed that the analyst selects n parameters to be determined, where n is less than thirty two.

The processing of the data to obtain the parameters of interest and the determination of uncertainty associated with these parameters can best be described using matrix notation. The system is written as:

$$[T] \times [M] = [X] \quad \text{EQUATION NO: 13.1:}$$

where $$[T] = \begin{bmatrix} T_{1,1} & T_{1,2} & \cdots & T_{1,32} \\ \cdot & & & \cdot \\ \cdot & & & \cdot \\ \cdot & & & \cdot \\ T_{m,1} & T_{m,2} & & T_{m,32} \end{bmatrix} \quad \text{EQUATION NO. 13.2:}$$

$$[M] = \begin{bmatrix} A_1 \\ \cdot \\ \cdot \\ \cdot \\ A_{16} \\ \cdot \\ \cdot \\ \cdot \\ P_1 \\ \cdot \\ \cdot \\ \cdot \\ P_{16} \end{bmatrix} \quad \text{EQUATION NO. 13.3:}$$

and $$[X] = \begin{bmatrix} X_1 \\ \cdot \\ \cdot \\ \cdot \\ X_m \end{bmatrix} \quad \text{EQUATION NO. 13.4:}$$

The matrix [T] represents the theoretical response of the borehole instrument calculated using appropriate electromagnetic modeling techniques for a broad range of formation and borehole conditions, the matrix [M] represents the thirty two raw data points measured by the borehole instrument, and the matrix [X] represents the formation and borehole parameters selected by the analyst to be determined. Although the solution of the matrix equation (1) to attain the desired parameters represented by the vector [X] is viewed as linear, in this case the element of the matrix [T] can be dependent upon the elements of [X]. The solution of equation number 13.1 will, therefore, require a non-linear regression solution such as a ridge regression.

Once equation 13.1 has been solved for [X], an inverse matrix operation is performed to generate a synthetic matrix of the measured quantities denoted as [M]. That is, $$[T'] \times [X] = [M'] \quad \text{EQUATION NO. 13.5:}$$

where $$[T] = \begin{bmatrix} T_{1,1} & T_{1,2} & \cdots & T_{1,m} \\ \cdot & & & \cdot \\ \cdot & & & T_{32,m} \\ \cdot & & & \cdot \\ T_{32,1} & T_{32,2} & \cdots & \end{bmatrix} \quad \text{EQUATION NO. 13.6:}$$

and $$[M'] = \begin{bmatrix} A'_1 \\ \cdot \\ \cdot \\ \cdot \\ A'_{16} \\ \cdot \\ \cdot \\ \cdot \\ P'_1 \\ \cdot \\ \cdot \\ \cdot \\ P'_{16} \end{bmatrix} \quad \text{EQUATION NO. 13.7:}$$

The mismatch between the measured parameters, [M], and the synthetic values of the measured parameters [M'] is a measure of quality of the parameters of interest, [X]. If $$[M'] \approx [M] \quad \text{EQUATION NO. 13.8:}$$

then there is little uncertainty associated with the computed values [X] indicating that the quality of the measured data [M] and the model representing the response of the instrument [T] are both good. If, however, $$[M'] \neq [M] \quad \text{EQUATION NO. 13.9:}$$

it can be concluded that either the measured data [M] are of poor quality or the model of the tool response represented [T] is inadequate or both conditions have occurred. It has been determined that in many cases, the model is quite reliable and error in the model is only a minor contributor to the observed error. It follows, therefore, that for these cases the observed error is usually attributable to equipment malfunctions. The degree of mismatch of [M'] and [M] is indicative of the magnitude of the uncertainty of error in the computed parameters of interest, [X]. Non-linear regression techniques suitable for application in this invention are described in the publication "Inversion of 2 MHz Propagation Resistivity Logs" by W. H. Meyer, SPWLA 33rd Annual Logging Symposium, Jun. 14–17, 1992, Paper H which is incorporated herein by reference as if fully set forth.

14. Multi-Depth MWD Logging Operations

As has been discussed, a variety of logging tool designs can be utilized to obtain better logging data. In particular, a plurality of techniques are available to obtain resistivity data from a plurality of depths of investigation, including:

(a) making amplitude attenuation and phase shift measurements in the same location and time interval;

(b) making either of (1) amplitude attenuation or (2) phase shift measurements at the same location and time interval, but utilizing two or more antenna spacings;

(c) make either of (1) amplitude attenuation or (2) phase shift measurements at the same location and time interval, but utilizing two or more interrogation frequencies.

Any of these techniques can be employed in either of the closely spaced transmitter embodiment or the simultaneous transmission embodiments of the present invention. The discussion of the foregoing section, while set forth in the context of an intermediate receiver embodiment, is of equal applicability to either of the closely spaced transmitter embodiment or the simultaneous transmission embodiment due to the linear nature of the interrogating electromagnetic field.

While the invention has been shown in only one of its forms, it is not thus limited but is susceptible to various changes and modifications without departing from the spirit thereof.

What is claimed is:

1. An apparatus for use in a wellbore for measuring at least one parameter of interest of at least one of (i) the wellbore, and (ii) a formation surrounding the wellbore, during drilling operations, comprising:

(a) at least two proximate electromagnetic transmitters, each of said transmitters being adapted to produce an electromagnetic signal at a selected frequency for passage through the wellbore and the surrounding formation;

(b) at least two spaced apart receivers substantially symmetrically disposed about the at least two electromagnetic transmitters, said receivers adapted for receiving the electromagnetic signals passing through the wellbore and the surrounding formation;

(c) a processor adapted for simultaneously activating the at least two transmitters with a defined relative phase with respect to each other and also with one of the at least two transmitters with a phase that is about 180° shifted from the defined relative phase, said processor being coupled to the at least two receivers and further adapted to process the signals received by the at least two receivers in response to the activation of the transmitters to determine the parameter of interest.

2. The apparatus of claim 1 wherein the processor is further adapted to determine the at least one parameter of interest by combining measurements in accordance with a superposition method.

3. The apparatus of claim 1 wherein the at least one parameter of interest comprises a resistivity of the formation.

4. The apparatus of claim 1 wherein the at least two receivers comprises an even number of receivers.

5. The apparatus of claim 1 wherein the processor is further adapted to use the amplitudes and phase shifts of the received signals at the at least two receivers.

6. The apparatus of claim 1 wherein the selected frequency is between 100 kHz and 12 MHz.

7. A method of determining at least one parameter of interest of at least one of (i) the wellbore, and (ii) a formation surrounding the wellbore, during drilling operations, comprising:

(a) activating at least two proximate transmitters with a defined relative phase with respect to each other and also with one of the at least two transmitters with a phase that is about 180° shifted from the defined relative phase, to produce electromagnetic signals at a selected frequency for passage through the wellbore and the surrounding formation;

(b) detecting the electromagnetic signals passing through the wellbore and the surrounding formation at least two spaced apart receivers, the at least two receivers being substantially disposed about the at least two proximate transmitters; and (c) using a processor coupled to the at least two spaced apart receivers to process the signals received by the at least two receivers in response to the activation of the transmitters to determine the parameter of interest.

8. The method of claim 7 further comprising using the processor for combining measurements in accordance with a superposition method.

9. The method of claim 7 wherein the selected frequency is between 100 kHz and 12 MHz.

* * * * *